(12) United States Patent
Uzes

(10) Patent No.: US 7,679,998 B1
(45) Date of Patent: *Mar. 16, 2010

(54) SYSTEM FOR DETECTING, TRACKING, AND RECONSTRUCTING SIGNALS IN SPECTRALLY COMPETITIVE ENVIRONMENTS

(76) Inventor: Charles A. Uzes, 365 McDuffie Dr., Athens, GA (US) 30605

( * ) Notice: Subject to any disclaimer, the term of this patent is extended or adjusted under 35 U.S.C. 154(b) by 0 days.

This patent is subject to a terminal disclaimer.

(21) Appl. No.: 12/215,647

(22) Filed: Jun. 27, 2008

Related U.S. Application Data

(60) Division of application No. 11/888,725, filed on Aug. 2, 2007, now Pat. No. 7,394,724, which is a continuation-in-part of application No. 11/595,276, filed on Nov. 9, 2006, now Pat. No. 7,423,934, which is a continuation-in-part of application No. 11/546,599, filed on Oct. 12, 2006, now Pat. No. 7,372,774, which is a continuation of application No. 11/200,264, filed on Aug. 9, 2005, now Pat. No. 7,123,548.

(51) Int. Cl.
  *G01S 15/00* (2006.01)
(52) U.S. Cl. ...................................................... 367/135
(58) Field of Classification Search .................. 367/135
  See application file for complete search history.

(56) References Cited

U.S. PATENT DOCUMENTS

| | | | |
|---|---|---|---|
| 2,826,753 A | 3/1958 | Chapin | |
| 5,383,164 A | 1/1995 | Sejnowski et al. | |
| 5,649,065 A | 7/1997 | Lo et al. | |
| 5,828,626 A | 10/1998 | Castile et al. | |
| 6,041,127 A | 3/2000 | Elko | |
| 7,123,548 B1 | 10/2006 | Uzes | |
| 7,372,774 B1 * | 5/2008 | Uzes | 367/135 |
| 7,394,724 B1 * | 7/2008 | Uzes | 367/134 |
| 7,423,934 B1 * | 9/2008 | Uzes | 367/135 |
| 2004/0223620 A1 | 11/2004 | Horbach et al. | |

FOREIGN PATENT DOCUMENTS

WO   WO 03044969 A   5/2003

* cited by examiner

*Primary Examiner*—Dan Pihulic
(74) *Attorney, Agent, or Firm*—Smith, Moore, Leathwood LLP; Thomas W. Epting

(57) ABSTRACT

A system applicable to acoustic, seismic, electromagnetic, hydrodynamic, and shock waves utilizing a map between signal time series and signal vectors defining the mathematical wave field model characterizing the signal's wave field. This map is developed from wave models relating field values to those on surfaces and corresponding uniqueness theorems. The system should allow for improved resolving power in bearing and elevation for discrimination of sources; detection and direction finding for signals below the average background level; detection based upon resolving power and signal vector characteristics rather than signal to noise ratio; reconstruction of signals of resolved sources for their transmitted information content; and multiple modes of operation. Adaptive incorporation of known undesired signals into the noise background and/or treatment of asymmetric background noise fields is permitted through use of a noise metric-based map yielding signal direction in the presence of diffraction effects.

9 Claims, 39 Drawing Sheets

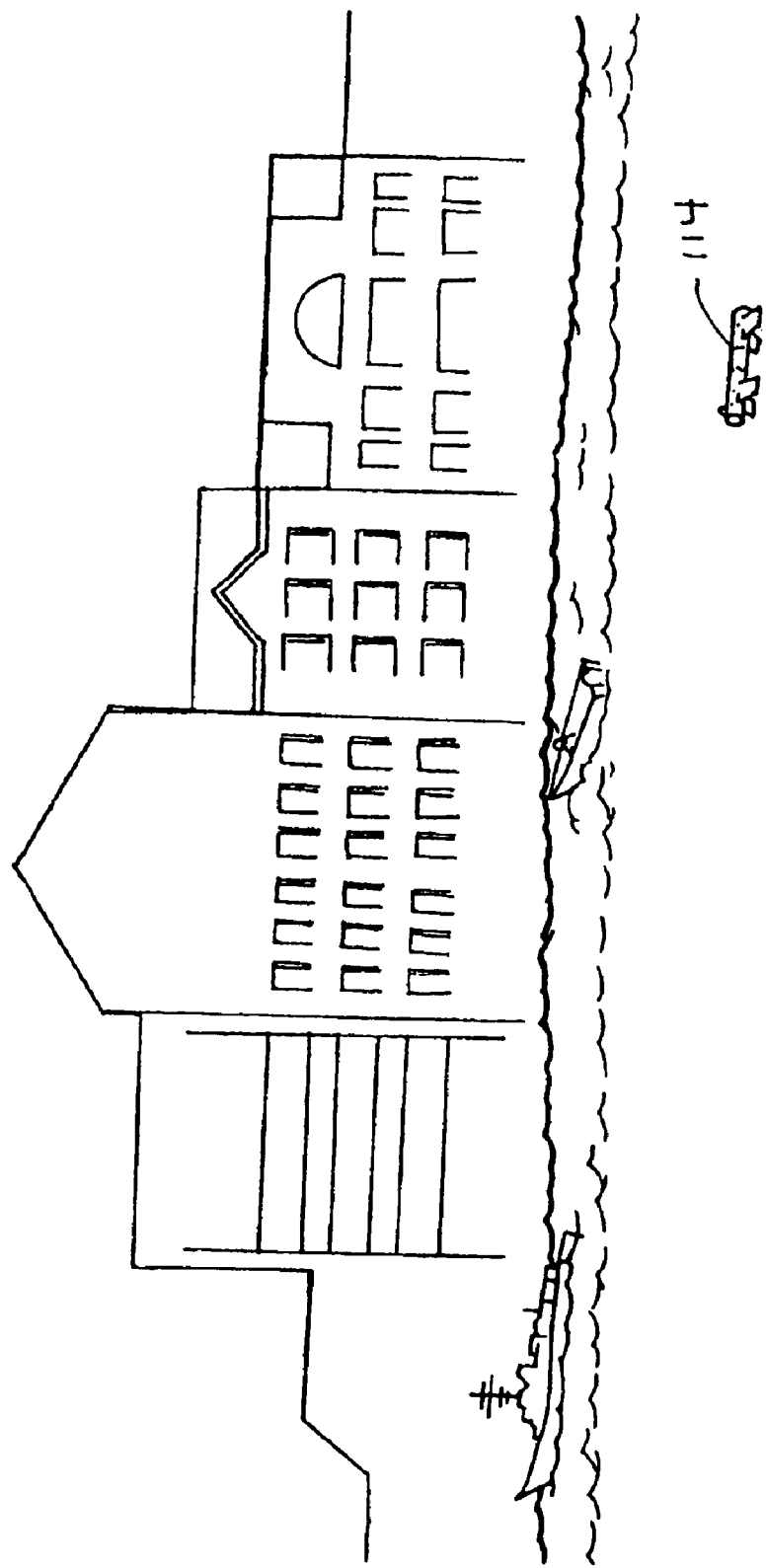
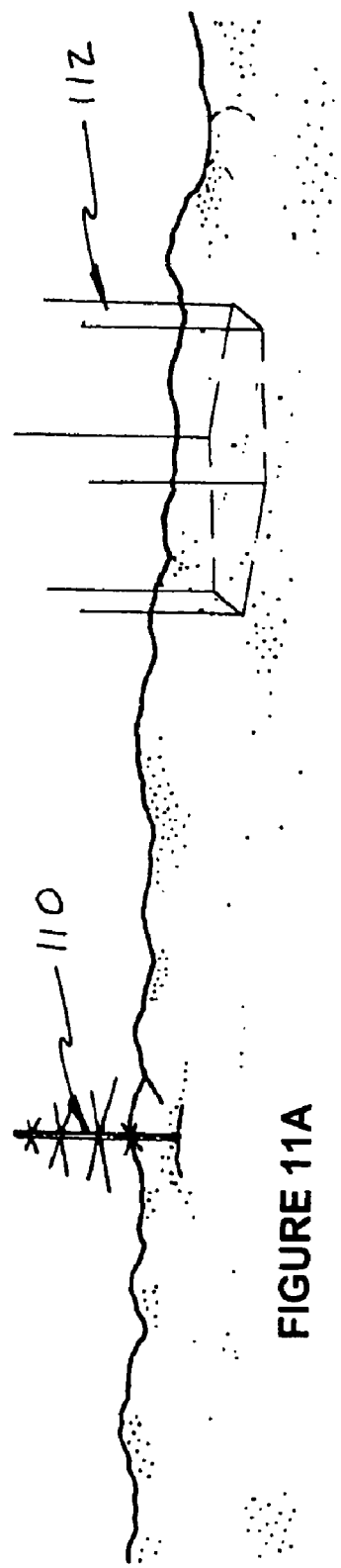
FIGURE 11A
FIGURE 11B

SYSTEM FOR DETECTING, TRACKING, AND RECONSTRUCTING SIGNALS IN SPECTRALLY COMPETITIVE ENVIRONMENTS

BACKGROUND OF THE INVENTION

This is a divisional of application Ser. No. 11/888,725, filed Aug. 2, 2007, now U.S. Pat. No. 7,394,724, which is a continuation-in-part of application Ser. No. 11/595,276, filed Nov. 9, 2006, now U.S. Pat. No. 7,423,934, which is a continuation-in-part of application Ser. No. 11/546,599 filed Oct. 12, 2006, now U.S. Pat. No. 7,372,774, which is a continuation of application Ser. No. 11/200,264, filed Aug. 9, 2005, now U.S. Pat. No. 7,123,548, issued Oct. 17, 2006, and the entirety of each of the foregoing applications and patent is incorporated herein by reference.

The present invention relates to a system for three dimensional multiple signal tracking, and reconstruction for use in connection with search and rescue, surveillance, storm and severe weather alerting, animal and bird migration, subsurface mapping, anti-terrorism, conventional warfare, etc.

Analog beamforming and antenna steering using loop, parametric and/or phased arrays, are methods employed for direction finding of acoustic and electromagnetic waves belonging to quasi-continuous signals. In one approach, a directional antenna (such as a parasitic array or loop antenna) is rotated towards the source for maximum reception. The detector may be a single receiver, as in the case of electromagnetic devices, or might be human ears receiving the output of two microphones mounted in the centers of large megaphones. The antenna's 'beam' could also be steered at a given frequency of operation by artificially introducing appropriate time delays into the detected signals from different antenna elements. These analog forms of beamforming were employed in World War II (radar and acoustics), for tracking aircraft and for transmitter hunting, and traditionally by radio amateurs in hunting hidden transmitters in practice for emergencies for sport, and for the elimination of undesired signals.

The time of arrival method has also been applied to locating sources of short duration signals, such wave pulses generated by earthquakes, shocks, blasts from explosions, cell phones, etc. Time of arrival techniques generally seek absolute and arrival time differences between signal arrivals at antenna transducer elements. Such systems typically obtain information from two or more antennas to obtain directions of incoming signals and employ triangulation techniques to estimate points of origins.

For quasi-continuous signals, certain beamforming and beam steering methods use fixed antenna arrays of transducer elements and digital signal sampling and processing to convert signal conditioned antenna output signals into digitized time series. These methods generally do not require antennas to be rotated, but instead typically make use of second order statistical functions obtained from cross-correlations and cross-spectral densities of time series of the different antenna elements. The second order statistical procedures allow for the determination of preferred signal directions and signal power spectra. Artificial channel time delays using digital processing can be used to numerically steer "antenna beams" and can also incorporate antenna beam modifications for adaptive processing and removal of undesired sources.

In contrast, the present system is based upon the creation and manipulation of signal vectors providing for the construction of mathematical models of physical wave fields at or in the vicinity of the antenna.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 11A is a schematic representation of a bottom-mounted hydrophone 3D tree or spherical array constructed in accordance with the present invention for harbor security applications, having both passive detection and tracking capability (including those capabilities referenced in FIG. 10B) and small boats and swimmer delivery vehicles, depending upon the antenna size and configuration;

FIG. 11B is a schematic representation of a swimmer delivery vehicle and a bottom-mounted cylindrical array constructed in accordance with the present invention for applications as referenced in FIG. 10B, and with applicability to small boats and swimmer delivery vehicles, depending upon the antenna size and configuration and type of transducer (magnetic, hydrophone, vector magnetometers, etc.);

SUMMARY OF THE INVENTION

Figure 1:
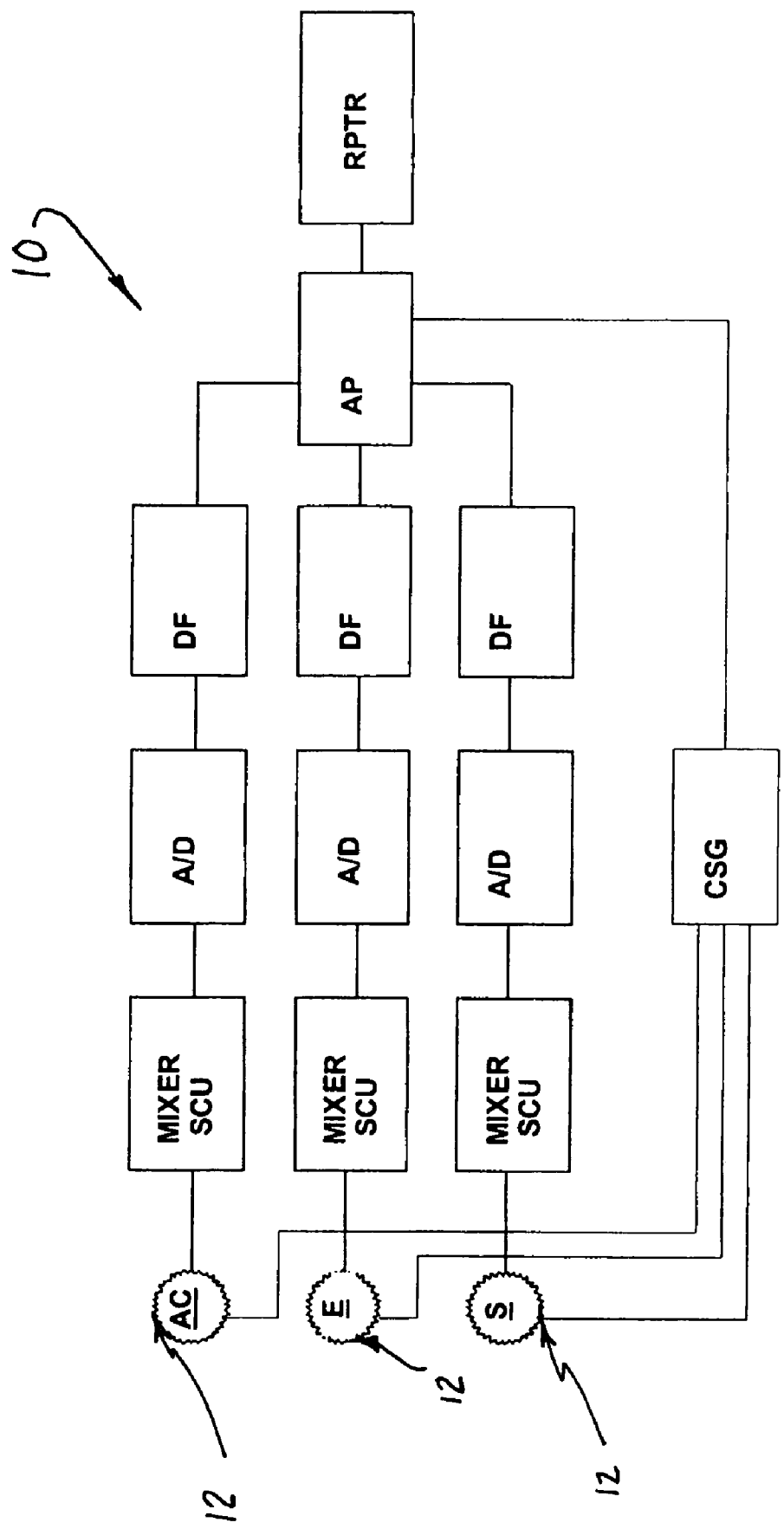
FIG. 1 is a block diagram of a system constructed in accordance with the present invention for a composite acoustic, electromagnetic, and seismic antenna array with self calibration capability.

Generally, the present invention includes a method and apparatus for determining selected information from signals contained in a physical wave field, the properties of the physical wave field being detectable over three spatial dimensions and a temporal dimension, and the method including characterizing the physical wave field by a signal vector providing a mathematical model of the physical wave field, and determining the selected information from the signal vector. The present invention also provides further embodiments for reconstruction of spectrally competitive signals and their simultaneous transmission into different resolvable directions, such signals being receivable at one or more destinations while minimizing substantive interference by the other signals being simultaneously transmitted.

The necessary equations, theory, and computational tools required for constructing embodiments of the present invention for the different physical wave types are historical and well known and can be established using the following texts (which are incorporated herein by reference): Stratton, *Electromagnetic Theory*, 1941 Chap 9, Jackson, *Classical Electrodynamics*, 1962 Chapter 16; Roger G. Newton, *Scattering of Waves and Particles*, 1966; (Jenkins and White, Fundamentals of Optics, 1957); Thorne Lay & Terry C. Wallace, *Modern Global Seismology*, 1995; and Oppenheim and Schafer, *Digital Signal Processing*, 1975; Mathworks, Matlab and Signal Processing Toolbox (User's Guides), 1998; Roman, Theory of Elementary Particles, 1961. As a consequence the details of these theoretical notions, equations, and the standard mathematical tools (Mathworks) are not discussed in detail herein.

The general natures of the approaches of the present invention are applicable to linear physical wave types or those which can be sufficiently treated as linearized waves. Because of the large number of applications of the invention to different physical media and wave types, for the sake of brevity, illustration of specific applications of the preferred embodiment are limited herein to several demonstrative acoustic, seismic, and electromagnetic applications, and it is to be understood that the present invention is not to be limited to the applications and embodiments disclosed herein.

The conceptual basis for the present invention lies in properties of solutions to scalar and vector field wave equations describing physical wave propagation in different physical media and/or in the fields induced by such propagating waves in certain material media. The mathematical models chosen determine the available information. The choice of which physical wave fields are of interest, the propagating wave and/or the waves it induces on surfaces, depends upon what transducers are employed and what is required to attain the desired selected information in the given situation. Under proper circumstances propagating wavefields in the vicinity of a spatial surface are determined by sufficient knowledge of wave fields and their derivatives on that surface over some time interval (see Jackson or Stratton). Kirchoff Surface-Integral representations provide such connections (the treatment of diffraction is such an example) and so can the wave equation itself (with sufficient knowledge of the field along the surface power series expansions can be defined to define the mathematical model in the vicinity of the surface). With these cases, more extensive selected information can be obtained. In other cases, the ability to construct a mathematical model on the surface itself may suffice. Whatever the choice for selected data, data collection of band limited signals through discrete spatial and temporal sampling using properly selected transducers placed along such a surface according to well understood criteria can provide the required information, as the Nyquist sampling theorem shows. The signal vector is either a collected data set containing such required sample information or the equivalent, and therefore contains all the information obtainable from the chosen mathematical model. The selected data, considered already established as obtainable from the field, can be extracted then from signal vectors or the chosen wave fields through the data reduction procedures described below.

Depending on the nature of the embodiment's antenna, what is being sampled via data collection, the choice of transducers, and the nature of desired selected data, signal vectors can characterize physical wave field fluctuations and/or fluctuations in physical "charge" and "current" density fields on surfaces. The latter can arise in electromagnetism. Thus, the signal vector characterization of an incoming wave field can be indirect. The type of signal vector for the most extensive selected information is that dictated by the procedures for mathematical wave field model determination in the antenna vicinity, as described above, for knowledge of the most complete description of the propagating wave field implies knowledge of the most complete information.

The present invention includes, in certain embodiments, systems and methodologies using antenna arrays of transducer elements, together with electronic signal processing hardware, signal conditioning units, signal processing software, and reporting electronics. The present invention includes a method of deriving signals obtained from properly configured antenna elements (transducers or sensors) which convert acoustic, seismic, fluid dynamic, electromagnetic and/or electric charge or current density wave fluctuations into fluctuating voltages or currents. These signals are amplified and filtered as necessary, and then digitized. The resulting time series of the signals constitute a signal vector providing for the construction of a mathematical representation of the physical wave chosen over the bandpass of interest. The signal vector is cast in representation or form suitable for attainment of desired selected information. The signal vector is then manipulated for desired selected data and/or to obtain the signal vectors characterizing fields of resolved sources of incoming signals. A reversal of the process provides for the construction of a mathematical model for the signals generated by fields of resolved sources using their individually characterizing signal vectors, from which the information content they carry can be determined through digital signal processing and/or through proper digital to analog ("D/A") conversion and demodulation.

Pre-constructed libraries of directional and/or modeling signal vectors and the superposition principle enable the determination of desired signal information from data processing algorithms. In essence, the goal of being able to approximately construct the individual signals of resolved sources of interest as they would be received at the antenna, as if each such resolved source was the only signal present, serves as the most basic design criteria for embodiments of the present invention operating at the highest level. The path to the goal permits the incorporation of new techniques for the extraction of selected information (including that of detection, tracking, and modulation content) and the development of new criteria for when such information is obtainable. However, the system of the present invention can operate without reaching the above-stated goal in the event of partial hardware failure or breakage, when conditions and desired selected data allow a relaxation of system configuration constraints, or when the chosen mathematical model is not necessary for the attainment of certain selected information.

There are additional fundamental application independent notions underlying the concept of the apparatus or invention. One such notion is that hardware/software/processor configurations and the dimensionality of the vector space in which the signal vectors are defined are coupled to the resolving power specifying the ability to differentiate neighboring signals having identical frequencies. Yet another is that antenna sensors can be configured and sampled such that for a given frequency bandpass their time series constitute sufficient data to allow determination of a signal vector representing the incoming field. Another is that different equivalent representations for a signal vector can be chosen, such as those (but not limited to) of the temporal, frequency, and partial wave domains, the choice being application dependent. Another fundamental notion is that signal vectors of any domain can be linearly and quasi-linearly manipulated for noise reduction and for the attainment of selected information, including but not limited to, that for detection, tracking, and the classification of multiple spectrally competitive sources. The superposition principle applies to signal vectors as well as to the wave fields. Another is that the library element signal vectors of preconstructed libraries can be used to construct the individual signals of resolved sources, and that those of overlapping data set time segments can be merged to provide for determination of the information content of such signals within the operating bandpass. However, certain elements of desired selected information may not require complete construction of the signal vectors of each source making up the sampled signal vector. A general reversal of this process used for such reconstruction, allowed by the linear nature of the procedure, allows for simultaneous transmission of independent selected information in multiple spectrally competitive signals into directions that can be resolved by the system.

Different applications of the invention to different wave processes require certain changes in hardware components. For example, for acoustic waves in air, microphones could be employed as antenna transducer elements. For acoustic waves in water, hydrophones could be employed, and for seismic waves, the antenna elements would be geophones or vector magnetometers, as would also be the case for tsunamis. For electromagnetic waves, inductors could be employed or capacitors mounted on or in metallic surfaces. For oceanic internal waves, the transducers might be thermistors and/or magnetometers. Correspondingly and depending upon wavelength and frequency, different signal conditioning and data acquisition units could be used. When necessary, a single mixer may be used to simultaneously lower the frequency of the incoming signals on all channels so that the relative phase and amplitude characteristics of the signals of antenna sensor elements are preserved and sampling requirements reduced. The construction of a signal vector requires proper choices for antenna sensor placement and configuration, the frequency bandpass to be sampled, computational word size, and the mechanism for determining the signal vector of a chosen representation jointly typically define an embodiment of the present invention. However given an application, once the signal vector has been determined, the procedures for computation of selected information are nearly independent of the physical type of application. The possible embodiments of the invention include composite systems capable of simultaneously handling all three classes of physical phenomena, as well as a data reporting system possibly using the utility's antenna structure as part of a microwave or RF transmission remote reporting system.

Scalar products between signal and library vectors and constructs of the latter provide for classes of selected information, depending upon the signal to noise ratio and the system resolving power. Signal vectors as representatives of physical wave fields models can be differentiated to obtain the derivatives of the physical wave field model they represent, providing other procedures for obtaining selected information. A number of possibilities exist for obtaining selected information from signal vectors as representatives of physical wave fields.

The identification and detection process also provides bearing and elevation angles of individual sources. Multiple source tracking and differentiation is based upon the resolving power of the embodiment. An adaptive noise based metric tensor characterizing the environmental noise background redefines scalar products to provide for the adaptive removal of unwanted and interfering sources and a map between apparent and true estimates for directions of incoming signal waves, alleviating a beam maintenance problem found with adaptive beamforming approaches. The linear nature of the physical wave field to signal vector mathematical map enables signal enhancement through signal vector averaging and the attainment of relatively high resolving power through use of high element density arrays and/or a consequent reduction in numerical processing demands.

The system can incorporate use of digitized contour maps of the environment. Such digitized data permits incoming signal directions to be traced back to their points of origin when such tracebacks intersect physical surfaces characterized in digitized contour maps. In this way, range and source location can be determined from individual antennas. When antennas large enough to measure wavefront curvature are employed, and wavefront curvature is incorporated as a library category, range can also potentially be determined. When neither of these procedures can be utilized, source range can be determined from triangulation techniques using more than one system of the present invention with baselines of proper length, while Doppler observations can be used to estimate trajectory directions and closest points of approach. The present embodiment also permits range to a source to be determined from a single antenna in certain circumstances.

The system can incorporate calibration and self-testing for verification of performance criteria. The self calibration and self-testing capabilities allow for automatically switching to alternate modes of operation, with perhaps some reduction in signal detection and resolving capability, should some signal channels become damaged or disconnected.

Using subsets of predetermined signal vector libraries, three dimensional systems can be operated in two dimensional modes when incoming signals have their wave propagation vector in a common plane. With a 3D system, this can be done in any plane. Thus, with the system of the present invention, optimum performance may be obtained for waves propagating parallel to the surface of the ground even if the antenna mast is not vertical. The 3D algorithms can be used with 3D subset libraries to operate high transducer density 2D antennas in 2D modes. The present invention can use its antenna structure for housing utility electronics and microwave remote reporting gear and also have it serve as a radio or TV transmitting antenna.

Given a chosen bandpass, the accuracy of the underlying mathematical model is determined by the accuracy of the sampling, the level of system electronic noise, the level of environmental random noise, and signal processing accuracy, and how well data sampling criteria are met. Environmental considerations, the physical process, the anticipated scenario, and operational constraints may dictate the choice of antenna transducer system to be used. Each embodiment should preferably employ a self consistent configuration, so that the system outputs reliable selected information to a reporter for decision making by a human or other external device.

DESCRIPTION OF THE PREFERRED EMBODIMENT

The foregoing, as well as other objects of the present invention, will be further apparent from the following detailed description of the preferred embodiment of the invention, when taken together with the accompanying drawings and the description which follows set forth this invention in its preferred embodiment. However, it is contemplated that persons generally familiar with mathematical wave propagation models and with communications and direction finding systems and their theory will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the high resolution, vectorized three dimensional multiple target tracking and signal reconstruction system of the present invention is illustrated in various embodiments.

The general structure of the physical components of the present invention is described below, as is the basis for the realization of signal vectors, stated with examples. Also described is the basis for configuring embodiments constructed in accordance with the present invention and procedures for obtaining selected information. The overall structure of one preferred signal reconstruction and direction finding system, generally 10, constructed in accordance with the present invention is depicted in FIG. 1. Transducers 12 of antennas, such as acoustic antenna AC, electromagnetic antenna E, and/or seismic antenna S, convert physical wave fluctuations at the location of each transducer into electrical fluctuations. Mixer and signal conditioning units, generally SCU, can amplify, filter, and mix the signals of each transducer as requirements dictate. The SCU outputs are then passed to analog-to-digital converters, generally A/D, to digital filters, generally DF, operating consistent with temporal Nyquist sampling criteria (Oppenheim and Schafer). Further signal processing takes place in an array processor AP (or computer CPU, possibly a parallel processor) on time series data output from the A/D converters, and/or digital converters DF, and data reduction take place under software. The array processor AP feeds a reporter, generally RPTR, for transmission of results on selected information in suitable form to humans.

System 10 is illustrated having acoustic, seismic, and electromagnetic capability. It includes software for an optional calibration signal feed running from the computer processing unit AP through a calibrating signal generator, generally CSG, to transducers 12. The software for the signal calibration feed provides signals for calibration of the system 10 and for verification of system performance within allowed tolerances. The above system in diagram 10 can also be used with an appropriate hydrodynamic sensor (not shown) for use in detecting hydrodynamic wavefields.

Although FIG. 1 only illustrates applications for acoustic, electrodynamic, and seismic wave types, possible solutions and wave types can include scalar, vector, and tensor fields associated with coordinate systems appropriate for different possible antenna symmetries and physical processes (acoustic, seismic, electromagnetic, and hydrodynamic) and environmental conditions. Each such model is associated and consistent with implementation of the conceptual basis for the embodiment as described in the above Summary as applied to the pertinent type(s) of physical wave propagation, or consistent with an incomplete implementation if the desired selected information allows.

The propagating physical wave and the detected or transducer sampled physical wave may differ. For example, if the propagating wave is electromagnetic, the transducer detected wave may be that of electric charge and current densities on the surface of a conductor as induced by the propagating wave. Mathematical models used in accordance with the present invention provide the map between sampled data and the chosen physical wave fields to model.

The present invention includes procedures for obtaining signal vectors. Transducers can be considered as placed upon a surface, real or imaginary. The type of transducers utilized should be consistent with the chosen mathematical model for the chosen physical wave field being sampled. The transducers should preferably be small compared with relevant wavelengths, so that measurements can be associated with specific transducer locations on the transducer surface. If transducer spacing, number, and the temporal sampling rate for wave field fluctuations meet Nyquist sampling criteria for waves on that surface, then the mathematical representation for the wave fluctuations is preferably uniquely determined over that surface for the period data is collected. Furthermore, even if a choice is made for complete mathematical model for the incoming wave field, and transducer type and sampling is consistent with this choice, a mathematical model for the field can also be determined within the vicinity of that surface. Hence, a proper discrete set of samples can define a signal vector, and the Fourier Transforms of these temporal sample sets can also define signal vectors.

Signal vectors can also be obtained as expansion coefficients of partial wave expansions (PWEs). The latter are defined by separable or nearly separable solutions to wave equations defining the mathematical models for the relevant physical wave fields, those formed through the process of separation of variables. Each partial wave is labeled by the separation constants defining it. For a properly configured system, the signal vectors defined by expansion coefficients of suitably truncated partial wave expansions are equivalent to those described above, and can be related by mathematical transformation. Integral forms for solutions of wave fields, such as those developed by Sommerfeld and Weyl (Stratton) can also be used to define signal vectors.

The procedures allowing for the construction of a chosen mathematical model for a physical wave field in the neighborhood a surface follow from knowledge of the field and required spatial and temporal derivatives on the surface, and mathematically established uniqueness criteria for the field's mathematical model tell what is required. Nyquist criteria tell when a sufficient number of samples at a sufficient number of spatial locations are taken for a given bandpass and time period. Consequently, with sufficient temporal sampling rates the model for the chosen physical wave field everywhere on the surface can be constructed, and the field on that surface can be numerically differentiated, so that temporal Fourier transforms in time are also known thereon in principle. For certain choices physical wave fields and mathematical models and types of transducers, implied knowledge of spatial and temporal derivatives along the surface allows construction of the wave field model in the neighborhood of the surface, when the latter is needed as selected information. The dispersion relation giving wave number as a function of frequency is known from the wave equation, so the maximum number of wavelengths present along the surface can be determined for each frequency (considering various possible directions for incoming waves). This determines required antenna transducer spacing according to the sample criteria and the angular resolving power as well, which is given by the angular aperture of the shortest possible wavelength along the surface, a result consistent with Lord Rayleigh's criteria for "just" resolution in optics (Jenkins and White).

The sample theorem is not the only basis for obtaining a map between a signal vector and the physical wave the old that it represents. For example, the signal vector could define a mathematical model of a physical wave field using a least-squares or other non faithful technique for establishing partial wave expansion coefficients of a partial wave representation of physical wave field in an antenna neighborhood. In such case, spatial and temporal Nyquist criteria need not be fully met. In the latter case, obtained selected information could be ambiguous or non unique.

Signal vectors can be the ordered set of samples (time series data) collected from the transducers via A/D conversion over some temporal window. Signal vectors also can be the set of Fourier coefficients obtained discrete Fourier transforms of this time series data. Or, they can be the expansion coefficients of a suitably truncated partial wave expansion (associated with a coordinate system for which the wave equation is separable). Other signal vectors can also be obtained, for example, from a discretization of integral solutions to a wave equation. For all such cases, the set of signal vector components will be symbolically represented by $\{s_\alpha\}$ and the signal vector by s, where $\alpha$ is a collective index.

The signal vector index $\alpha$ differentiating components of the signal vector may characterize the set $\{jt_k\}$ of the original samples (j labels the transducer where the sample at time $t_k$ was taken), as such, it characterizes the original sample set time series. It may also characterize the frequencies and transducer label of the Fourier transformed time series data. In the case of partial wave expansion, it characterizes the indices labeling the distinct partial waves, such as the traditional (k,l,m) of the expansion for spherical partial waves, etc. Thus, the signal vectors component indices may result from the reshaping of a signal tensor. The particular choice of signal vector representation depends upon the selected information being sought and the nature of the environment in which the system is to be used. For example, for sources at long range, the plane wave PWEs provide a useful signal vector representation for spectral components of incoming signals, while spherical wave PWEs are useful for descriptions of same in spherical polar coordinates when output for bearing and elevation angles of sources is desired.

For a carefully configured embodiment the different signal vector representations are equivalent, a situation occurring when embodiment resolving power, temporal and spatial sampling, and hardware processing are consistent. The Fast Fourier Transform (FFT) relates the spectral domain signal vector to that of the temporal domain. The partial wave functions evaluated at transducer locations define the transformation from one of the former to one of the partial wave representations of a signal vector. In fact the spectral domain signal vector is that of a partial wave expansion in harmonic functions. The aforementioned representations of signal vectors are of course equivalent to some specifiable accuracy, for example, the accuracy with which the truncations of the infinite PWEs are valid, or that to which a low pass filter is effective in meeting Nyquist sampling criteria.

The mathematical description of a physical wave field may be a multi-component entity, as with seismic and electromagnetic waves. In the latter case, the signal vectors may be obtained through electric and current vector densities on a metallic surface. The Kirchoff type representations and associated uniqueness theorems for each choice of field for which an embodiment is to be constructed provides a guide to what data need be sampled. The same information can be obtained through consideration of what is required to create a power series expansion for the mathematical model using the wave equation. Use of the wave equation and proper temporal and spatial application of the sample theorem provide the latter. For a complete specification of a mathematical model, depending on desired selected data, more than one type of transducer may be required (for example, through use of both velocity and pressure sampled microphones in acoustics, capacitors and/or inductors in electromagnetics). Seismic and hydrodynamic waves treatable with linear mathematical models exhibit analogous properties.

The choice for a signal vector representation should preferably be made on the basis of numerical efficiency in obtaining the selected information and upon the dictates of the appropriate uniqueness theorems. The most efficient are typically those for which the coordinate system reflects the symmetry of the antenna system and environment and for which the wave equation allows for the separation of variables. Example antennae of such "efficient" systems are illustrated in FIGS. 2-6. If the antenna presence significantly disturbs the propagation of the physical wave, then the model solution to the wave equation for waves of each incoming direction should preferably include the scattered wave as well. The signal vector should preferably as much as possible characterize the total wave field of both the incoming and scattered wave, as required by the selected information sought, for accurate results.

The antenna is the physical device containing transducers through which the fluctuations of the physical wave or induced "charge densities" are converted into electrical fluctuations. The specific form of the conversion process is assumed to be understood and linear, so that the superposition principle applying to composite waves of multiple sources can be tracked in the electrical fluctuations. Transducers define a map between physical wave field fluctuations $\Psi$ and voltage or current fluctuations $\sigma$.

After amplification, A/D conversion, signal conditioning, and digital bandpass filtering, any decimation, and possible Fourier transform (via FFTs) of properly windowed time series from each transducer channel, various representations of the signal vector are obtained from linear equations of the form:

$$\sigma_A = \sum_\alpha s_\alpha K_A^\alpha \quad j = 1, \ldots, N_s.$$

In this signal vector equation, $\sigma_A$ may be proportional to the $A^{th}$ component of the wave field, as might be in the acoustic application with use of microphones, or to surface charge or current density components, as in the electromagnetic case (related to the normal components of the electric field and the tangential components of the magnetic field at a conducting surface, respectively). The coefficient matrix elements $K_A^\alpha$ may coincide with the identity matrix if the signal vector represents the samples themselves, or may be the partial wave functions evaluated at transducer locations in the case of PWE representations of the signal vector.

Antennae with microphone transducers may be used for sensing pressure fluctuations (FIGS. 2A, 2B, and 6), with capacitive transducers for sensing surface charge densities (FIGS. 3A, 3B, 5A, and 5B), and with inductive transducers for sensing surface current densities (FIGS. 4A, 4B, 4C, 5A, and 5B). For the acoustic case, depending on the level of mathematical model the signal vector should define, the transducers might include both pressure and velocity type microphones. In the electromagnetic case, antennas may combine capacitive and inductive sampling using capacitive transducers 54 and inductive transducers 56. In the latter case when the two types of transducers 54, 56 are taken together, sampling would allow the polarization of incoming waves to be addressed as selected information and also allow field reconstruction given proper scattering models for the antenna structure. For the capacitive electromagnetic antenna of FIG. 3A, only the surface charge density sampled by transducers 34 of FIG. 3B, related to the normal component of the electric field at the surface, is required for determination of the directions of incoming waves, as an analysis of electromagnetic vector partial wave solutions can show. However, if signal reconstruction and or polarization information is required, additional sampling may be needed, as with using the inductive transducers of 56 of FIG. 5D, or a combination of one inductive transducer 56 and one capacitive transducer 54 set therein. Note that any of the antenna shapes may be used for acoustic or electromagnetic sampling in FIGS. 3A, 4A and 4B, and in FIGS. 5A and 5B and FIG. 6.

Other possible transducer types not specifically illustrated in the FIGS. above include hydrophones (sampling acoustic pressure fluctuations in fluids), geophones (sampling displacement velocities in seismic media), total field magnetometers (sampling magnetic fluctuations parallel to the earth's magnetic field), vector magnetometers (sampling fluctuations in the magnetic field components), and thermistors (embodiments sampling temperature fluctuations of oceanic internal waves). Magnetometers can also indirectly sample magnetic fluctuations in oceanic tidal, internal, tsunamic, and surface waves. The present invention is not limited to these types; it can be used with any transducer set sampling entities associated with waves mathematically modeled by linear equations. The transducers should preferably, however, be relatively small in comparison to the shortest wavelength envisioned in the process, so that samples may be associated with points on the closed transducer surfaces. Antennas with open surfaces may also be closed using suitable spatial windowing techniques analogous to those used in temporal sampling.

Depending upon whether the dimensionality of the signal vector coincides with the number of transducers utilized (generating utilized data chains) there exists a number of numerical methods that can be utilized for the inversion of the signal vector equation (Math works). Fast Fourier transforms, and matrix inversion and least square techniques have been employed in embodiments to invert the truncated partial wave expansions of different coordinate systems and physical waves. However, if the inversion process is not one-to-one, then there can be ambiguity in any subsequent signal reconstruction, with a potential for subsequent loss of information.

The system configuration sets the resolving power, the size of the antenna, the number of required transducers, and the dimensionality of the signal vector. A minimal configuration provides for the minimum number of transducers allowing for the definition of a signal vector (the number of its effective independent components-thereof), as required by the Nyquist criteria, and as discussed above this also establishes the resolving power. The latter, according to Rayleigh's criteria for "just resolved" follows when the maxima of a surface wave of one source is at the first null of that of another, a criteria developed for consideration in optics when two sources are present. The criteria coincides with the minimal condition set by the Nyquist sampling criteria, that there must be at least one transducer for each half wavelength along the surface. Here, we define the embodiment's resolving power, generally RP, is defined as the minimum number of resolvable sources on any closed circle centered on the antenna, the number being viewed as a function of such circles. More generally, the resolving power can be obtained from the signal vector/mathematical physical wave field model map, if maps are obtained by techniques other than that based upon the sample theorem, or through use of a signal vector library, as discussed below.

Assuming that any incoming direction is possible, the maximum projection of the wavevector k corresponds to the shortest wavelength at any point on the surface. Then, according to Rayleigh's criteria for "just resolved", the resolving power is: RP=2kR. But, this is just twice the number of wavelengths around the imaginary circle.

Accordingly, the Nyquist criteria also establishes Ns=2kR as the minimum number of required transducers to be uniformly aligned on such a circle, or the number needed per unit length if the transducer surface is not made of circles. Ns also coincides with the utilized dimensionality of the signal vector required for the highest frequency considered for a given direction, also according to the sample theorem. For a spherical surface, the number of required transducers and signal vector dimensionality is then $(2kR)^2$ if the resolving power is independent of loop orientation. If not every incoming direction is possible, the uniformity requirement for resolving power can be relaxed.

The considerations on resolving power and number of required sensors refer to the $\sigma_A$ of the signal vector equation for a scalar field. For vector and tensor fields, the result may differ. For electromagnetic waves, if the embodiment is needed to carry out a complete signal reconstruction, the number of required sensors is twice that above, as there are two polarizations. The result is then that of a sum over the two polarizations, which would be the same as that for a scalar field. Note that for propagating electromagnetic waves not all three of the components of the electric and magnetic fields are independent.

Data reduction consists of determining the selected information desired. It involves detection, direction finding, source classification through spectral decomposition, and signal reconstruction. It makes use of the superposition principle, pre-constructed libraries of mathematical models of possible sources, and certain geometrical entities. The latter include scalar products, signal surfaces, energy surfaces, detection surfaces, and adaptive directional maps.

The superposition principle regards the signal vectors s of received composite signals as the sum of those of possible sources $s_q$ and noise. This applies to any form of the signal vector, whether in the sample, frequency, partial wave, or integral form domains.

The most fundamental signal vector library is the directional library (DL), which is created and developed from signal vectors of possible directions and frequencies within the bandpass of interest. Let $s_k$ denote such a library element, the wavevector k corresponding to the incoming wave spherical polar angle direction $(\theta_k,\phi_k)$. Such a library can form the set of signal vectors of point sources at very long range, so that the modeled incoming waves are plane when they pass over the embodiment's antenna or are solutions to a scattering problem involving boundary conditions. The directional library can be constructed using analytical models and/or numerical models.

A signal surface is the surface defined by scalar products $s(\theta_k,\phi_k)=(S,s_k)$ between the signal vector of the sampled wave and library elements with the incoming signal vector for all wave directions k. The "radial" coordinate for each point on the surface corresponding to a DL element is the value of the scalar product corresponding to that direction of k. The metric for this scalar product is that which is appropriate for the signal vector representation. For the sample and frequency domains representations, the metric is diagonal, and each such diagonal element has unit value.

To each signal surface there corresponds an "energy surface" denoted by $s^2=|s(\theta_k,\phi_k)|^2$. Note that each library element can have its own "signal surface", defined by scalar products of the form $(s_k,s_{k'})$ for all possible wavevector directions k'. Each such element also therefore has its own "energy surface" $s_k^2$.

The "adaptive signal surface" is obtained by weighting the value of the signal surface for the direction of k by the inverse of the average of the noise background signal energy surface for the same direction, the average being taken over a number of temporal windows or realizations.

The adaptive signal surface is a distorted signal surface so that the direction associated with maxima in the signal surface's energy surface may not define the correct direction to a source. The "noise adaptive signal surface" reduces the contributions of noise sources to the signal surface for directions for which the average noise background is large relative to other directions. Such noise sources may include known sources whose presence is also known and understood but not of interest. Thus, the adaptive signal surface procedure is particularly useful for reducing the effect of background interference from known sources not of tracking interest. In such instances where distortion exists, an adaptive map should preferably be used to obtain the true directions for vectors associated with sources. This map will be defined below.

There are two classes of detection criteria. One is energy detection, appropriate for the situation when only a single source of interest is known to be present, or the source is already known to be well resolved, and the signal-to-noise ratio is good. The second is that of directional detection, useful when the presence of multiple sources are suspected or anticipated, the sources may not be all resolved, and/or when the signal to noise ratio is low.

There are also different levels to be reached in declaring a detection. The first is that of a probable detection. A probable direction is preferably automatically assigned to every detection. The notions for probable detection and probable direction apply regardless of whether the signal surface utilized is adaptive or not.

Energy detection is a threshold detection based upon the energy surface $s^2(\theta, \phi; \omega))$. If the maximum value for the latter as a function of $(\theta,\phi)$ exceeds that of the averaged noise background "energy" by some preassigned number, then a probable detection is declared. The preassigned number can be based upon a false alarm rate following from a model for expected detections from some noise model.

Directional detection utilizes signal and library direction vector ray direction properties. With directional detection, signal vectors (including directional library vectors) are normalized such that their signal surfaces have value unity for the direction for which the corresponding energy surface has a maximum value. A probable detection is declared if the absolute value of the difference surface resulting from the difference between the signal surface of the incoming wave field and that of a directional vector integrated over all directions to points on the difference surface is below some threshold. Thus, the detection is based upon a model for the shape of the signal vector of a given source, instead of upon the signal level relative to some background and threshold.

For energy detection, the directions of the probable sources are those for which the signal energy surface has maximum values exceeding the threshold. For directional detection, the assigned probable direction is that for which the total "energy" of the difference surface corresponding to a particular direction vector has its minimum value. Probable directions associated with the adaptive signal surface are preferably assigned only after the adaptive map is employed.

The adaptive map transfers the directions assigned to sources of signal surfaces constructed using the adaptive scalar product to true directions. The directional criteria can result in the signal surface and adaptive signal surface assigning different directions to the same incoming signal detected if the time averaged noise background "energy surface" is not isotropic. The map can be computed off line by noting the adaptive signal surface directions assigned to the modeled incoming plane wavevector directions used to define the directional library vectors using the two metrics, and constructing a table lookup for this correspondence.

For "energy detection," the direction assigned to the probable detected source is that of the maximum of the signal surface, the value of (θ,φ) belonging to the vector k of the $s_k$ defining the signal surface maxima. This assignment can be made to other maxima provided those are at least just resolved, according to the criteria discussed above.

For directional detection, the assigned direction is that belonging to the $s_k$ producing a minimum value for the signal vectors satisfying the criteria for probable directional detections, provided the minimum is at least just resolved from other minima.

If multiple sources are encountered, it is preferable to ascertain whether they are resolved, and if so, incorporate the resolving capability into the detection criteria. A local resolving power as a function of direction is ordinarily readily determined.

The local resolving power is found by observing the functional dependence of the scalar product $(s_k, s_k')$ and determining the angular separation $\gamma_{RP}$ between the directions for which this scalar product has its maximum value and its first minimum away from this central maxima. The local resolving power is then defined by: $LRP = 2\pi/\gamma_{RP}$, where $\gamma_{RP}$ is the angle just described, hereafter referred to as the resolving angle. Conceptually, LRP is typically an estimate of the number of equally spaced sources that could be resolved along a circle. For a two dimensional transducer surface, the local resolving power can be defined as the geometric mean of the local resolving powers for two orthogonal directions.

The detection rate surface is the surface defined by the rate at which detections occur per unit solid angle, as defined by probable directions, the rate determined over a number of data collection windows. Noise interference effects generate detections even when sources of interest may not be present. The detection surface for background noise alone is denoted by $DR_N$, and in the presence of signals of interest, by $DR_{S+N}$. The detection rate surfaces of probable detections can be defined after a sufficient number of realizations has taken place to yield a sufficiently smooth function of the spherical and polar angles.

Detection measure surfaces provide for the declaration of a detected source. One such measure could be the surface defined by the noise averaged detection ratio $(DR_{S+N} - DR_N)/(DR_{S+N} + DR_N)$. This definition requires that a number of realizations be employed to compute the average, and that the ratio be considered a function of angle.

Declaration of a detected source is made if the measure function of direction has maxima exceeding a detection threshold (DT); if the shape of the maxima is judged consistent with noise properties; and if the angular distance between such maxima is consistent with the embodiment's resolving power. Thus, the concept of resolving power plays a role in the declaration of multiple source detections.

In some instances, such as when the "energy" (in the sense discussed above) is sufficient and only one source is known to be present, a detected physical source can be declared directly. The detection measure-based procedure can potentially permit detection at the background level less the antenna array gain, even when multiple sources are present.

Signal averaged detection follows from a different process. It is particularly applicable to impulse signals such as those of projectile shock and blast waves, and in estimating the directions of continuous signals with identifiable spectra, such as those associated with harmonic chains of piston engines.

For impulse waves belonging to short duration single occurrences, the detection rate surfaces and temporal averaging processes described above may not be particularly useful. But such impulse signals are broadband in nature, and the signal surfaces can be averaged over frequency. The noise fluctuations of the different frequencies have different signal surface oscillation wavelengths, which average out in the summation process, while the surface functions at their maxima are normalized to unity and add coherently within the resolving angle. In this type of average, the normalized signal surfaces (normalized by their maxima as described above) are summed and divided by the total number of spectral components involved. Either the energy detection or directional detection (appropriately modified) process can be applied to the result, the averaging process also can be limited to frequencies having probable detections. This technique has been found to yield excellent results in detecting gunfire and shooter directions, as well as those shock waves associated with the projectile. It will also be useful in the tracking of turbine engines, which also have broad band spectra. The detection rate surface process could also be applied to the spectrally averaged signal surface if the events are repetitive.

In the case of piston engine harmonics, the signal averaging summation is carried out only for elements of the harmonic chain. This is a useful technique since the Doppler shift of elements of the harmonic chain yields another harmonic chain (with different spacing for chain elements) and direction finding, and detection of individual elements of the chain may not yield accurate results if the signal levels are too low. Again, the signal surfaces involved must be normalized to unity in the direction they have their maxima.

For sources at very long range, or for where they are at rest, or when their directions are changing little with time, the properly normalized signal surfaces could be averaged over data collection temporal windows. Also, an average over both temporal windows and frequency could be made, depending upon the anticipated nature of the sources and the environment. Again, detection rate surfaces based detection criteria are applicable.

If the noise based adaptive signal surface is used in signal averaged detection, it should preferably first be mapped into a standard signal surface using the adaptive map for each frequency before signal averaging takes place, if the noise background changes with time. This is because the signal surfaces of different frequencies may have differing distortions.

The choice of which signal detection process is used depends upon the anticipated signal to noise ratio, whether or not the signal has broad spectral content or a harmonic chain, and the duration of the signal. The signal surface averaging processes are particularly useful because the effects of random sources and fluctuations generated by random processes affecting paths tend to average to zero, in sharp contrast with averages involving "energy" type functions. Source directions come with the detection processes.

For noise averaged detection, the assigned direction are the maxima of the detection rate measure surface meeting the detection measure threshold, provided the maxima is at least just resolved from other maxima as per the discussion on noise averaged detection above.

For signal averaged detection, the direction assigned is that of the maxima of the signal averaged signal surface exceeding some threshold, as with directional detection. There can be more than one such direction if there is more than one maxima exceeding the detection threshold, provided the maxima involved are just resolved.

For noise averaged signal averaged detection, the assigned direction is that of the maxima in the measure surface. There can be more than one such assigned direction if there are other maxima meeting the detection threshold criteria, provided those maxima are at least just resolved.

Source spectral content is established once the $s_q$ have been determined for a resolved source. Given the $s_q$ weighted of their contributions as defined by the scalar products defining signal surfaces, the $s_q$ can be transformed to the frequency domain. The frequency domain $s_q$ coincides with the Fourier coefficients of the incoming time series data of the $q^{th}$ source, and its spectra is defined. This amounts to executing the signal vector equation with the CA as the result and the weighted $s_q$ as input. The resulting $|\sigma_{A|}|^2$ then provides the power spectra. The source level of a particular source q can be estimated from a propagation model for the given environment, taking into account attenuation and geometrical spreading.

Signal reconstruction and signal information content are carried out by transforming from the derived representation for the weighted frequency domain $s_q$, and then using the inverse Fourier transform (discrete) to go to the equivalent sample representation of the $s_q$. This must be carried out for a series of overlapping temporal data collection windows, where in the set of field values τ indexes the sample set or sample window of the $j^{th}$ transducer at the listed coordinates for each time $t_k$ of the window. If this is done for a series of overlapping temporal windows, windowing functions $W(t_k-\tau)$ can be employed to construct from these sets a smooth time series over an extended time period. This process permits determination of information content or reconstruction of received signals using digital signal generators carrying out digital to analog conversion, provided the embodiment bandwidth is sufficient for the resolved signal and all significant spectral components of the resolved signal are included.

If the proper set of transducers are employed in conjunction with the wave equation or surface integral expressions of the Khirkoff type, as per associated uniqueness theorem criteria, a mathematical representation of the field in the neighborhood (or vicinity) of the antenna can be carried out. In this case selected, information can be obtained after the mathematical model of the wave field has been constructed from obtained signal vectors. This can be done using the well known Neother's theorem techniques applied to mathematical model Lagrangians to obtain energy and momentum vector densities (Roman) explicitly carrying directional and frequency content.

Note that it is not necessary to temporally sample at twice the highest transmitted frequency to get desired modulation information as selected information. The processed signal need only be heterodyned and sampled at a rate of at least twice the highest modulation frequency, since the signal vector equation can be scaled so that all the transducer signals are sampled relative to one.

Several example embodiments and deployments are illustrated in FIGS. 2-14, but it is to be understood, however, that the present invention is not limited to the examples and embodiments herein disclosed.

For each antenna illustrated, transducer spacing depends upon the desired resolving power, which should be compatible with the number of transducers allowed. The resolving power need not be the same for all directions.

For a spherical antenna having spherically symmetric resolving power, the Nyquist criteria requires $N_s=(2kR)^2=(LRP)^2$. The partial waves defining signal vector components can be the spherical harmonic-based set of consisting of the $j_l(kR)Y_{lm}(\theta,\phi)$, where $j_l$ denotes the Bessel function, $Y_{lm}$ the spherical harmonics, k is the wavenumber, and R is the spherical radius. The signal vector index α consists of the indices k, l, and m for each frequency. The series is truncated for a maximum value $l_{max}=(LRP-1)$. The Fourier and spherical harmonic representations for the signal vector are equivalent. Near equal angular spacing of transducer elements can be achieved by having element planes with near equal polar angle spacing containing groupings of (2l+1) transducers, equally spaced within.

Figure 2B:
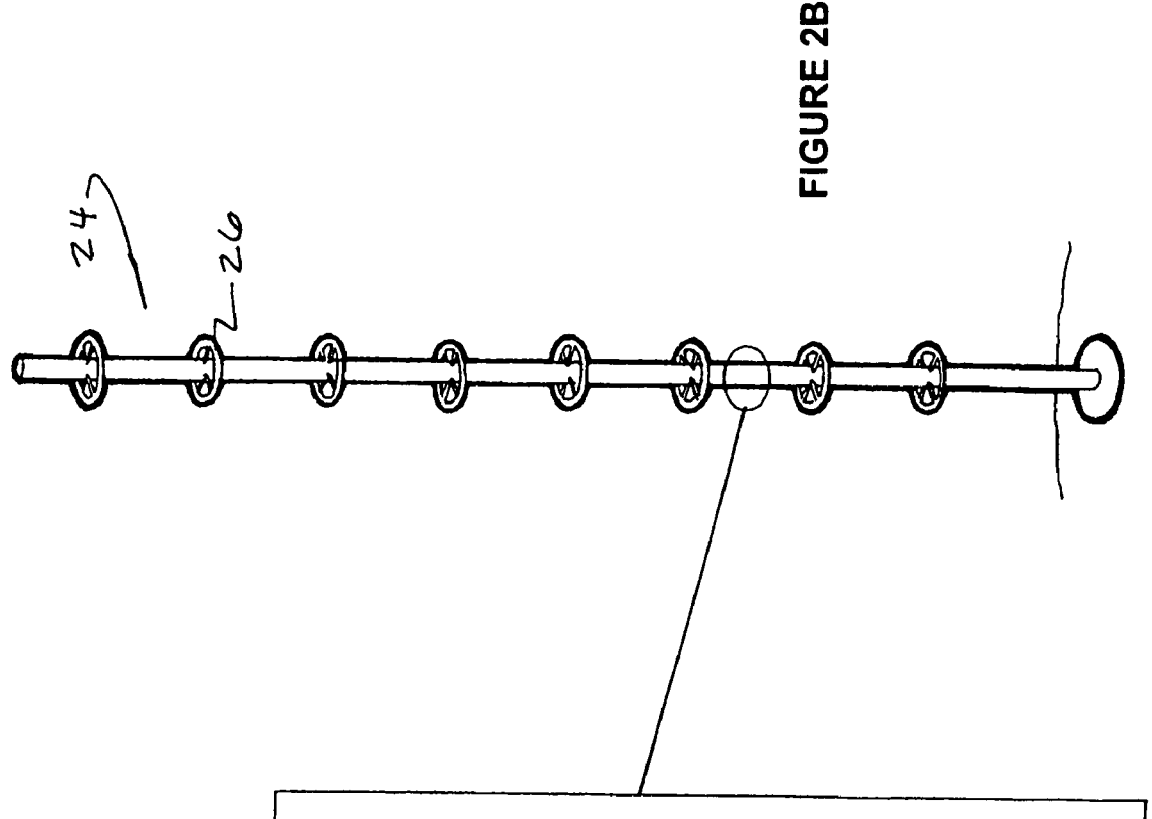
FIG. 2B is a perspective view of a cylindrical three dimensional (3D) acoustic array constructed in accordance with the present invention supporting signal vector processing.
Figure 2A:
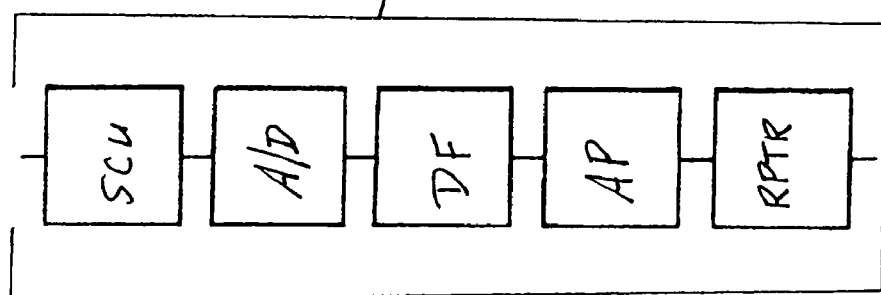
FIG. 2A is a schematic representation of a spherical microphone antenna constructed in accordance with the present invention supporting signal vector processing.
Figure 2A:
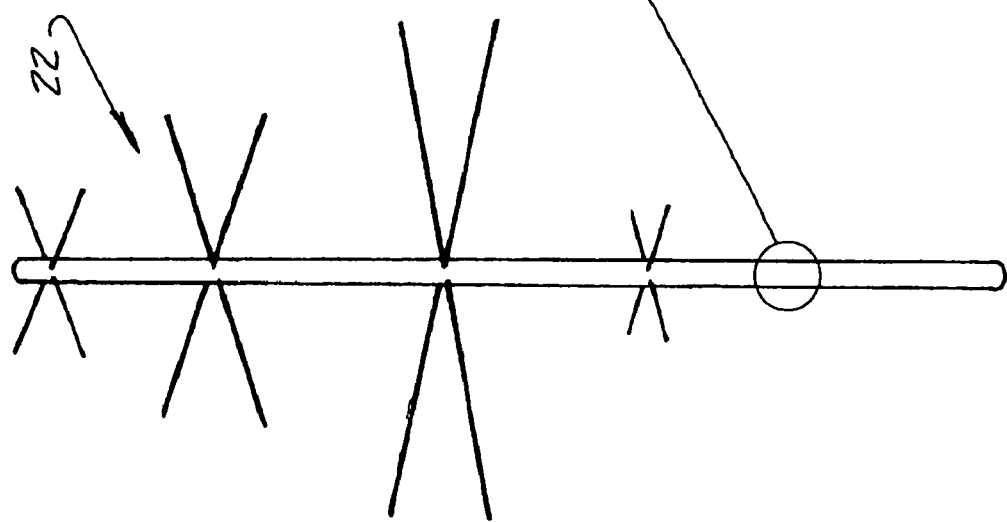

The spherical antenna, generally 22, of FIG. 2A is of the type which is appropriate for acoustic microphone transducers obeying these placement rules. The insert in FIGS. 2A and 2B indicates generally how the electronics, such as SCU, A/D, DF, AP, and RPTR, can be mounted within the mast. With thin structural elements and transducer dimensions relative to a wavelength, it has not yet been found necessary to include the influence of the element scattered waves on the transducers. Other coplanar grouping of transducers could involve $\sqrt{N_s}$ equally spaced transducers in $\sqrt{N_s}$ planes, with equal polar angle spacing, but the result does not give near uniform resolving power for all directions.

For the cylindrical antenna 30 of FIG. 2B, the partial waves consist of products of ordinary Bessel functions of the radial coordinate, the exponential function along the axis, and harmonic functions for the bearing coordinate, if a cylindrical partial wave representation is used to define a signal vector. This antenna would require windowing in the axial coordinate in order to simulate the condition that a closed surface contains the transducers, since practical systems cannot be infinite in length. A maximum spacing of $\lambda/(2 \sin \phi)$ between transducers is preferably required along the cylinder's axis, where λ is the wavelength at the highest frequency and φ is the highest anticipated angle of elevation over the plane of a ring. For a bearing resolving power of LRP=2ka, the number of microphones along equally spaced rings should be equal to or larger than 2ka, where k is the wave number of the highest frequency to be studied and a is the cylindrical radius, and consistent with the above, 2ka such rings 26 should be used at a minimum. Note that the first and last ring need not be at the "ends" of the cylinder where the windowing function vanishes. With this type of configuration, generally there is an equivalence between the Fourier and cylindrical partial wave representations of the signal vector.

Figure 3B:
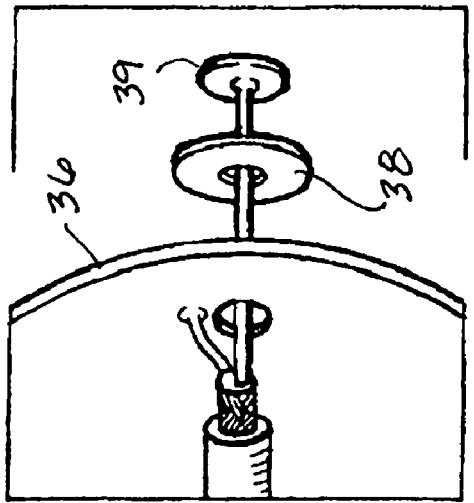
FIG. 3B is a partial perspective view of a capacitive transducer constructed in accordance with the present invention for sampling electromagnetic spherical shell antenna surface charge densities at points on the surface.
Figure 3A:
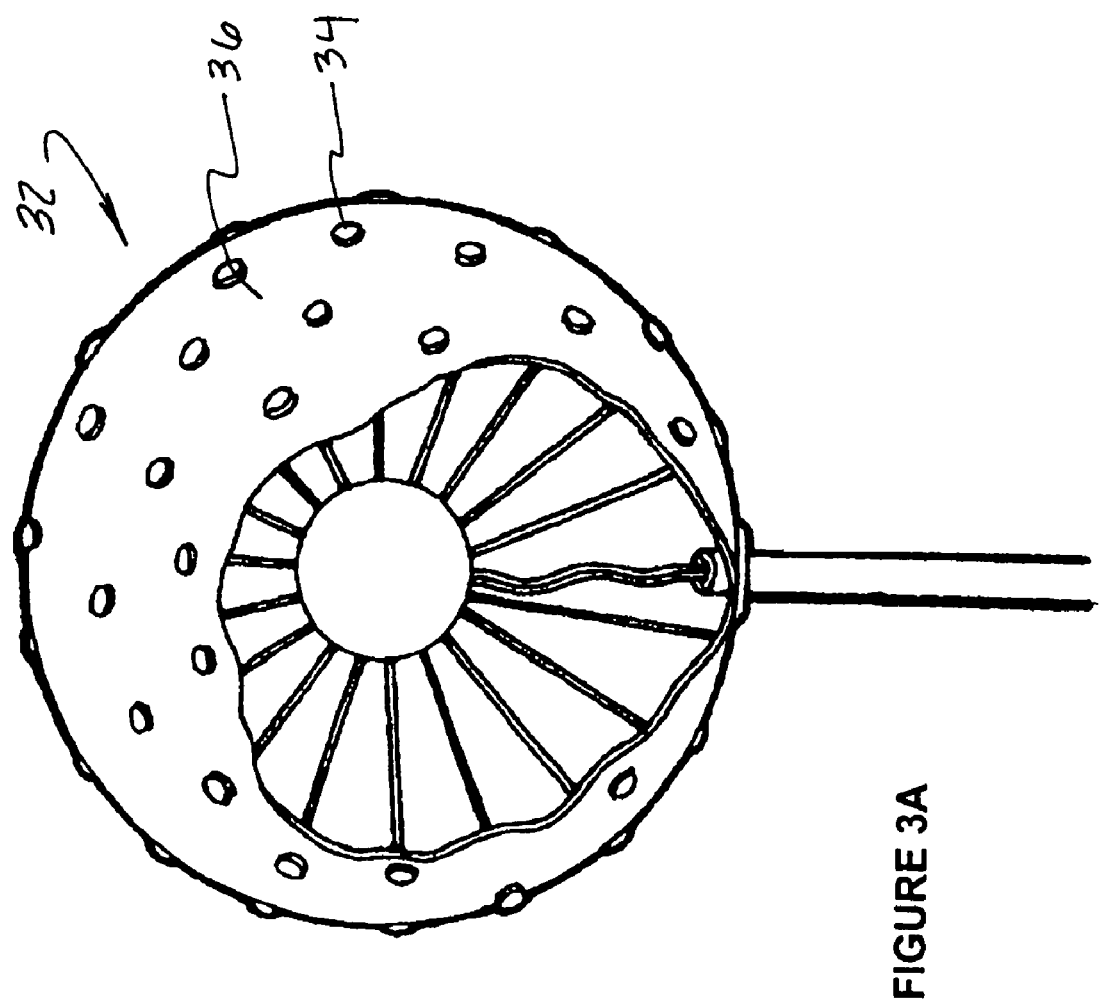
FIG. 3A is a perspective view, with parts cut away, of a charge density sampled electromagnetic spherical shell antenna constructed in accordance with the present invention supporting 3D signal vector processing.

FIG. 3A illustrates a spherical electromagnetic antenna, generally 32, with capacitors, generally 34, whose construction is illustrated in FIG. 3B, having an insulator 38 and another plate 39. Capacitors 34 can have one capacitive transducer plate being the surface 36 of the highly conducting metallic spherical shell. The same transducer placement considerations apply as discussed for FIG. 2A. The capacitor's impedance over the bandpass should be consistent with electronics and sampling requirements on time constants, and the capacitors should preferably be small in comparison to a wavelength. At cell phone frequencies, such antennas are capable of high density transducer placement and resolving power and portable for placement with individuals or on vehicles.

Figure 4B:
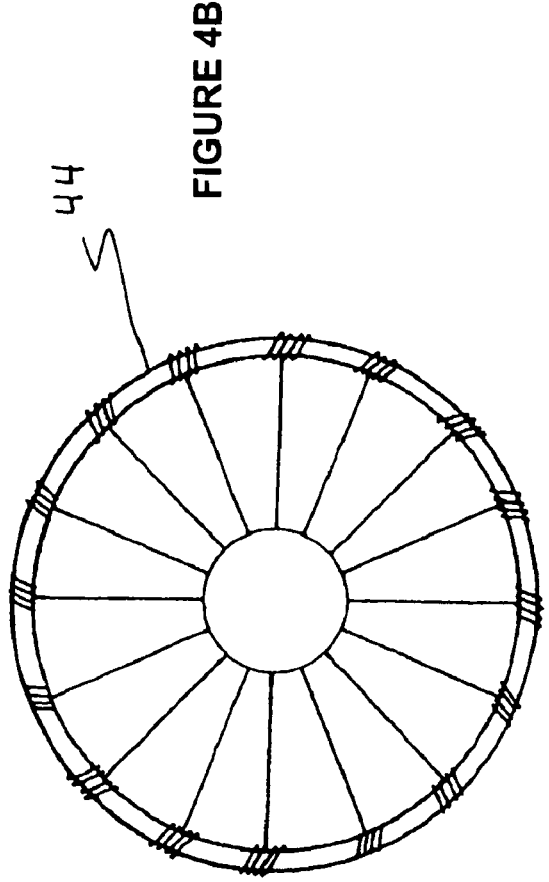
FIG. 4B is a plan view of a sub array ring element constructed in accordance with the present invention of the antenna in FIG. 4A, which can also serve as a planar two dimensional (2D) "bicycle wheel" antenna when the antenna of FIG. 4A operates in planar mode, or as a stand alone antenna operating as a 3D antenna in planar mode.
Figure 4C:
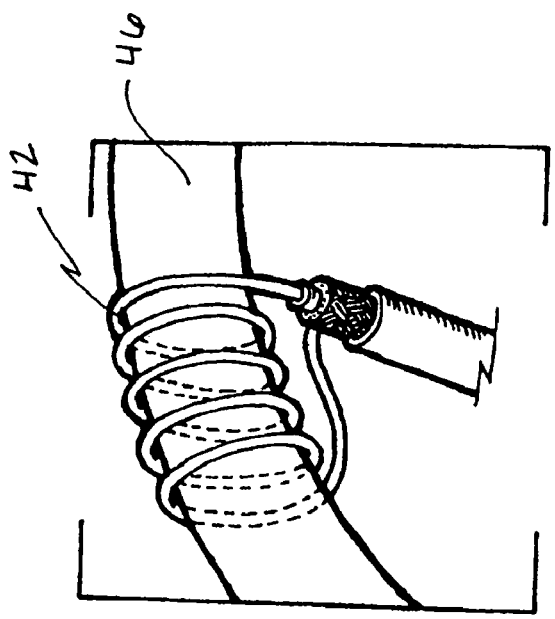
FIG. 4C is a partial perspective view of an inductive transducer for measuring the electric current at points along the sub array ring element of FIG. 4B and the rings of FIG. 4A.
Figure 4A:
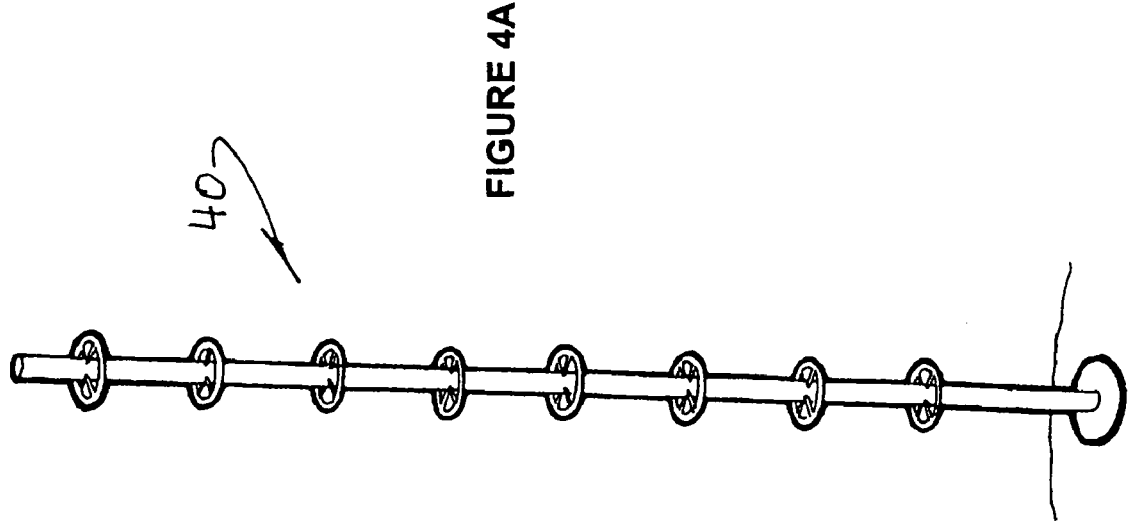
FIG. 4A is a perspective view of a current-sampled electromagnetic 3D vertical whip antenna constructed in accordance with the present invention with ring sub array capable of supporting 3D signal vector processing for elevation angle and bearing determination.

FIG. 4A is an electromagnetic cylindrical ring antenna 40, the electromagnetic counterpart of the antenna of FIG. 2B. The transducers are inductors 42 as illustrated in FIG. 4C and are equally spaced on rings 44 (FIG. 4B). The inductors 42 are insulated windings over the highly metallic ring surface 46, as illustrated in FIG. 4C. Inductor axial and angular placement is the same as the transducer placement as per the discussion on FIG. 2B. The inductors should preferably also be small in comparison with utilized wavelengths and their electronic impedance should be consistent with electronic impedance requirements over the bandpass. At cell phone and other high frequencies, such antennae can have high density, high resolution, and be mounted as "whip" antennas above vehicles.

Use of high density antennae also permits adaptive reduction of vehicle noise using the adaptive noise metric, as discussed above, or noise reduction using Gram-Schmidt orthogonalization applied to the signal vectors. Such antenna when mounted as tall structures could potentially support highly accurate systems for measuring elevation angle as well as the bearings of low elevation angle incident radiation. Note that this type of structure, with microphones or hydrophones replacing inductors 42, also can be used as acoustic systems in air and water. In the latter case, when embedded in the ground with hydrophones, as in a well, they can be used to map noises in underground facilities, when proper modeling and boundary conditions are employed. If the overall antennae dimensions of FIGS. 4A and 4B are small compared to utilized wavelengths, antenna scattering need not be accounted for in acoustics, but must be accounted for in the electromagnetic case when metallic surfaces are utilized. Some scattering models exist in the literature reference above.

Figure 5B:
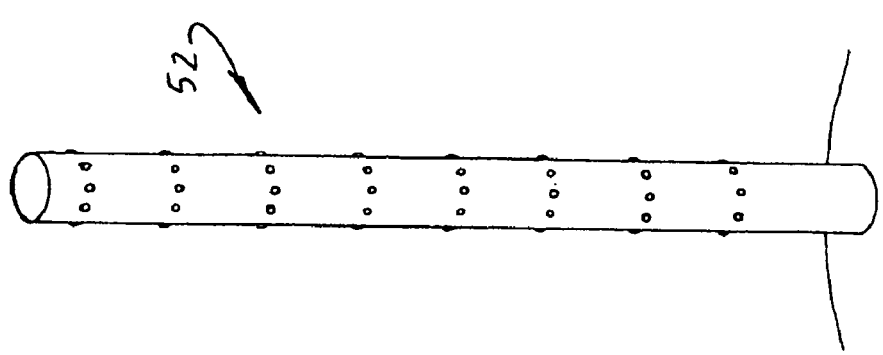
FIG. 5B is a schematic representation of a cylindrical shell antenna constructed in accordance with the present invention having capacitive and inductive transducers supporting 3D operation, planar modes of operation, signal vector processing and/or possibly reconstruction of electromagnetic signals; and with microphone and/or hydrophone transducers could also operate as a submerged and/or towed antenna for scanning sonar and tracking applications.
Figure 5C:
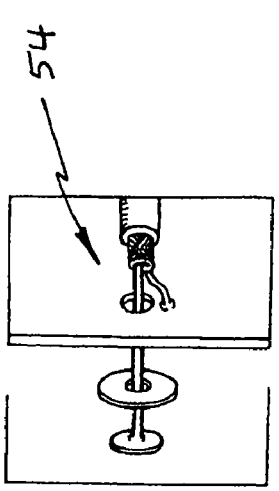
FIGS. 5C and 5D are a set of partial perspective views of capacitive and inductive transducers, respectively, constructed in accordance with the present invention for use on the antennas shown in FIGS. 3-5B for measuring electric charge and current vector components at selected points on electromagnetic shell antennas.
Figure 5D:
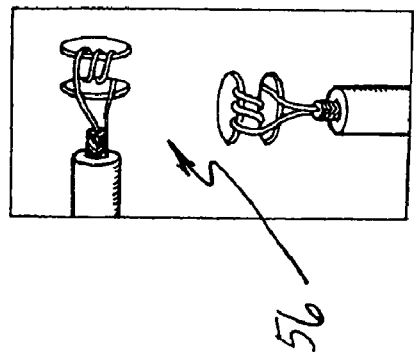
Figure 5A:
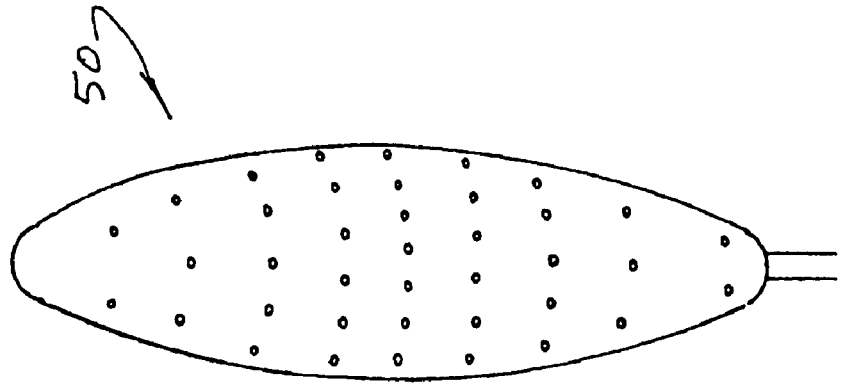
FIG. 5A is a schematic representation of a prolate spheroidal shell antenna constructed in accordance with the present invention having capacitive and/or inductive transducers supporting 3D operation, planar modes of operation, signal vector processing and/or possibly reconstruction of electromagnetic signals; and with microphone and/or hydrophone transducers, could also operate as a submerged and/or towed antenna for scanning sonar and for tracking applications.

FIGS. 5A and 5B depict an ellipsoidal, or prolate spheroidal, antenna, generally 50, and a cylindrical shell antenna 52, respectively, associated with separable coordinate systems and also capable of supporting PWE based signal vectors. They can be used with hydrophones for water applications, with microphones for acoustic applications in air, with capacitive transducers 54 as in FIG. 5C, or with inductive transducers 56, as shown in FIG. 5D. In the case of inductors, with two "polarizations" for the inductive transducers as 55 in FIG. 5C, such an antenna can determine the polarization of incoming waves and be used for electromagnetic signal reconstruction, as discussed above.

With the antennae 50, 52, and the spherical shell antenna 32 of FIG. 3A, the modeling library signal vectors should include shell scattering effects for both electromagnetic and acoustic waves. If desired, the electromagnetic transducers could be replaced with acoustic microphones.

A theoretical analysis shows that the signal vectors of incoming electromagnetic waves at long range are characterized by the expansion coefficients of vector spherical harmonics, so that capacitive transducers suffice if the desired selected information is confined to tracking information. The sampled charge and current densities are those of signals including the possible polarizations. If the selected information also requires wave polarization information or individual signal source reconstruction, then preferably, the complete set of transducers 54, 56 depicted in the FIGS. 5C and 5D can be employed. The spherical antenna would use spherical Bessel functions and vector harmonics for its vector partial wave expansion, while the ellipsoidal antenna 50 could use "corresponding" prolate spherical coordinates and functions. If the minor axis of the ellipse is chosen to be the one rotated about, then the oblate spheroidal coordinates and the corresponding PWE would be used. The complete number of required transducers 54, 56 is double the number required in the acoustic case for the spherical antenna of FIG. 2A for the same wavelength, a consequence of the two polarizations. In any case, transducer spacing should preferably be determined by the maximum projection of the wavevector for the highest frequency onto the surface containing the transducers 54, and the spacing should preferably be less than or equal to half the length of the shortest corresponding projected wavelength.

Supporting electronics can be built into the antenna masts and/or spheres and/or ellipsoids as desired. Such antennas are very practical for electromagnetic frequencies running from short wave and VHF to cell phone frequencies. The spheroidal antenna 50 would use vector wave solutions as well, but would employ cylindrical vector harmonics as in Stratton (referenced above), the vector harmonics and the vector wave solutions involving derivatives of the aforementioned functions.

With the capacitive antenna, the transducers 54 and 34 sample surface charge densities on the surface, while with the inductive antenna surface, surface current densities are sampled. Complete scattering solutions for incident plane waves with the proper polarizations can yield the necessary connection between incoming fields of sources at long range and induced surface charge and current densities. The connection is defined by well know boundary conditions relating the surface charge and current densities to the normal components of the electric field and the tangential components of the magnetic field. For the electromagnetic antennas mounted on the metallic surfaces, the capacitive and inductive transducers should also have dimensions and structure compatible with the impedances required by the electronics and sampling criteria, i.e., time constants associated with the sampling.

Figure 6:
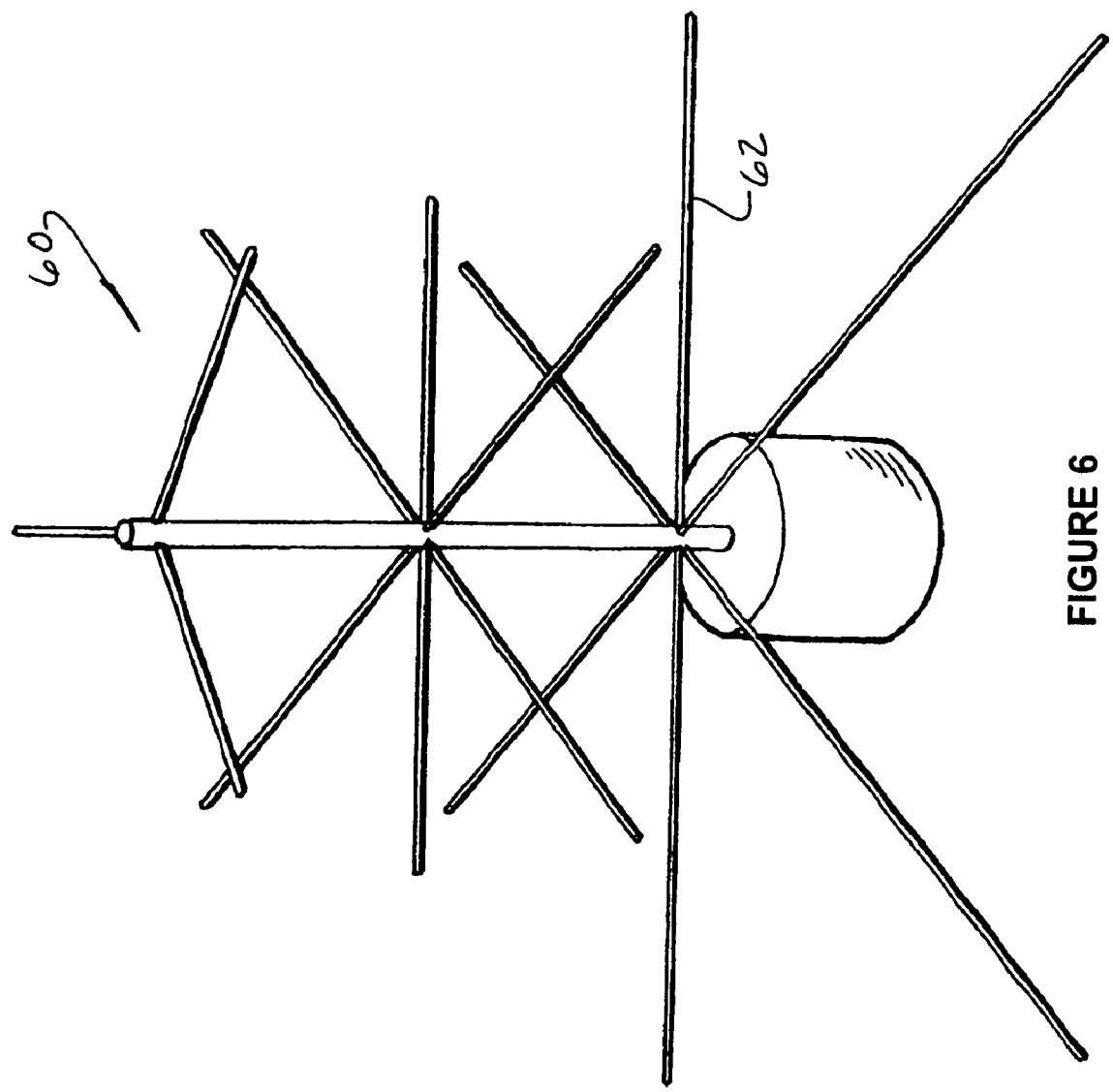
FIG. 6 is a perspective view of an acoustic "tree" array configuration constructed in accordance with the present invention and designed to account for the coupling of direct and reflected waves by the surface on which the antenna is mounted and supporting 3D signal vector processing.

FIG. 6 illustrates an antenna 60 suitable for treating coupled incident and earth surface reflected acoustic waves in regions where the earth and/or mounted surface is flat on a scale large in comparison to a wavelength. Again, use of thin structural elements 62 can make it unnecessary to determine the waves scattered by the antenna. The coupling of the incident and surface scattered waves introduces relationships between components of the signal vector, reducing the dimensionality of the processing space and decreasing computational demand.

Figure 7:
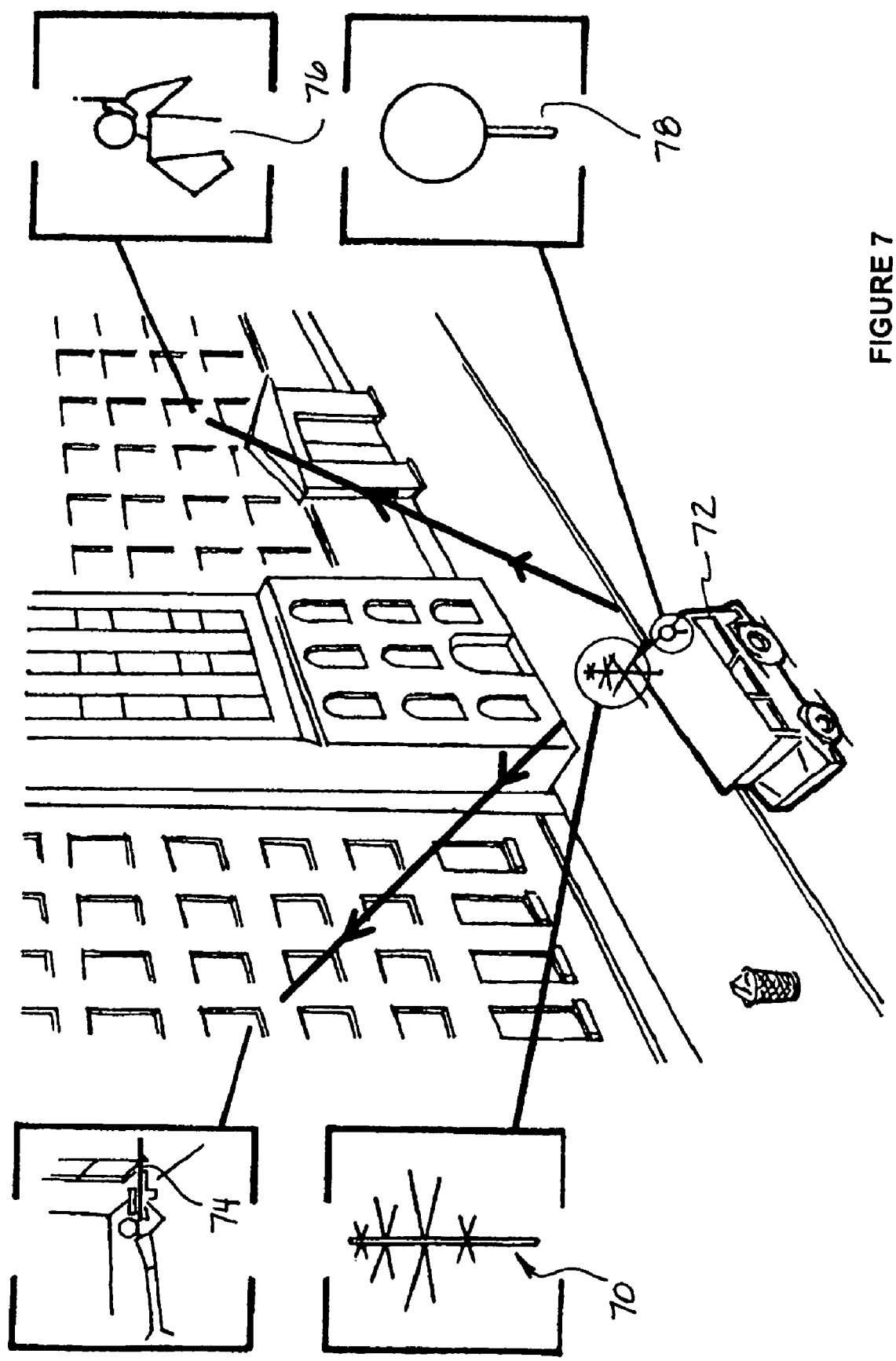
FIG. 7 is a schematic representation of electromagnetic and acoustic arrays of the types depicted in FIGS. 2-5B mounted on a vehicle for deployment in an urban environment and illustrating the application of the present invention to locate snipers and cell phones when used with a traceback program.

FIG. 7 illustrates an application of the present invention, wherein where small high density antennae, generally 70, can be deployed on a vehicle 72. Shock, blast, and electromagnetic waves typically have short wavelengths in comparison to vehicle dimensions, and higher frequencies can be utilized. For a given natural local resolving power LRP, the antenna size can be reduced. A traceback program tracking back along ray propagation paths can be used to locate resolved sources of gunfire 74 and shock waves, provided that contour map data is also supplied for the environment. Selected information can also be obtained for cell phones 76 using electromagnetic antenna 78.

Figure 8:
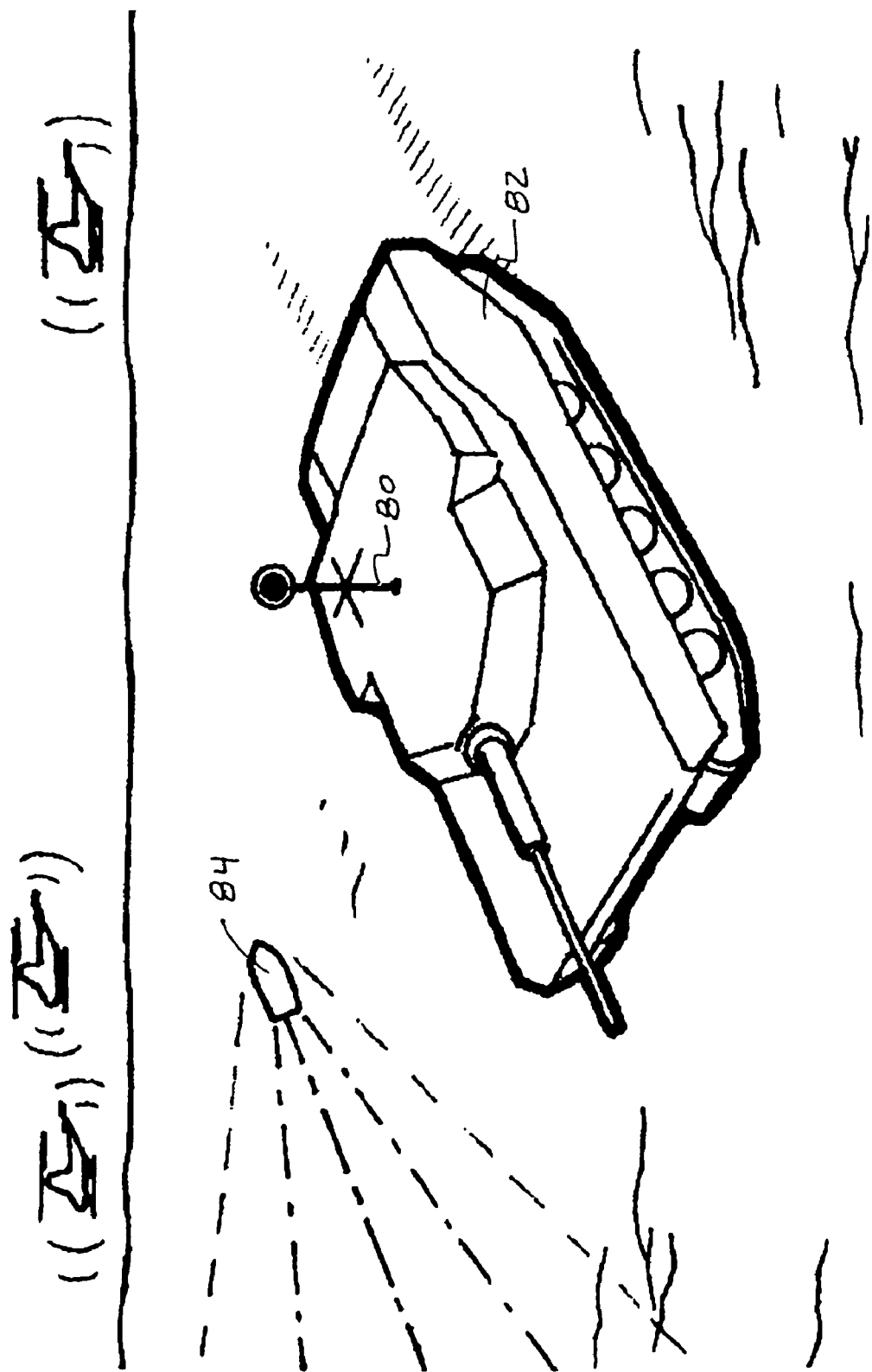
FIG. 8 is a schematic representation of acoustic and electromagnetic (EM) high density array deployed in accordance with the present invention on a vehicle and capable of determining the direction of incoming fire, of tracking helicopters and/or vehicles, and for direction finding and tracking of electromagnetic sources such as VHF/UHF hand held radios and cell phones.

FIG. 8 illustrates deployments of the present invention where high density, high resolution antennae, generally 80, can be used with signal processing to help null out certain noise, such as noise from a vehicle 82, as in removing vehicle-generated noise coming from the vehicle 82 itself. Use of the noise metric and the associated mapping technique would allow tracking of sources of interest, particularly shock and blast waves, at wavelengths which are short in comparison with vehicle size, even with significant vehicle noise. Small spherical and cylindrical high density arrays can be useful on relatively noisy vehicles. Traceback programs can also be employed for the location of sources of projectile 84 firings, given contour map or triangulation data. For lower acoustic frequencies, microphones and electromagnetic transducers can be placed along the body of the vehicle. In this case the boundary conditions associated with scattering off the vehicle surface should preferably be accounted for in the wave propagation model used to construct the directional libraries, as is done with the electromagnetic antennas shown in FIGS. 3A through 5B. The noise metric and associated adaptive mapping techniques can be employed to obtain true directions.

Figure 9:
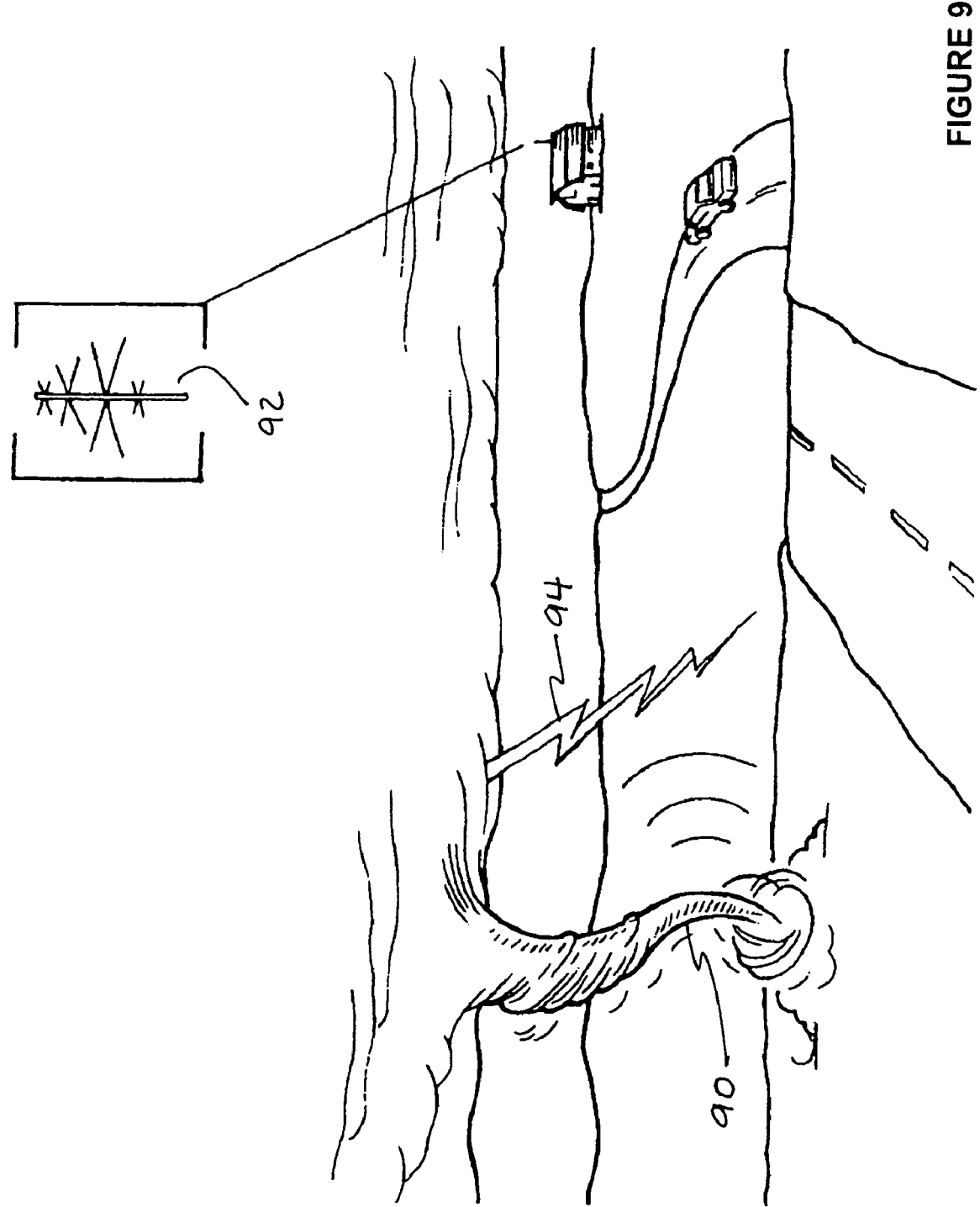
FIG. 9 is a schematic representation of farmhouse or barn mounted arrays constructed in accordance with the present invention for detection of severe storms, for providing early warning for tornadoes and thunderstorms, and for announcing the arrival of visiting vehicles.

Other useful antenna system deployments can be made in accordance with the present invention and can include severe storm 90 tracking with building-mounted spherical acoustic and electromagnetic antennas, collectively generally 92, as depicted in FIG. 9. Combined acoustic and electromagnetic systems can provide range data for near simultaneously resolved thunder and lightning 94 bursts, while visitors can be tracked and monitored with acoustic arrays and traceback programs.

Figure 10A:
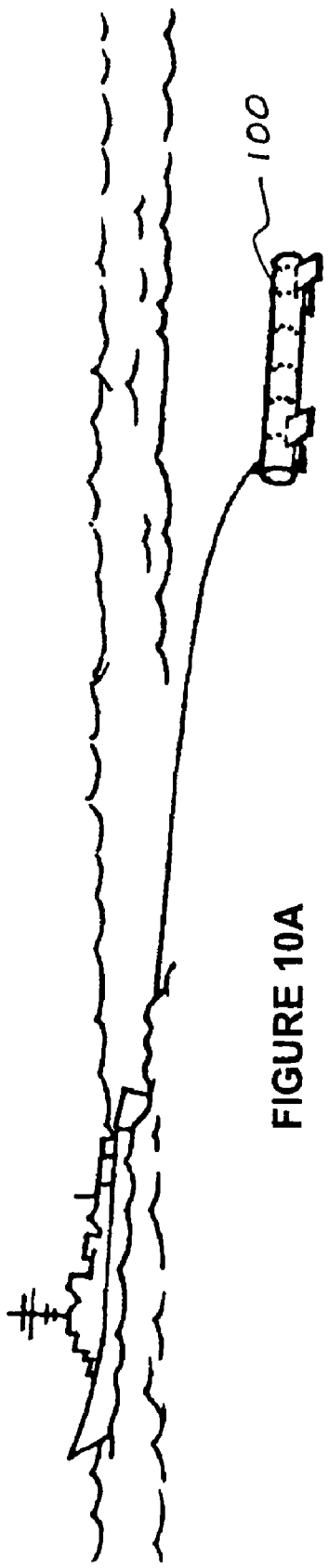
FIG. 10A is a schematic representation of an active towed transducer array constructed in accordance with the present invention for application as a scanning sonar to 3D image of submerged objects and for allowing observation of objects as the towed transducer array approaches, passes, and departs.
Figure 10B:
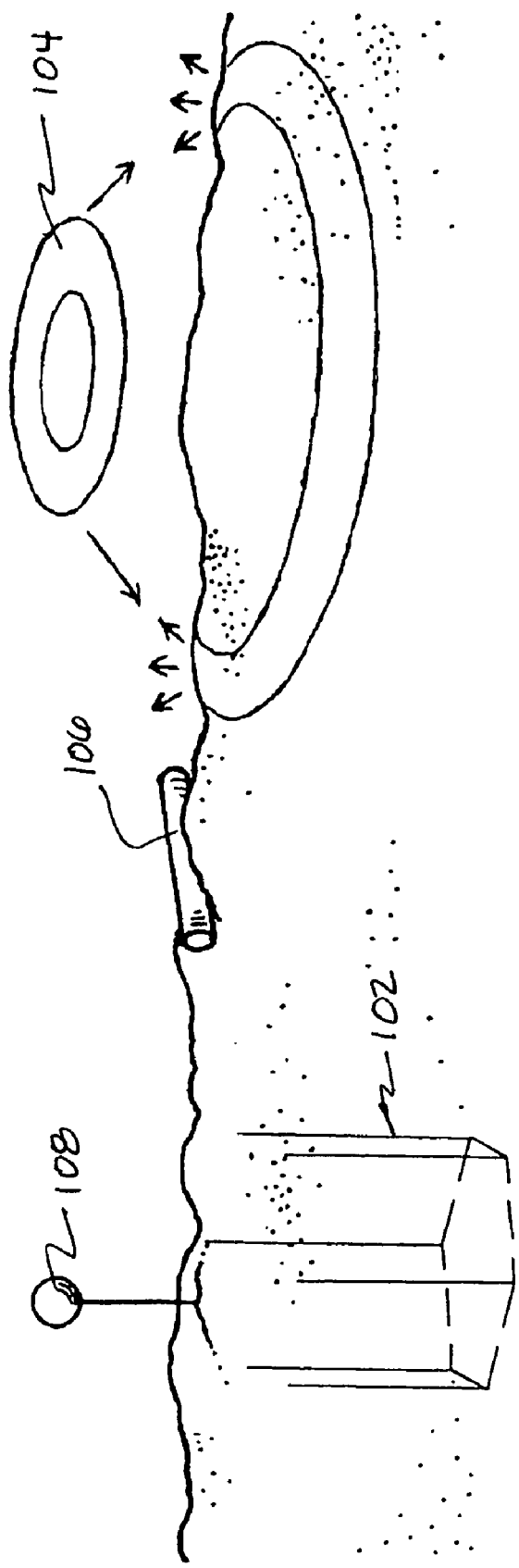
FIG. 10B is a schematic representation of a fixed bottom-mounted or surface-suspended cylindrical hydrophone array constructed in accordance with the present invention for monitoring and tracking of shipping, internal waves, and/or tsunamis which may employ hydrophones, geophones, and/or vector magnetometers.

FIG. 10A depicts a towed, or, surface-suspended antenna array 100, and FIG. 10B depicts a bottom-mounted antenna array 102, with both being constructed in accordance with the present invention. Such a system can employ hydrophones, thermistors, or magnetometers for detecting ship engines, internal waves of swimmer delivery vehicles, tsunamis, shipping traffic, etc., depending upon antenna and wave scales. The towed antenna 100 for side acoustic scan sonar applications of the types illustrated in FIGS. 5A and 5B, with electromagnetic transducers therein having been replaced by acoustic transducers, is illustrated in FIG. 10B. Such side scan operations, using active pulses 104, can provide 3D views of submerged objects, such as mine 106 on the bottom or a tethered mine 108.

A spherically symmetric and/or "tree" antenna 110 based system, constructed in accordance with the present invention, for a harbor security monitoring is depicted in FIG. 11A, along with a cylindrical monitoring array 112 as shown in FIG. 11B. The cylindrical antenna 112 may serve as an acoustic or hydrodynamic wave antenna (surface, internal, etc.), and could monitor for self-propelled and/or swimmer vehicles 114 as well.

Figure 12:
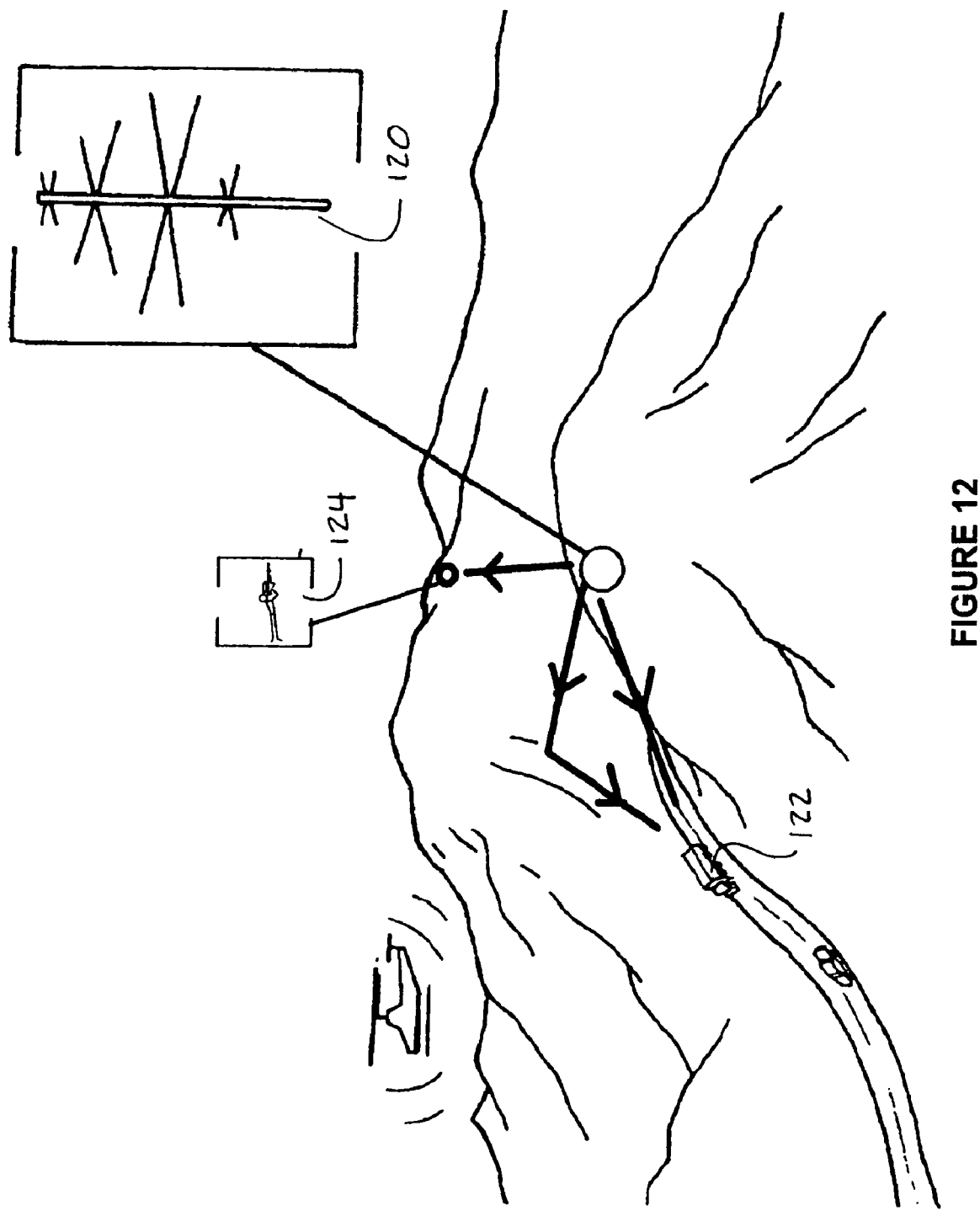
FIG. 12 is a schematic representation of a mountain deployment of a three dimensional acoustic spherical array constructed in accordance with the present invention of the type shown in of FIG. 2, having bearing and azimuth capability for traffic and/or projectile and/or aircraft tracking and monitoring, and for location of sources, using a incident ray traceback program.
Figure 13:
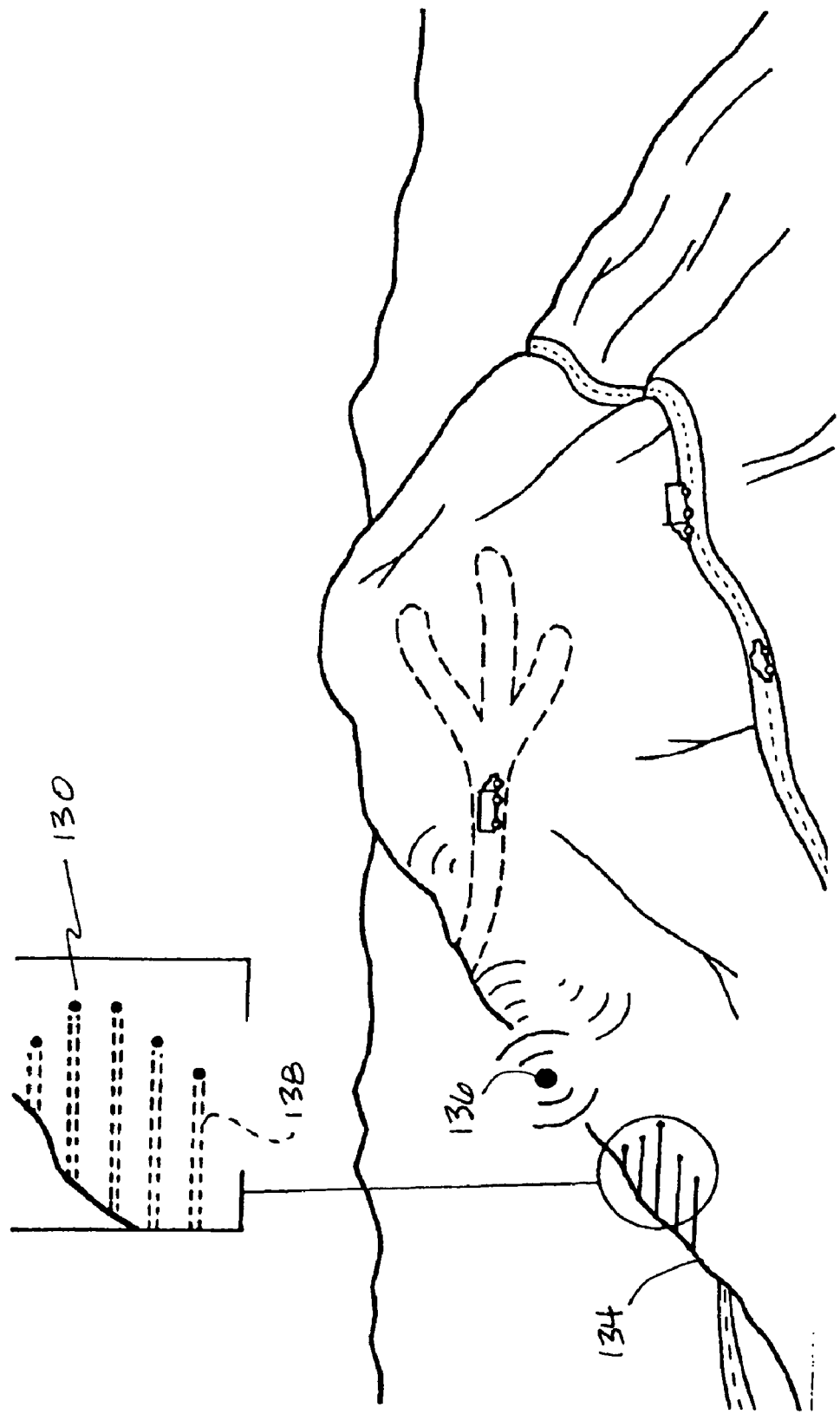
FIG. 13 is a schematic representation of an active and/or passive seismic array constructed in accordance with the present invention consisting of geophones mounted at the end of bore holes drilled into the mountainside, for permitting mapping and/or monitoring of underground facilities.

Mountain deployment of an acoustic spherical antenna 120 is depicted in FIG. 12, and such a deployment could be useful for remote traffic 122 monitoring for situations where the terrain is not planar in the neighborhood of the antenna and where the antenna need not be mounted with a particular orientation relative to the earth's surface. A traceback program tracking back propagation paths can be used to locate sources of signals, such as from a sniper 124, emanating from the mountain sides and/or other structures.

Figure 14:
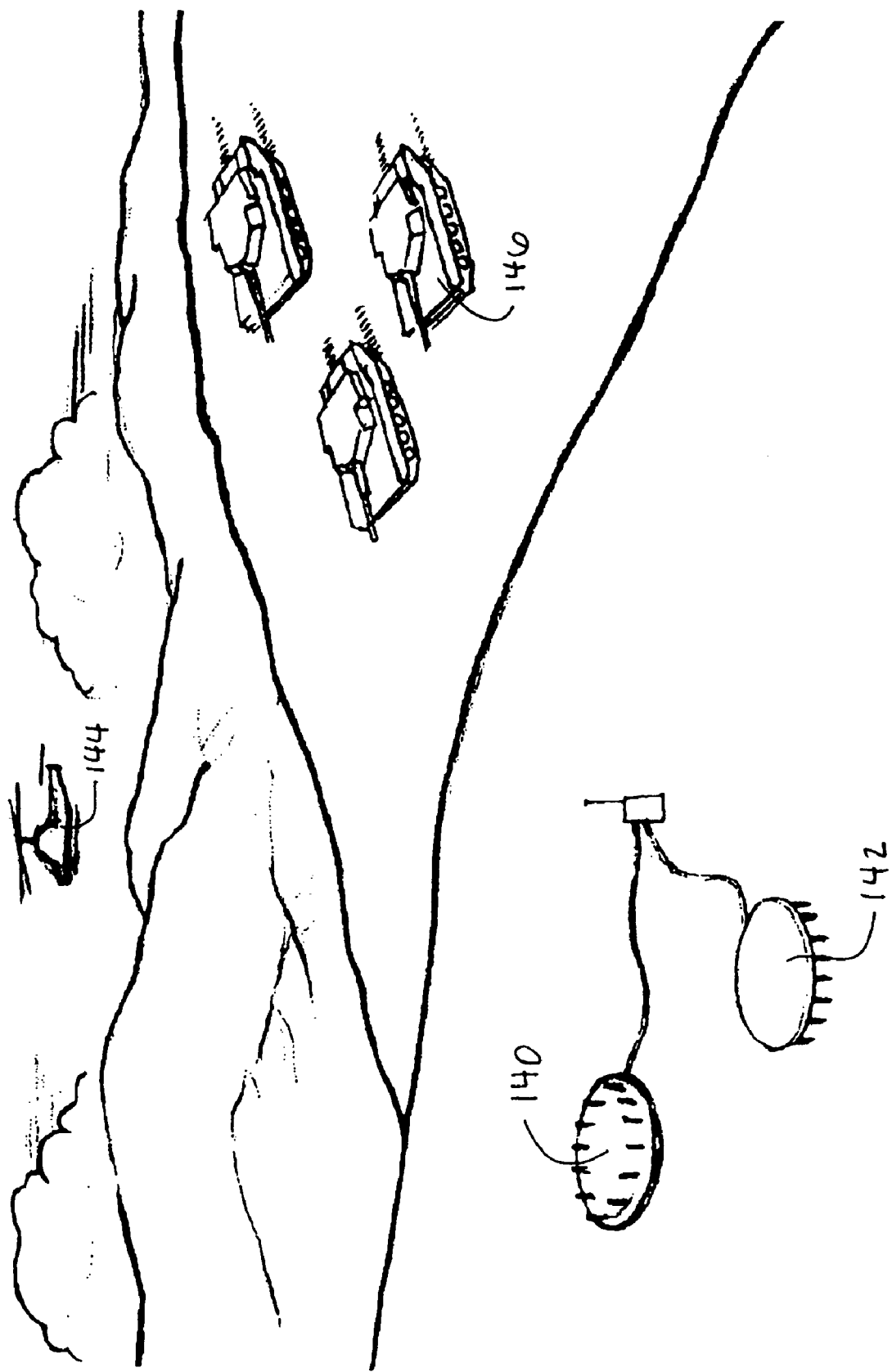
FIG. 14 is a schematic representation of a combined seismic and/or acoustic array constructed in accordance with the present invention deployment for tracking wheeled vehicles, shock waves, and helicopters.

The wavelengths of interest and the nature of the propagating medium place restrictions on seismic wave antenna systems. Attenuation in the earth for interior waves is higher at higher frequencies, so low frequencies are generally more productive when making application to waves propagating through the earth. Embodiments such as those depicted in FIG. 13 might be employed in seismic exploration and/or facility monitoring. They can involve antennas, generally 130, with elements burrowed into the earth's surface 134 with waves being generated using an active mode, such as a bomb 136, as in FIG. 13, or planar antennas 140, 142, as depicted in FIG. 14, for the detection of seismic surface waves, as detected by antenna 142, and for acoustic waves, as detected by antenna 140. Geophones and/or magnetometers (not shown) can be used as transducers for measuring fluctuations in seismic media or magnetic induced charges by metallic vehicles, respectively.

In simple seismic models, the wave equation modeling the physical wave can be characterized by elastic moduli, and the waves are then best described by the P and S wave Hemholts decomposition (Lay and Wallace). In this case, both longitudinal and vector harmonics are needed. Use of small bore holes 138 relative to wave dimensions of interest permits ignoring scattering by the illustrated seismic antenna structure, so that, in one embodiment, only scattering of waves at the earth's surface should preferably then be accounted for. A spherical antenna with an active explosive source 136 would permit mapping of tunnel structures and underground facilities, and multiple antennae would permit passive monitoring and mapping of the facility.

FIG. 14 illustrates a combined acoustic, generally 140, and a seismic antenna array, generally 142, constructed in accordance with the present invention for measuring waves propagating 1 (in the neighborhood of the array) along the earth's surface.

The antennae described above (with the exception of that of FIG. 13) can typically be readily constructed and can provide for a minimal number of floating point operation, since the constant value of one of the coordinates of the coordinate system describes each transducer surface. Other antennae are possible, though, and could use a random placement of transducers, as might be done if the antenna must be placed remotely, such as, for example, in the scenario illustrated in FIG. 13 if providing small bore holes were not possible. If transducers are randomly placed (such as by air drop, use of projectiles, missiles, or the like), software, and knowledge of their random positions through us of the global positioning system (GPS), could potentially allow a subset of the transducers to be sampled via radio link, or some other communications method, for the purpose of defining signal vectors. A subset of the transducers consistent with the Nyquist sampling criteria could then be selected. In such an embodiment of the present invention, the thus formed randomly-shaped, or near arbitrarily-shaped, antennae could also be used, but there would likely be a higher demand for signal processing power for certain types of selected information, such as with local wave field reconstruction. Calibration of such antennae could be done in various ways, and could include the detonation of one or more explosive devices at a predetermined location(s) within the vicinity of the transducers and reviewing the outputs of the respective transducers in response thereto.

Note that with configurations of antenna constructed in accordance with the present invention and meeting minimal Nyquist sampling requirements, such antennas can also be used in the sample and frequency domains without reference to partial wave expansions, particularly if only detection and tracking information is required.

Figure 15:
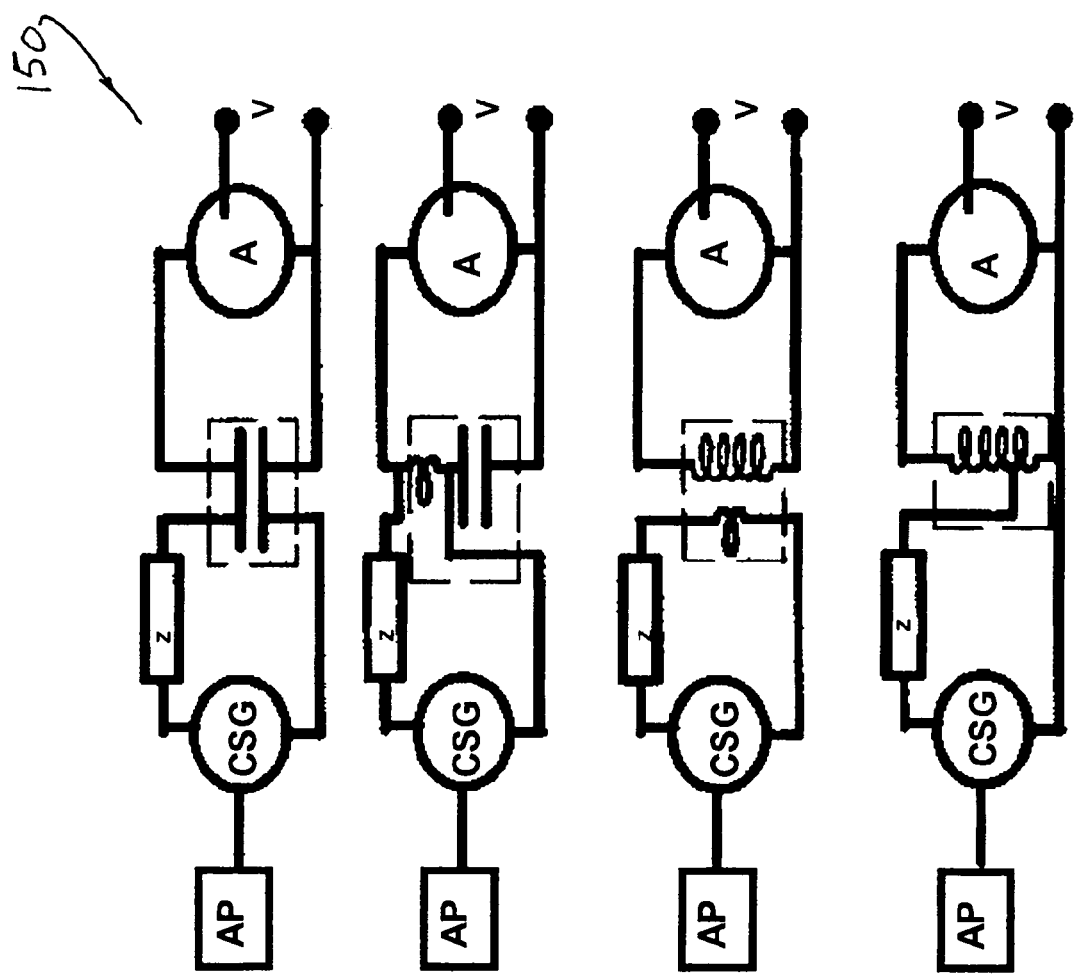
FIG. 15 is a schematic representation of calibration electronics constructed in accordance with the present invention showing a signal generator, coupling to transducers, amplifiers, A/D converters, and processor.

The present invention also includes a self calibrating system, generally 150, shown in FIG. 15, which may include the self-calibrating system contained in FIG. 1. Calibration of the system 150 corrects for deviations from desired component tolerances and verifies that the system is operating within prescribed tolerances. The linear nature of the processing provides employment of simple techniques. Signal output from D/A converters (not shown) driven by time series from an array processing unit AP drives a calibrating signal generator CSG inputting a common signal to transducer elements. The complex amplification for each channel, generally A, for this signal can be determined, and deviations from a standard (which can be one of the antenna transducers or a reference signal) can be used as a basis for numerical correction of inputs. This insures that the system channels effectively are identical on each frequency over the bandpass. This procedure can be also be used to check that voltage outputs, generally V, (and/or current) of each channel are within system tolerances. The process can be carried out automatically each time the system is initiated or as desired by a controlling operator. The system operator can also execute a manual calibration and verification of system performance. Isolating impedance or isolation devices, generally Z, assist in insuring that there is little "cross-talk" between input calibration signals. Required phase and amplitude corrections for each frequency can be incorporated into the processing by modifying the matrix K from which the signal vector is obtained in the signal vector equation.

Figure 16:
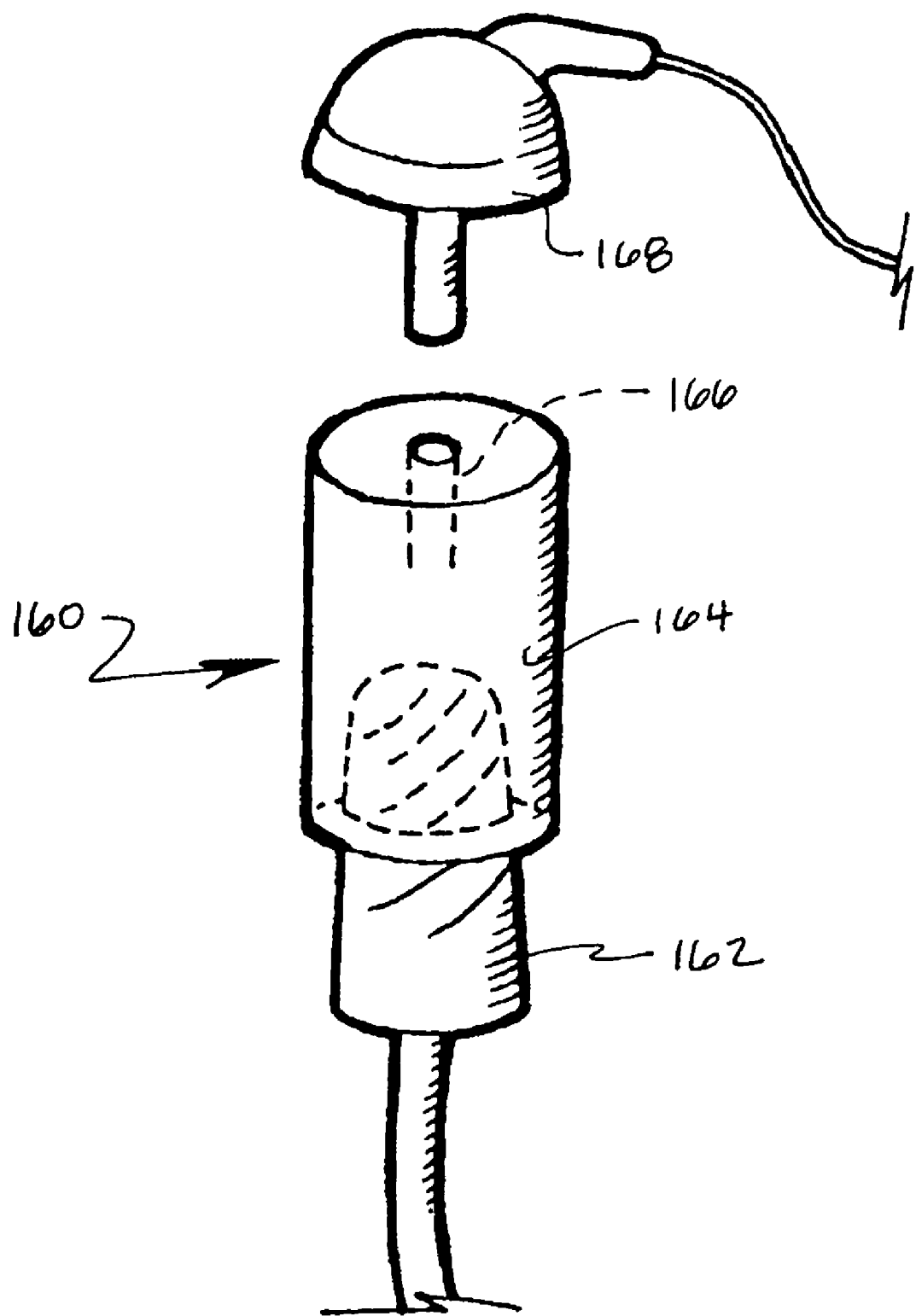
FIG. 16 is a perspective view of a single channel acoustic transducer driver constructed in accordance with the present invention for an operator-supported calibration, for which calibration can be carried out one channel at a time.

Operator calibration can be carried out if the operator is uncertain about the functioning of internal calibrator. FIG. 16 is a single channel microphone signal driver, generally 160, for providing an acoustic pressure wave reference to a standard signal. The system can be calibrated one microphone channel at a time, and includes a microphone 162, an acoustically isolating microphone receptacle 164 having a pressure wave channel 166, and a driving earphone/speaker 168.

Figure 17:
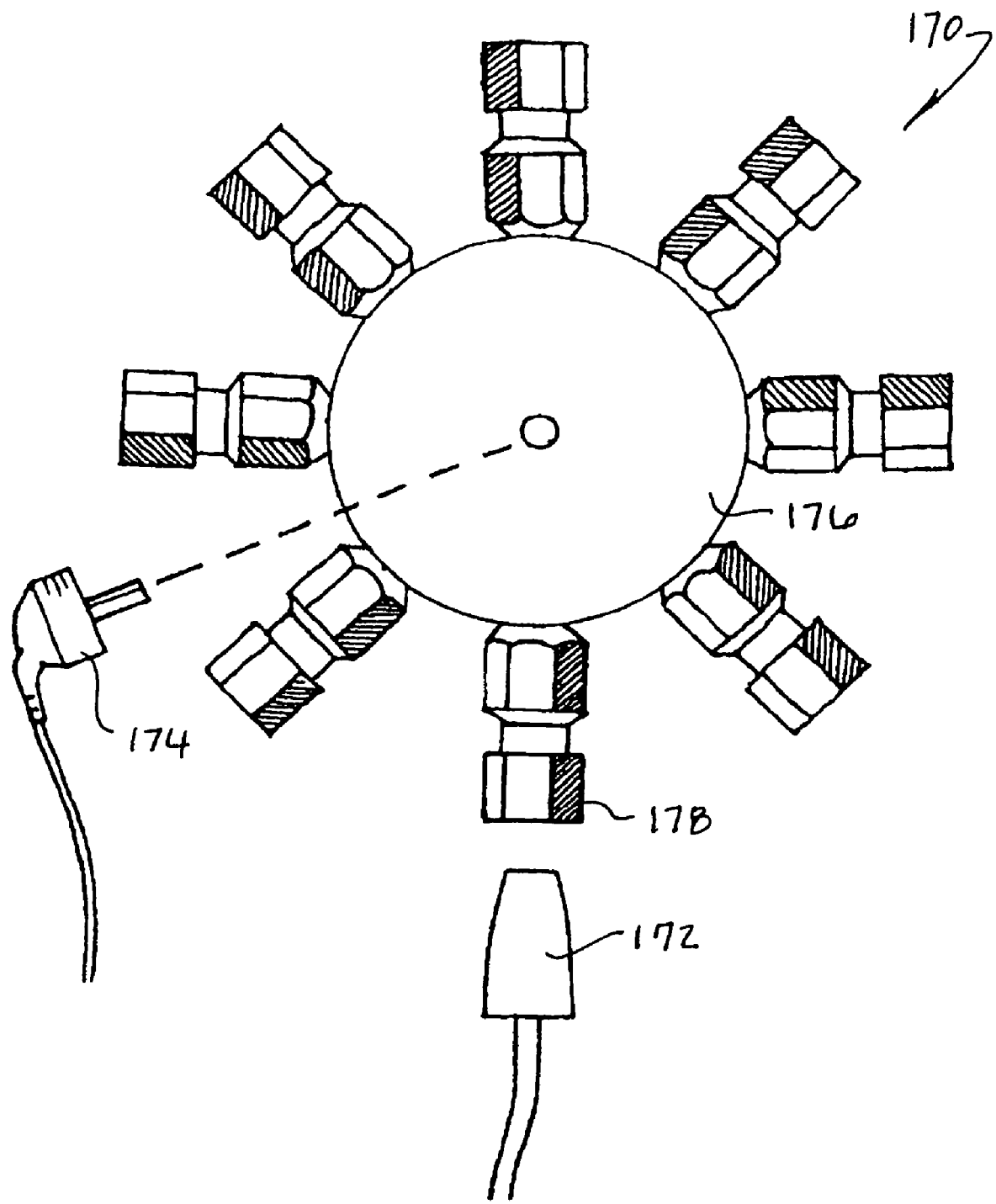
FIG. 17 is a plan view of a multiple channel acoustic transducer driver constructed in accordance with the present invention for simultaneous multiple channel calibration.

FIG. 17 is a schematic representation of calibration device, generally 170, which can feed identical simultaneous signals to each channel. It can be used to determine simultaneously the relative complex amplification of each acoustic channel, again circumventing the need for electronically matched signal components, and includes a microphone 172, a driving earphone/speaker 174, a symmetric acoustic wave channelizer 176, and an acoustically isolating microphone receptacle 178. In the calibration devices shown in FIGS. 16 and 17, the acoustic signal feed dimensions should preferably be small in comparison to a wavelength.

Figure 18:
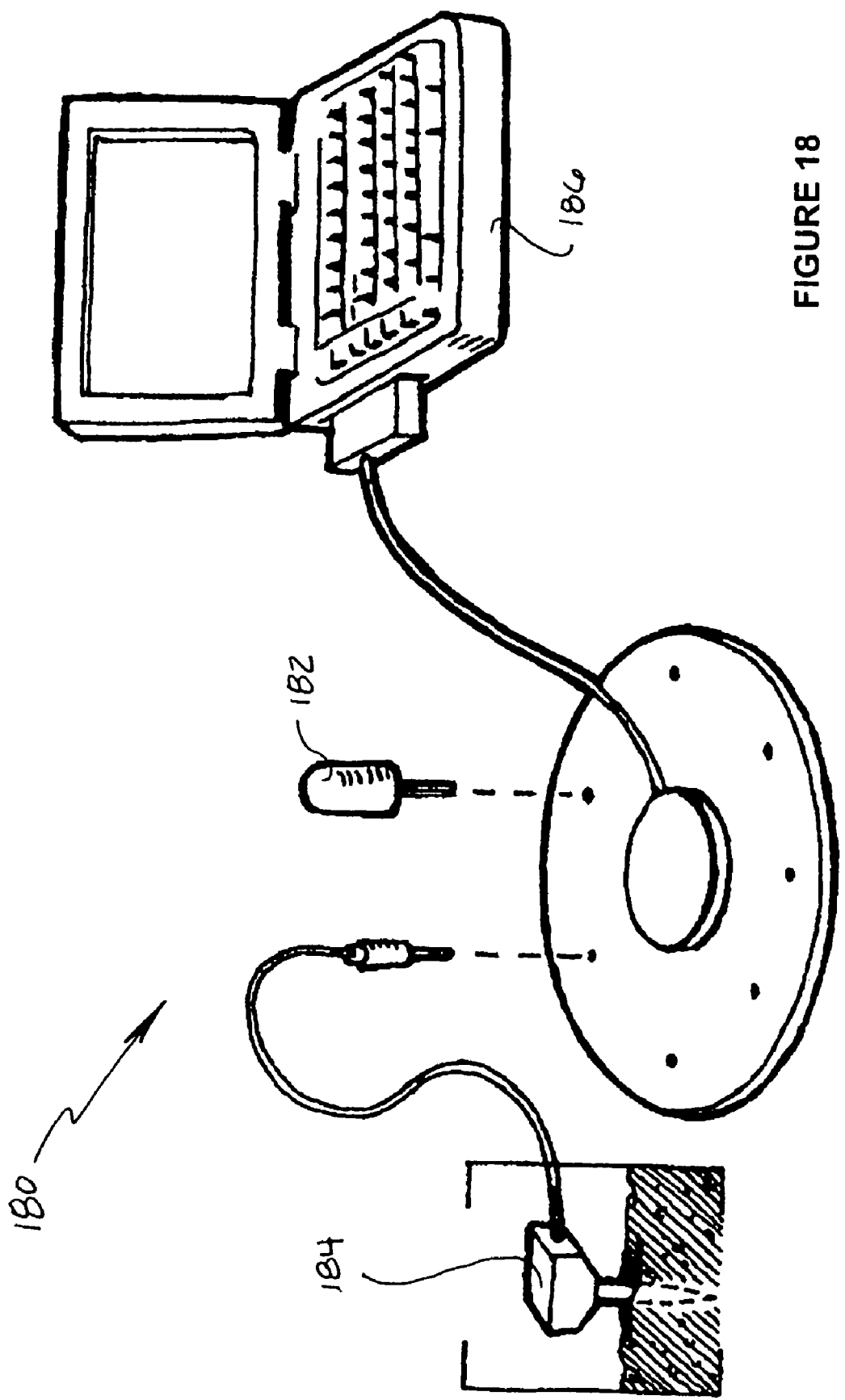
FIG. 18 is a schematic representation of an example dual purpose seven sensor acoustic and/or seismic sensor array constructed in accordance with the present invention with supporting signal conditioning unit, sample geophone, microphone, and computer for in-field processing.

FIG. 18 illustrates a composite seismic and acoustic system, generally 180. Microphones 182 and/or geophones 184 can be simultaneously sampled as with two of the subsystems of the composite system 10 of FIG. 1. A computer 186 is preferably used as an array processor. This embodiment is useful as a multimode detection and tracking device and for range determination, since seismic and acoustic waves typically have differing propagation speeds.

Figure 19:
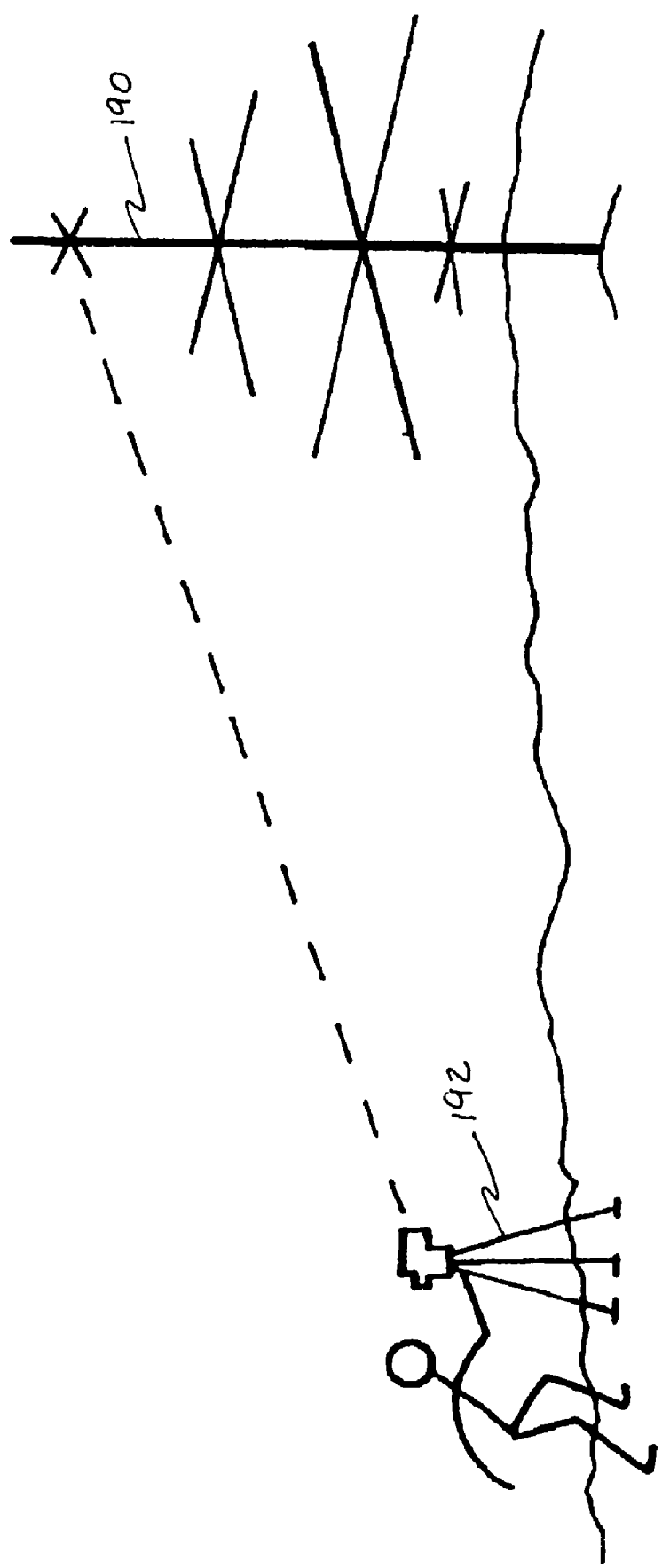
FIG. 19 is a schematic representation of a transducer position calibrating method of the present invention using a field survey and applicable to large scale antennas whose transducer locations may have been altered by environmental events.

FIG. 19 illustrates a schematic representation of a method of the present invention for remote calibration of microphone positions, and is useful when antenna dimensions are large making position calibration difficult. Using a field survey device 192 transducer locations on an antenna 190 can be verified can be verified or recalibrated when the positions have been altered by environmental events.

The following example is provided for illustrative purposes, and it is to be understood that the present invention is not to be limited or constrained by such example, as the present invention could be practiced in a variety of other applications and configurations.

EXAMPLE

In a representative example using the present invention, a deployment of a simple embodiment of the present invention was carried out to validate the capability for locating sources of blast and shock waves in a mountainous environment using the signal averaging technique. In one test 7 elements of a 16 element spherical array were employed as a 3D antenna operating in reduced horizontal mode, after a field validation verified a partially broken data cable. The utilized signal vector library then consisted only of a subset of the 3D library corresponding to incoming waves near parallel to the earth's surface.

The array was deployed on one side of a bent canyon having canyon wall grades running from zero to 60 degrees, with numerous rock outcroppings, protrusions, and canyon twists and turns. The width of the canyon ranged from approximately 150 to 300 ft in the vicinity of the array at the array altitude, as viewed in different directions. Three shooter positions were employed, all along a N-S line, the first being on the opposite canyon wall at 179 meters along a line nearly parallel to the canyon's average axis, the remaining 2 were 32 meters north and 76 meters south of the antenna Targets for the shooters were spread along a line on the opposite canyon wall, from south to west. All shooters had roughly the same elevation as the antenna array. All of the consequent blast and shock wave time series were processed using the signal averaging technique discussed above and appropriate for short duration single events.

A total of 39 rifle firings were observed. With the temporal processing window centered on the blast or shock wave pulse, only 5 rifle firings resulted in error estimates of shooter positions above 5 degrees, with the array having a resolving power of approximately 53 degrees. All of these 5 were associated with one shooter position, the one directly north of the array and out of line of site from the array itself. That position was characterized by the shooter shooting from along an irregular rock wall ridge line, generating numerous echoes. The maxima error observed in this instance was 14 degrees. The overall mean absolute bearing error was 3.3 degrees, with 15 of 39 within 2 degrees. A movement of the temporal window to place the blast and shock wave pulses nearer to the end of the window to reduce the effect of reverberation reduced the maximum error to 8 degrees, and 1 to 2 degree fluctuations in other bearings were noted, characterizing the accuracy of the process. With the new temporal window, the overall error was nearer 3.5 degrees, with two thirds of the shootings associated with errors of 3 degrees or less. Use of high density arrays of the type proposed here is anticipated to greatly enhance accuracy.

Essentially identical processing results were obtained for the partial wave and Fourier signal vector representations. In all cases, data processing involved 1 sec "snapshots" for data collection and 1 sec for processing. With use of an 18 element transducer array, the same acoustic "pulse" processing technique was found to generate valid results inside buildings.

Figure 20:
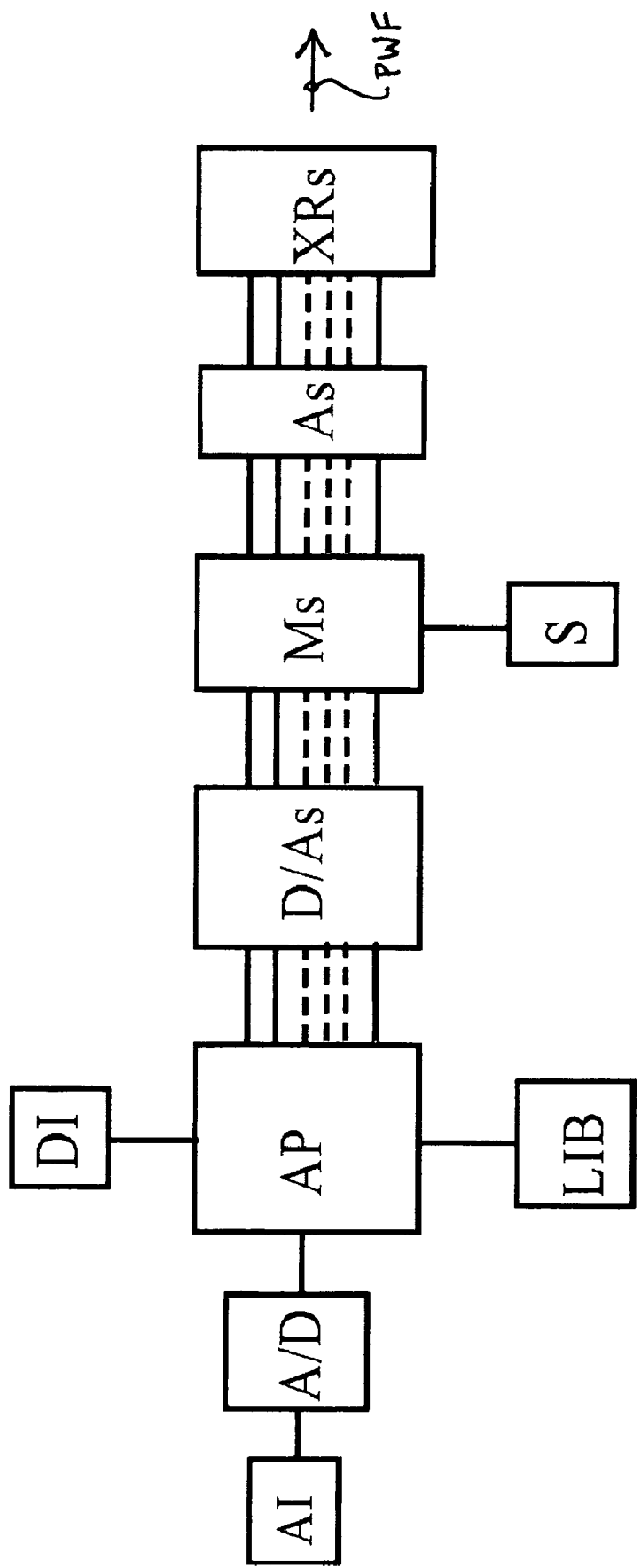
FIG. 20 is a block diagram of an embodiment of the system constructed in accordance with the present invention operating in transmission mode.

When using the reconstruction process for transmission of signals, a system constructed in accordance with one preferred embodiment of the present invention operates as depicted in FIG. 20. As discussed above regarding the signal reconstruction process, selected information might include a set of analog modulation signals AI containing information to be communicated to a number of receivers, generally R (FIGS. 24 through 31). Each such signal is converted to a digital time series using an analog to digital converter A/D, and the time series for each is passed as an input to the processor AP. The processor AP obtains the Fourier spectral components for each time series and selects the set of signal vectors needed for each from the signal vector library LIB of the processor AP, as specified by the desired direction for each signal to be transmitted, as input from processor DI. The elements of the set of the signal vectors for each (with the specified frequency property) are then weighted by the value of the spectral components of the given signal. The weighted set is then inverse transformed to obtain the time series (as components) to be directed towards each individual transducer of the antenna, collectively XRs, of the system. The time series for each of the signals so obtained to be transmitted to each transducer are then added together, and the resulting time series are passed on to the digital to analog converters D/As for generating the analog signals for each transducer channel.

If the digital to analog converters D/As cannot reach the output frequencies required, an identical set of mixers, collectively Ms, driven by a common signal S can be used to raise the output to the desired frequency band, since such a mixing process preserves the relative phases and amplitudes of the signals. The resulting set of signals can then be amplified, such signals referred to collectively as "AS", and matched as required to drive transducers XRs to generate a physical wave field PWF. Physical wave field PWF thus consists of the superposition of the physical wave fields carrying the selected information to each of the resolved receivers.

It is to be noted that FIG. 20 is for illustration purposes only, and is to be understood that systems of the present invention can take on various other configurations as desired for the specific application. For example, the reporter RPTR of FIG. 1 could be represented by the system in FIG. 20 without using components AI and AD, and with the reconstructed time series of processor AP (FIG. 1) being used instead.

The sensor placement considerations for antennae operating in a receiving or passive mode also apply to the system's antennae when the system is operated in a transmission mode. The time series generating signals input into such an antenna provide for a mathematical model of the physical wave field in a neighborhood of the antenna, acting as "sample inputs."

Knowledge of such sample inputs, or simply, "samples," along with knowledge of the spatial derivatives along the signal surface, provides the Fourier frequency components along at least one signal surface in the neighborhood of the antenna containing the transducer elements. The wave field's dispersion relation then provides knowledge of the derivatives away from such surface, thereby providing for determination of the propagation away from the surface. In this sense, the spatial and temporal Nyquist criteria play an important role in providing field propagation.

The linear nature of a physical wave field to signal vector mathematical map in receiving mode enables signal enhancement through signal vector averaging, the attainment of relatively high resolving power through use of high element density arrays (and/or a consequent reduction in numerical processing demands), and for reconstruction of resolved signals. In transmission mode, the linear nature of the map also allows the reconstruction process to provide for the transmission of the signal obtained from the superposition of signal vectors, each being weighted by component spectral makeup of the desired signals. The Fourier transforms of the resulting superposition components then provide the time series to be directed to each system transducer.

Subject to power limitations and the reversibility of the transducers involved, for most cases of interest, the same antenna can be used for both transmission and reception of selected information. However, in the case of air acoustics and seismic physical wave fields, this may not always be possible. In the electromagnetic applications, however, conductors and capacitors embedded into metallic surfaces may work in either case, as can also be expected in the case of hydro acoustic transducer. The antennas of FIGS. 3, 4, and 5 could be used in those cases. However, in the case of air acoustics, microphones may need to be replaced by speakers to increase efficiency and transmission of acoustic waves.

Figure 21:
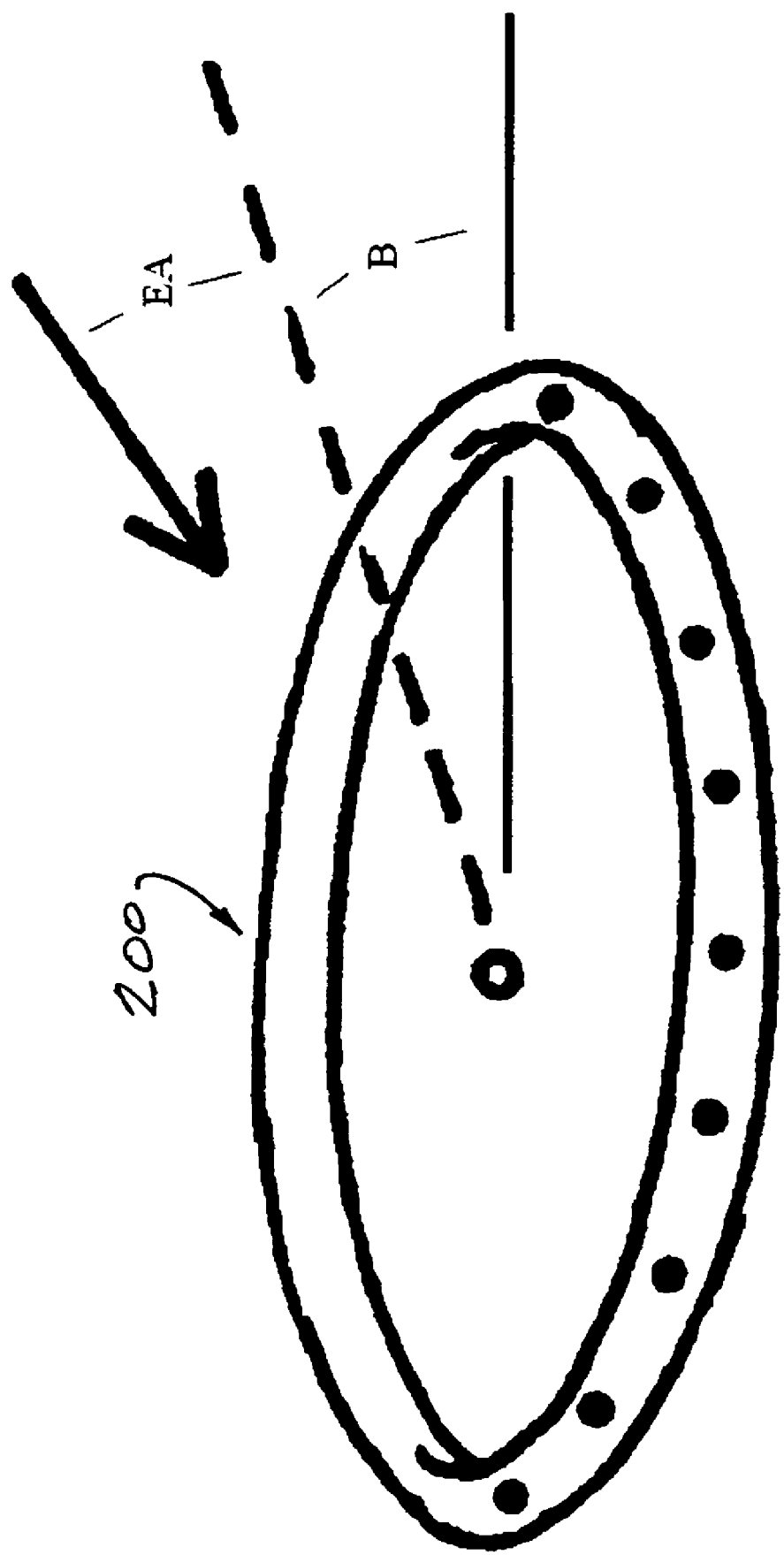
FIG. 21 is a schematic representation of a planar array constructed in accordance with the present invention operating in 3D mode capable of providing elevation and bearing information on incoming signals.
Figure 22:
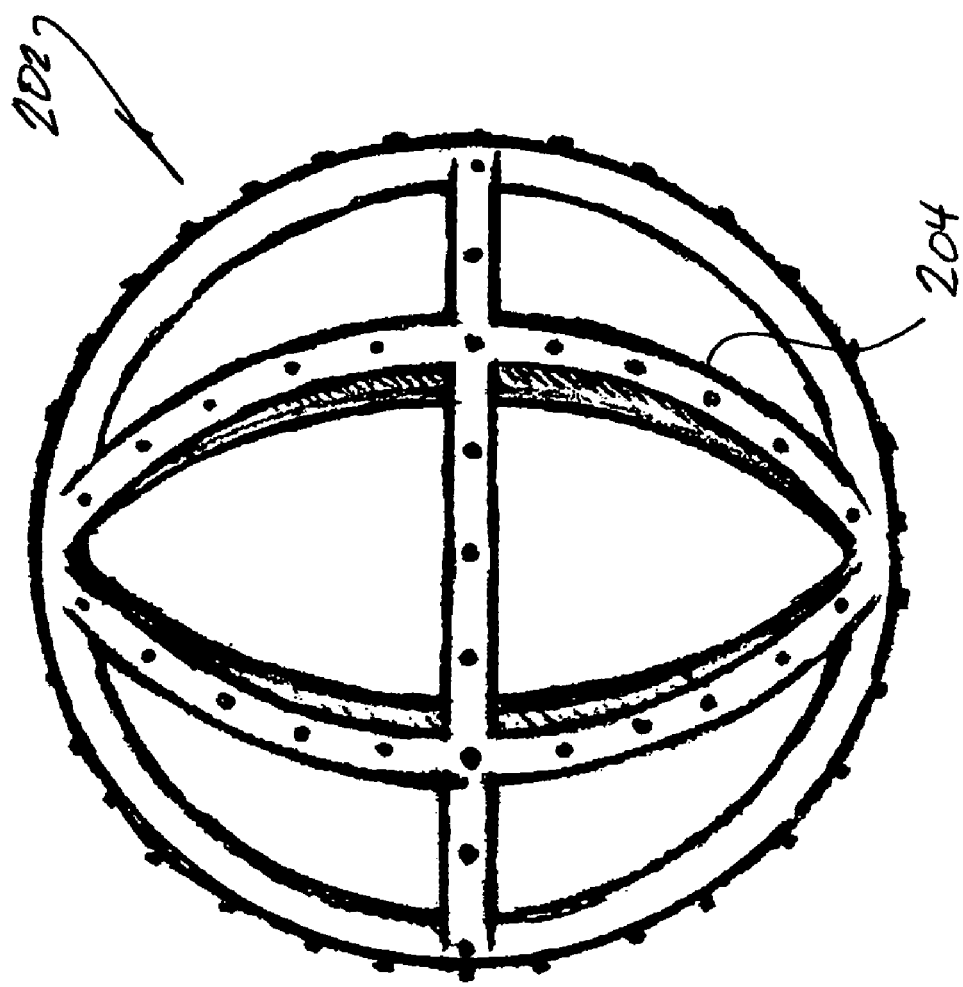
FIG. 22 is a schematic representation of an 3D antenna constructed in accordance with the present invention having a collection of 2D subarrays operating in planar modes and capable of providing elevation and bearing information on incoming signals.

FIG. 21 illustrates a planar array antenna, generally 200, operating in 3D mode and capable of generating or receiving a signal inclined at an elevation angle EA and bearing B, provided its apparent wavelength in the plane of the antenna is used to define the appropriate signal vector library elements. However, in this mode the resolving power of the system diminishes as the elevation angle increases FIG. 22 illustrates a 3D antennae, generally 202, constructed from planar antennae sub arrays, generally 204, each sub array being configured to operate with a modified dispersion relation so that the component of the wavelength for each frequency (via the labeling of appropriate signal vectors) is appropriate for the incident or transmitted angle for an appropriate corresponding source or receiver. An expanded signal vector library LIB may be needed to handle the multiple incident component wavelengths involved. As a consequence, however, some resolving power may be lost since, as discussed above, the component wavelengths have increased length.

Figure 23:
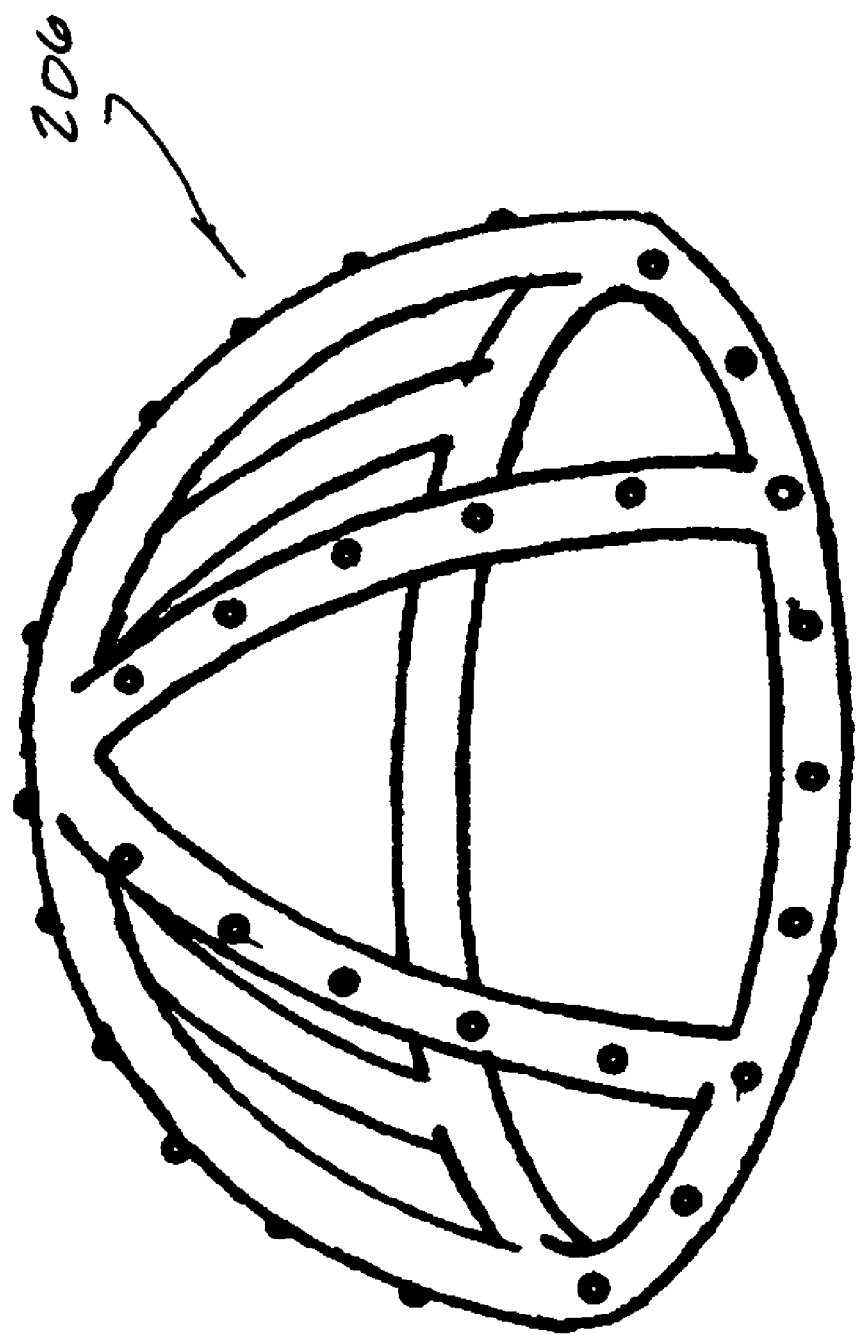
FIG. 23 is a schematic representation of a 3D hemispherical antenna constructed in accordance with the present invention having a collection of 2D planar subarrays operating collectively in either 3D mode or individually in 2D mode with 3D capability and in either case capable of providing elevation and bearing information on incoming signals when mounted on a planar surface with known acoustic properties.
Figure 24:
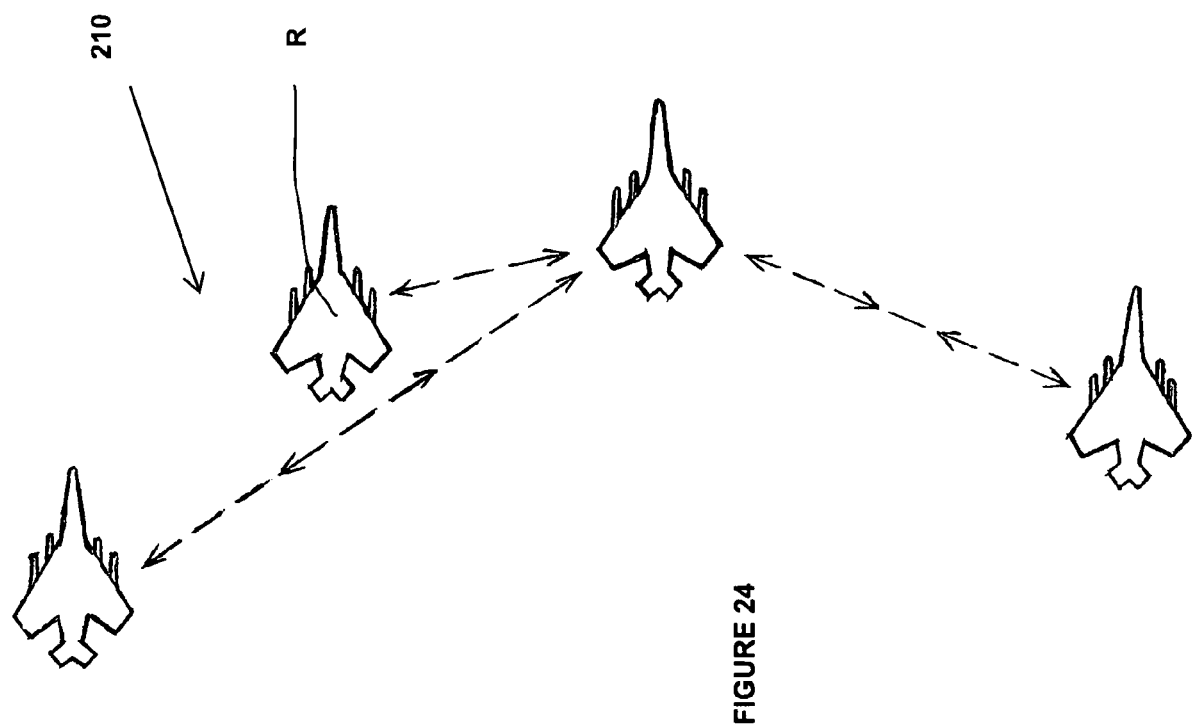
FIG. 24 is a schematic representation of a formation of airplanes participating in simultaneous directed communication using a system constructed in accordance with the present invention.

Other possible antennae include a hemispherical antenna, generally 206, taking advantage of a planar reflecting surface (FIG. 23). In this case the composite transmitted and reflected field has fewer degrees of freedom and therefore requires fewer transducers, but the signal vectors should be obtained from a wave field model incorporating the composite incident and reflected waves off the planar reflecting surface. This antenna can operate either as a set of 2D subarrays or as a 3D antenna based upon a 3D signal vector library.

Some applications of the present invention are illustrated in FIGS. 24 through 31. These applications are intended to be example applications only of the ability to simultaneously transmit signals in independent directions on the same frequency band, and it is to be understood that the present invention is not limited to the applications shown in the figures.

The ability to simultaneously transmit signals in independent directions on the same frequency band would provide for inter-airplane communication between airplanes (FIG. 24) within the same flight or group of airplanes, generally 210, such communication being with reduced the risk of detection and reduced interference with other flights.

Figure 25:
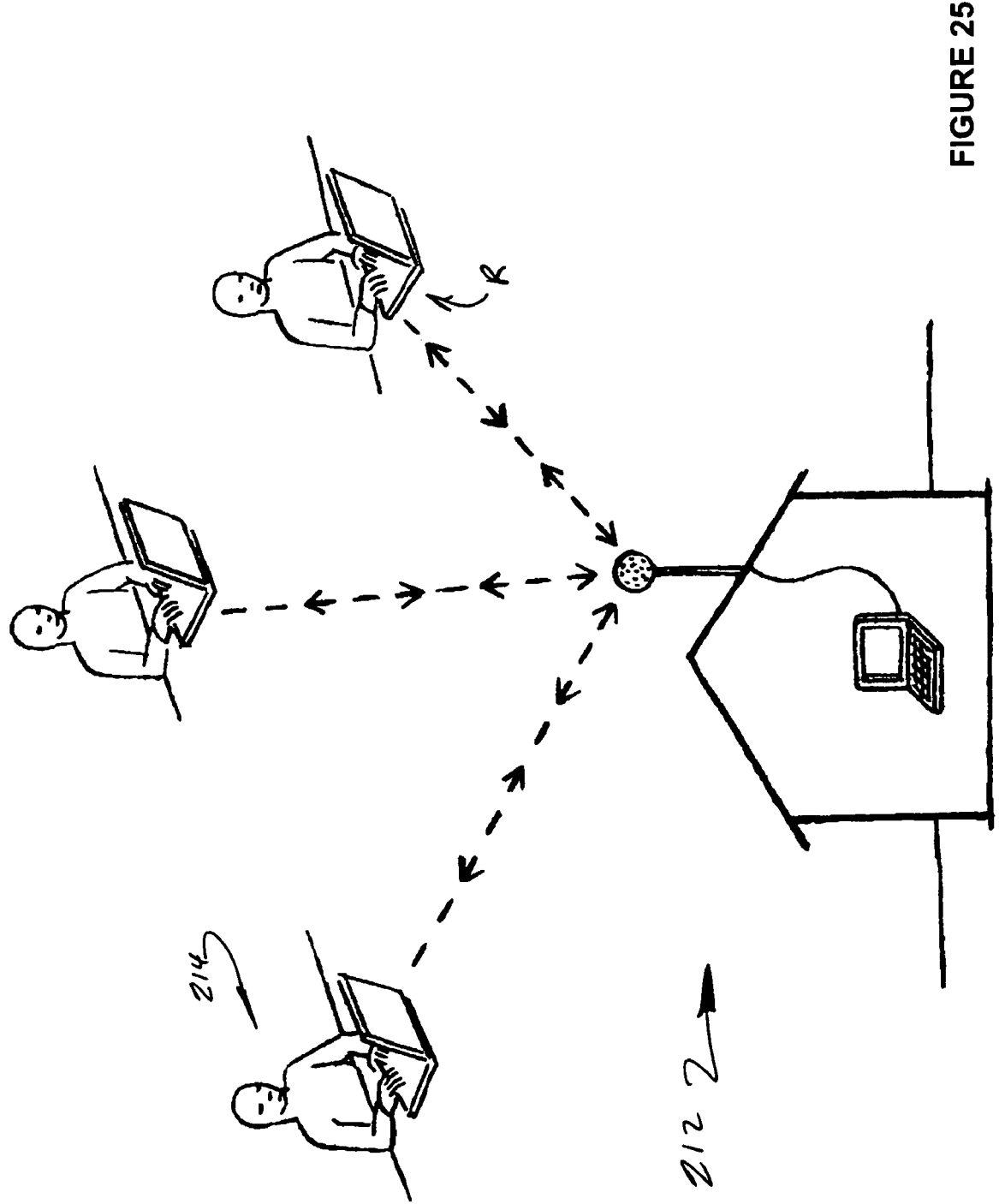
FIG. 25 is a schematic representation of a computer network having a server connected to a system constructed in accordance with the present invention in transmission mode and configured to permit simultaneous directional communications with several logged on clients.

As shown in FIG. 25, the present invention could also make communication on a network, generally 212, more secure by providing for reception and transmission more restricted in the locations and the directions along which allowed network clients or participants, generally 214, are located. Additionally, the present invention could provide for increased signal density within specified bandwidths, by providing a form of spatial filtering. One application could be the cellular phone industry, which could potentially find advantage and profit from implementation of this present invention, since the system of the present invention allows more cell phones to potentially be utilized within a give frequency channel.

Figure 26:
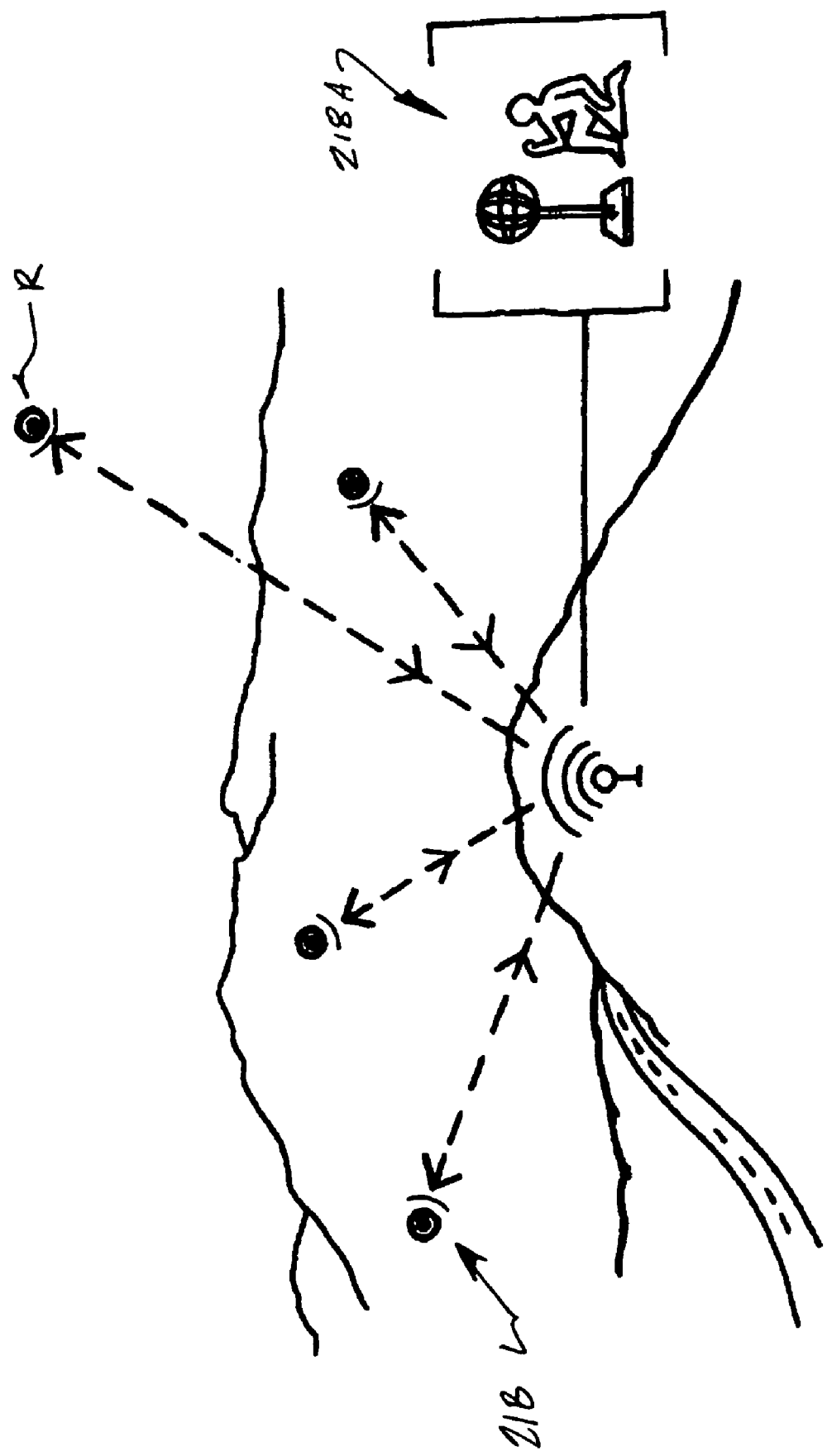
FIG. 26 is a schematic representation of a system constructed in accordance with the present invention illustrating a field operative maintaining simultaneous directional communication with several stations with reduced risk of eavesdropping by outsiders.

Additional applications of systems constructed in accordance with the present invention are illustrated in FIGS. 26 through 31. As shown in FIG. 26, messages and/or other communications and/or portions thereof could be transmitted to and from stations and/or teams of personnel, generally 218 in the field by a transmitter, generally 218A, where all communications could be simultaneously carried out on the same frequency channel.

Figure 27:
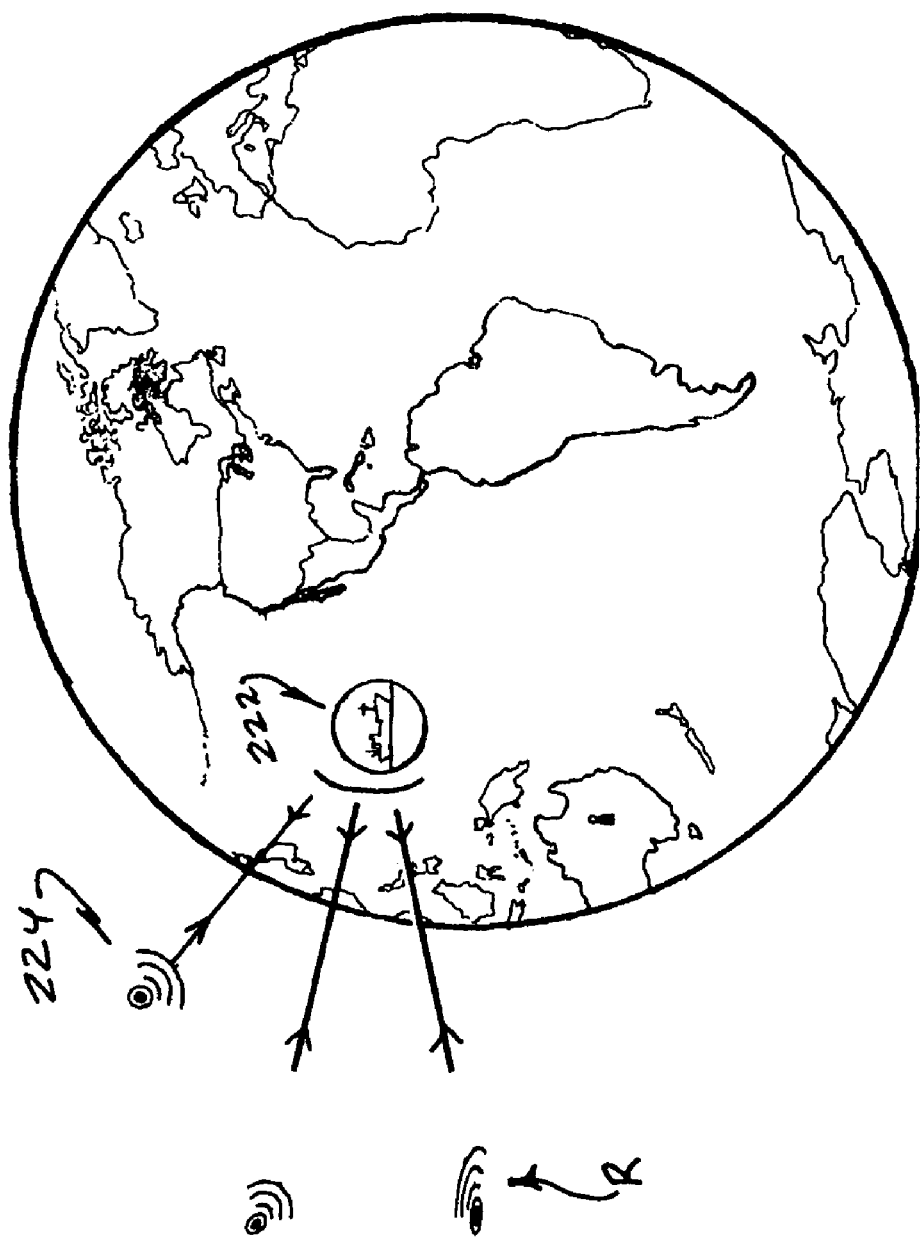
FIG. 27 is a schematic representation of a system constructed in accordance with the present invention illustrating a ship maintaining simultaneous directional communication with several satellites and/or stations with reduced risk of eavesdropping by outsiders.

Or, as shown in FIG. 27, messages and/or other communications could be transmitted to and from one or more ships, generally 222, from satellites, generally 224, generating signals simultaneously to and from different directions, reducing the time required for transmitting and receiving signals and/or messages and signal interference.

Figure 28:
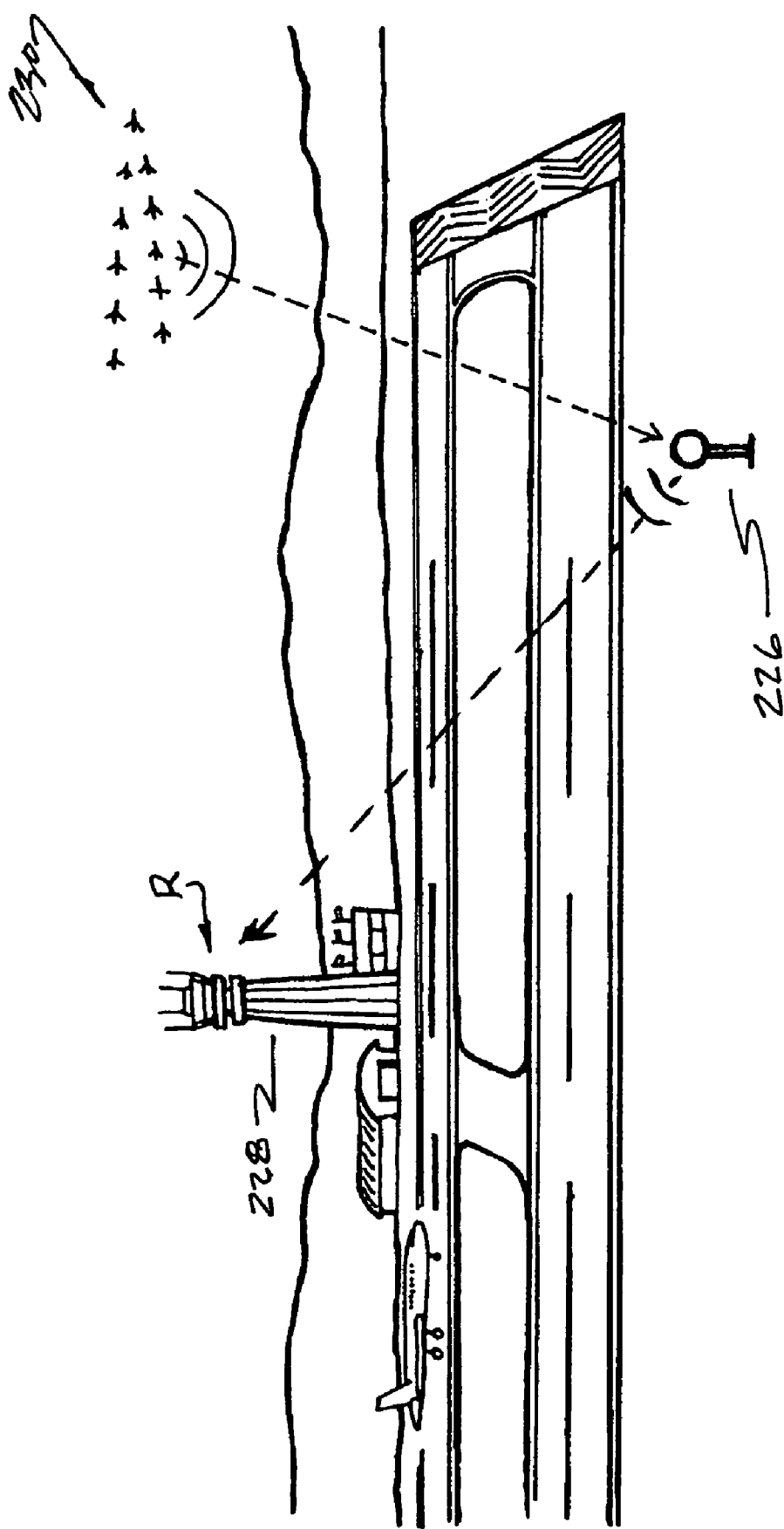
FIG. 28 is a schematic representation of a system constructed in accordance with the present invention illustrating a bird tracking apparatus for reporting flocks of large birds to an airport tower.
Figure 29:
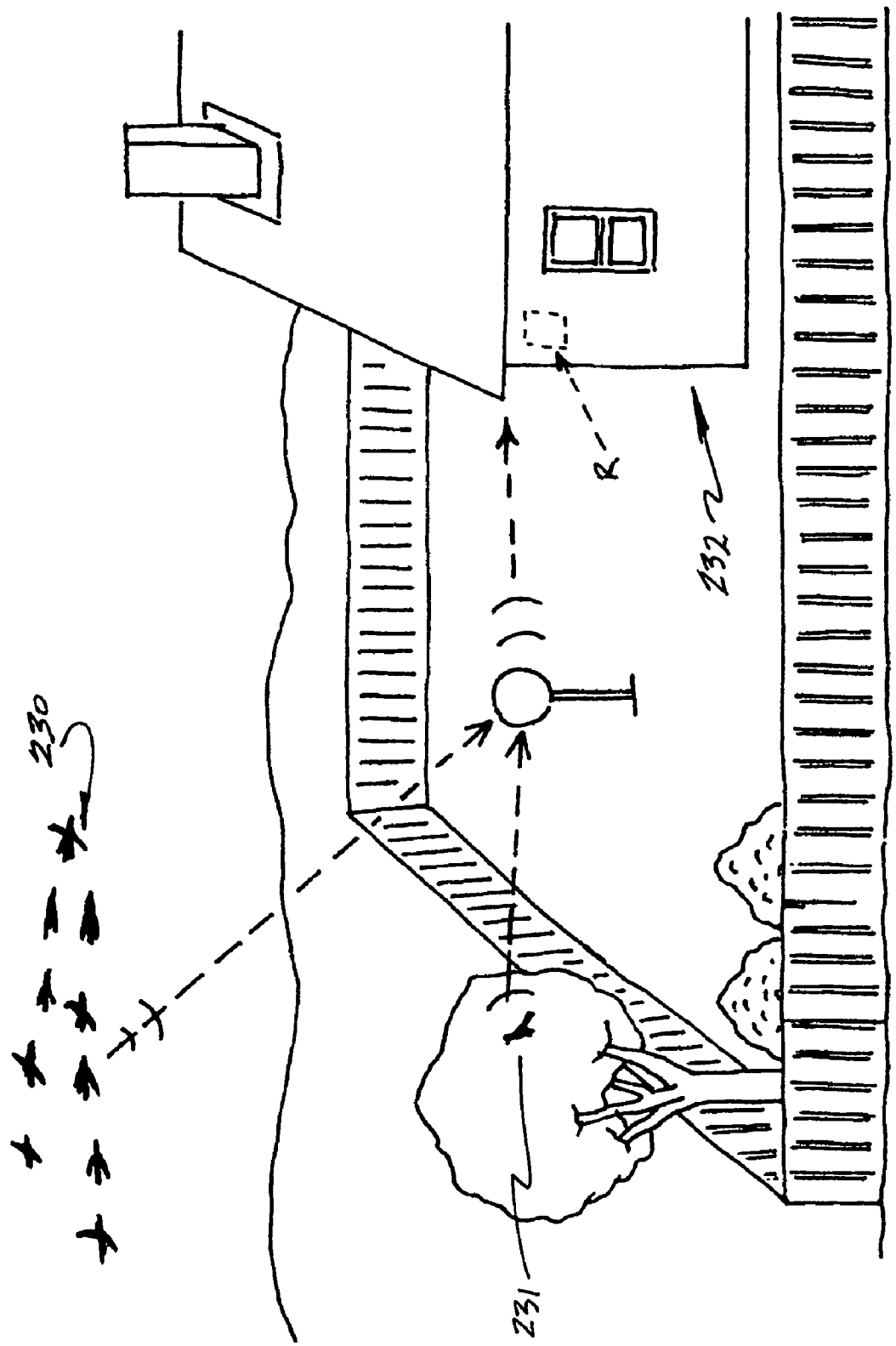
FIG. 29 is a schematic representation of a system constructed in accordance with the present invention illustrating a bird monitor reporting the presence of vocal birds to a bird watcher or one tracking the migration of vocal flocks of birds.

FIGS. 28 and 29 illustrate applications of 3D receiving systems constructed in accordance with the present invention for bird tracking and/or bird watching. FIG. 28 illustrates a bird tracking apparatus, generally 226, implementing the systems of the present invention that reports flocks of birds, particularly large birds, to an airport control tower, generally 228, or other aircraft monitoring location. Birds, generally 230, pose a threat to aircraft, particularly in flight paths of such aircraft, and a 3D receiving system could provide warning of flocks of large birds, and in particular, vocal flocks in the vicinity. Multiple systems could provide range and bird flock location as well.

As shown in FIG. 29, such 3D systems could appeal to bird watchers and/or lovers in their home or office, generally 232, for example, alerting them to the presence and direction of birds of interest 230 in nearby trees or bushes 231, thus indicating where they are. The system could notify interested watchers by using its transmit mode without causing appreciable interference to neighbors. Such systems can also be deployed remotely to track migratory birds.

Figure 30:
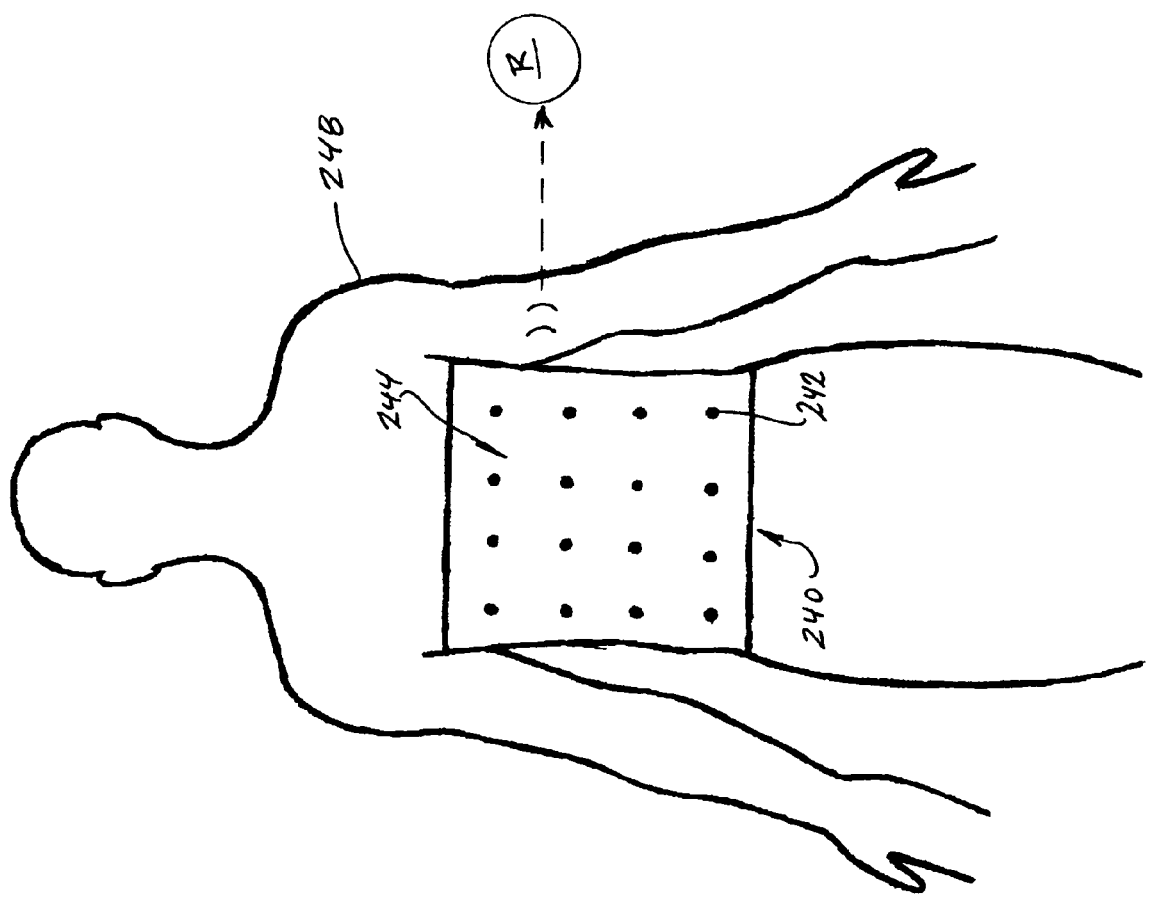
FIG. 30 is a schematic representation of a system constructed in accordance with the present invention illustrating a diagnostic tool for monitor sounds within the human body.

FIG. 30 shows a system constructed in accordance with the present invention having a wrap, generally 240, with transducers 242 of an antenna configuration, generally 244, used in a diagnostic application listening for body sounds from within the human body 248.

Figure 31:
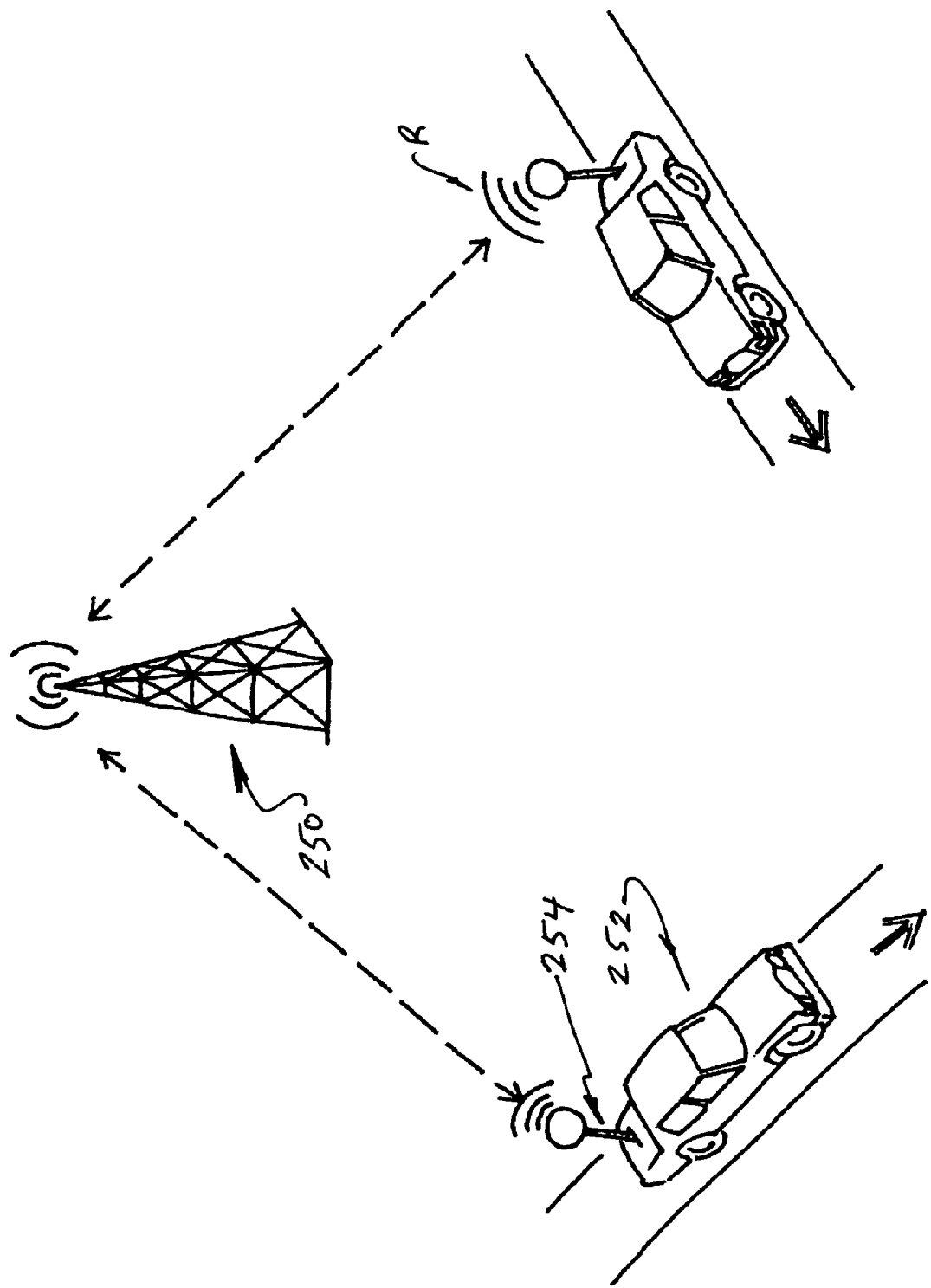
FIG. 31 is a schematic representation of a system constructed in accordance with the present invention illustrating simultaneous common channel communication between a stationary tower and two moving vehicles.

FIG. 31 illustrates the application of the system in the cellular phone industry, appropriate simultaneous common channel directed communication could be made between resolvable cellular phone towers 250 and resolvable cellular phone users, generally 252, having antennas 254, the size of which having been exaggerated for illustration purposes. Such use would increase band width participation and inhibit eavesdropping. It is to be understood, however, that although cellular phone users 252 have been illustrated in cars, such is for illustration purposes only, and cellular phone users 252 could be in locations other than vehicles, buildings, etc. and can be indoors and/or outdoors.

Figure 32:
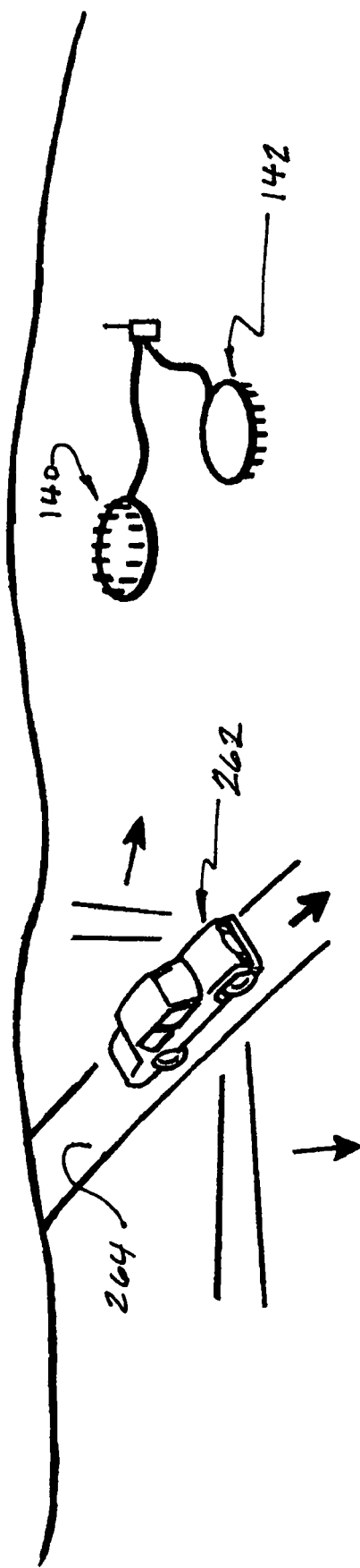
FIG. 32 is a schematic representation of a seismic and possibly acoustic system constructed in accordance with the present invention for monitoring and reporting the presence, speed and, potentially, the type of a vehicle traveling along a road.

FIG. 32 illustrates a system constructed in accordance with the present invention for monitoring traffic and/or vehicle movement. Acoustic antenna 140 and seismic antenna 142, discussed above, measure acoustical and/or seismic waves propagating along the earth's surface generated by vehicle 262 traveling on road 264. Antennae 140, 142 are connected to a reporter for transmitting information concerning terrestrial traffic and/or vehicle movement, such as speed, direction, vehicle type, the number of vehicles, etc. The outputs from antennae 140, 142 could be co-processed to improve the accuracy of the transmitted information, since antenna 140 receives sound-based information, and antennae 142 receives seismic-based information concerning vehicle 262.

As such, the system of the present invention is capable of simultaneously transmitting and receiving spectrally competitive but resolvable signals using a single antenna and/or detector array.

The ability to simultaneously transmit and receive spectrally competitive signals to and from specific locations, possibly using a single antenna for both transmission and reception, provides for spatial encryption for reception, transmission, and conveyance of signals. Although applications exist for the main types of physical wave fields discussed, i.e., electromagnetic, acoustic, seismic, and hydrodynamic, it is anticipated that one prominent application will be to the generation and reception of electromagnetic and acoustic waves using antennae, which could be, but not limited to, the type described in FIGS. 2A-6 and FIGS. 21-23 employing transducers appropriate for each wave type.

Spatially encrypted reception of a message involves a receiver generally simultaneously receiving different portions of the message preferably on the same frequency channel, receiving them from different resolvable directions and re-assembling the message from these component parts. The receiver preferably consists of the present invention operating in receiving mode, such as discussed above regarding FIG. 1. The receiver reconstructs the signals belonging to the incoming directions corresponding to each selected station, as per the above discussion on signal reconstruction, and re-assembles the original message by inverting the procedure for de-composing the message into its component parts.

Figure 33A:
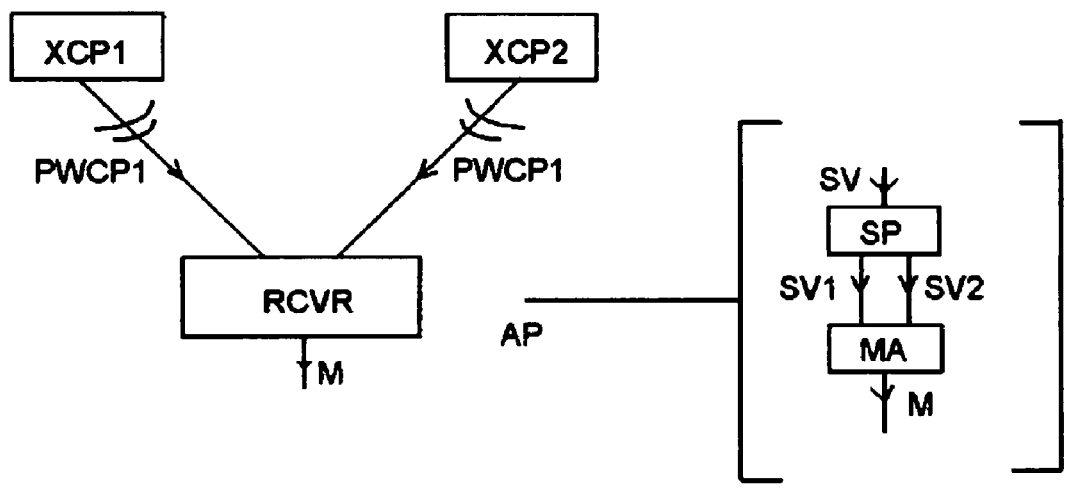
FIG. 33A is a schematic representation of a system constructed in accordance with the present invention for receiving a spatially encrypted message from two transmitter (or for the simultaneous reception of to independent messages).

FIG. 33A illustrates spatially encrypted reception for the case where there are two transmitters XCP1 and XCP2 generating physical waves PWCP1 and PWCP2, respectively, conveying message component parts, or, message components. The two transmitted physical waves PWCP1 and PWCP2 are generally simultaneously sampled by receiver RCVR as part of a composite wave field including the two transmitted waves and background by a receiver RCVR compatible with spatial encryption. A receiver array processor AP could include a signal processor SP (or array processor) converting the samples, or, signal vectors, SV obtained from sampling the incoming composite physical wave field into signal vectors SV1 and SV2 characterizing the physical wave fields of PWCP1 and PWCP2 (associated with those incoming from given directions) and a message assembler MA reconstructing from SV1 and SV2 the original message M. Alternately, the message assembler MA might reassemble a message from its message component parts directly, in which the component part messages are constructed directly from signal vectors SV1 and SV2 and then merged into the complete message M. Whatever its type, the message assembler MA preferably reconstructs the original message M using the definition for constructing the message component parts, with array processor AP being modified as required.

There are a number of possibilities by which component parts of messages might be defined. A text message might have different sequences of letters from the message placed into different component parts, the rule for decomposing the message into component parts depending upon how those sequences are defined. The reconstruction of the message incorporates this definition. Alternately, if an analog signal for conventional transmission of a message is provided, that signal might be sampled and Fourier transformed to obtain the Fourier components of the message. In this case, subsequences of the Fourier coefficients can be formed from the complete set and used to construct analog signals defining the component parts of the original analog signal message. The reconstruction of the original analog signal obtained by the intended receiver sampling the physical wave field conveying the component parts obtains the set of Fourier coefficients for each component part. In this case the message assembler MA incorporates the definitions of how the Fourier domain component parts were defined for each component part in order to reconstruct the Fourier transforms of the original analog signal and the message it carries as well as the respective times of arrivals of the different component parts (the component part Fourier coefficients generally need to be assembled into the set of Fourier coefficients for the original message with the proper phases). An inverse Fourier transform then allows the message assembler to output the original message.

There exists a multitude of possibilities for forming component parts of messages. Each message decomposition and reassembly procedure is based upon the definition for each component part, and such definitions constitute an underlying form of encryption layered beneath the spatial encryption obtained from the general simultaneous transmission and reception of component parts into and from different directions, respectively, preferably on the same frequencies. Each message assembler MA in each intended receiver typically incorporates such definitions, and such definitions could be distributed partially with each component part, so that receipt of all component parts would generally be required for message assembly of only one part. The array processor AP for the receiver in FIG. 33A should preferably correspond to a design consistent with whatever component part definitions are employed.

The ability to carry out the message re-assembly operation depends upon the location of receiver RCVR. Only in some localized neighborhood of the intended receiver RCVR will reception of all component parts along proper direction be realized without difficulty, particularly if message reconstruction also includes requirements on the arrival times of the component parts, thus the characterization, "spatial encryption." Transmissions of component parts by each station XCP1 and XCP2 transmitting component parts to an intended receiver RCVR need to be consistent with predetermined time of arrival requirements at the receiving destination receiver RCVR. Other stations attempting message interception without sufficient resolving power would find message reconstruction difficult, since message component part transmissions occupying the same frequency band would then interfere with one another. Receivers at locations other than that of the intended receiver RCVR would not receive all portions with the proper timing or proper incoming directions. The different component parts themselves could also be encrypted, with the merging process itself then requiring a further encryption key.

Figure 33B:
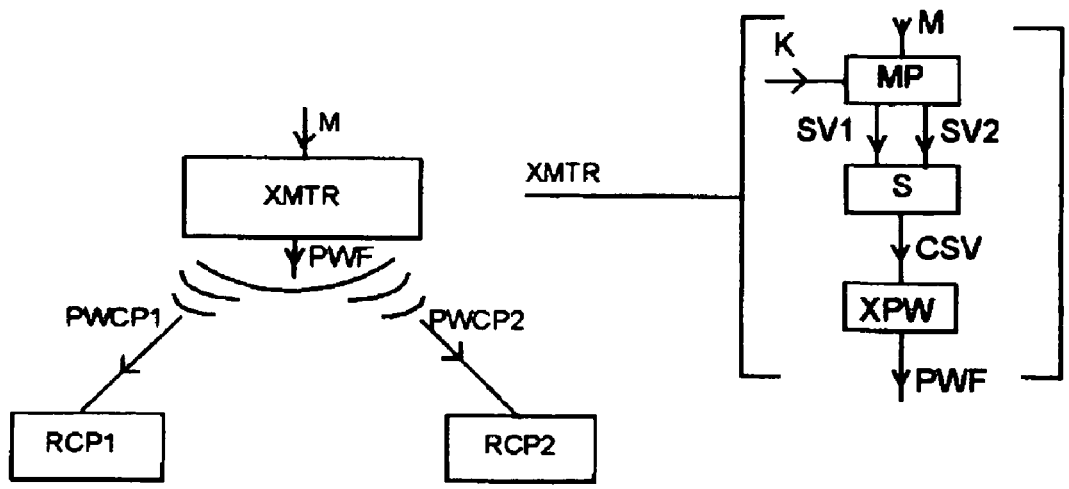
FIG. 33B is a schematic representation of a system constructed in accordance with the present invention for transmitting a spatially encrypted message to two receivers (or for the simultaneous reception of to independent messages).

FIG. 33B illustrates an apparatus for the spatially encrypted transmission of messages for the case where there are two intended receivers RCP1 and RCP2, the encryption capable transmitter XMTR preferably being of the type depicted in FIG. 20. In general, there can be as many intended receivers as permitted by the resolving power of the transmitter XMTR. One preferred embodiment of the present invention of FIG. 33B involves the generally simultaneous transmission of message component parts transmitted as a physical wave PWF consisting of the superposition of two physical waves PWCP1 and PWCP2 conveying the component parts to corresponding resolvable receivers RCP1 and RCP2. The transmitter XMTR consists of a message processor MP generating the signal vectors SV1 and SV2 corresponding to the message component parts (decomposed from the message M) to be sent to the two receivers RCP1 and RCP2. The two signal vectors SV1 and SV2 are superimposed by summer S into composite signal vector CSV, which is converted by transmitter XPW into a physical wave field PWF. At long range, the transmitted composite wave field PWF separates into its component parts PWCP1 and PWCP2, which carry the component part messages to the two selected corresponding receivers RCP1 and RCP2. An interception of the original transmitted spatially encrypted signal in the near zone of the transmitter, where there is little or no directionality, would typically not produce an intelligible signal, while interception in the far zone would at most generally yield only one component of the message, if the receivers RCP1 and RCP1 are resolvable by the transmitting station XMTR.

The process of spatially encrypted transmission is generally a reversal of the corresponding process for spatially encrypted reception, and a modification of the process for the simultaneous transmission of multiple messages, preferably using a single antenna. The partial directed transmissions received by each receiver RCP1 and RCP2 could then be assembled at a single location using predetermined component part definitions, or relayed to one or more spatially encryption capable transmitters, as in the spatially encrypted conveyance of a message.

Figure 34:
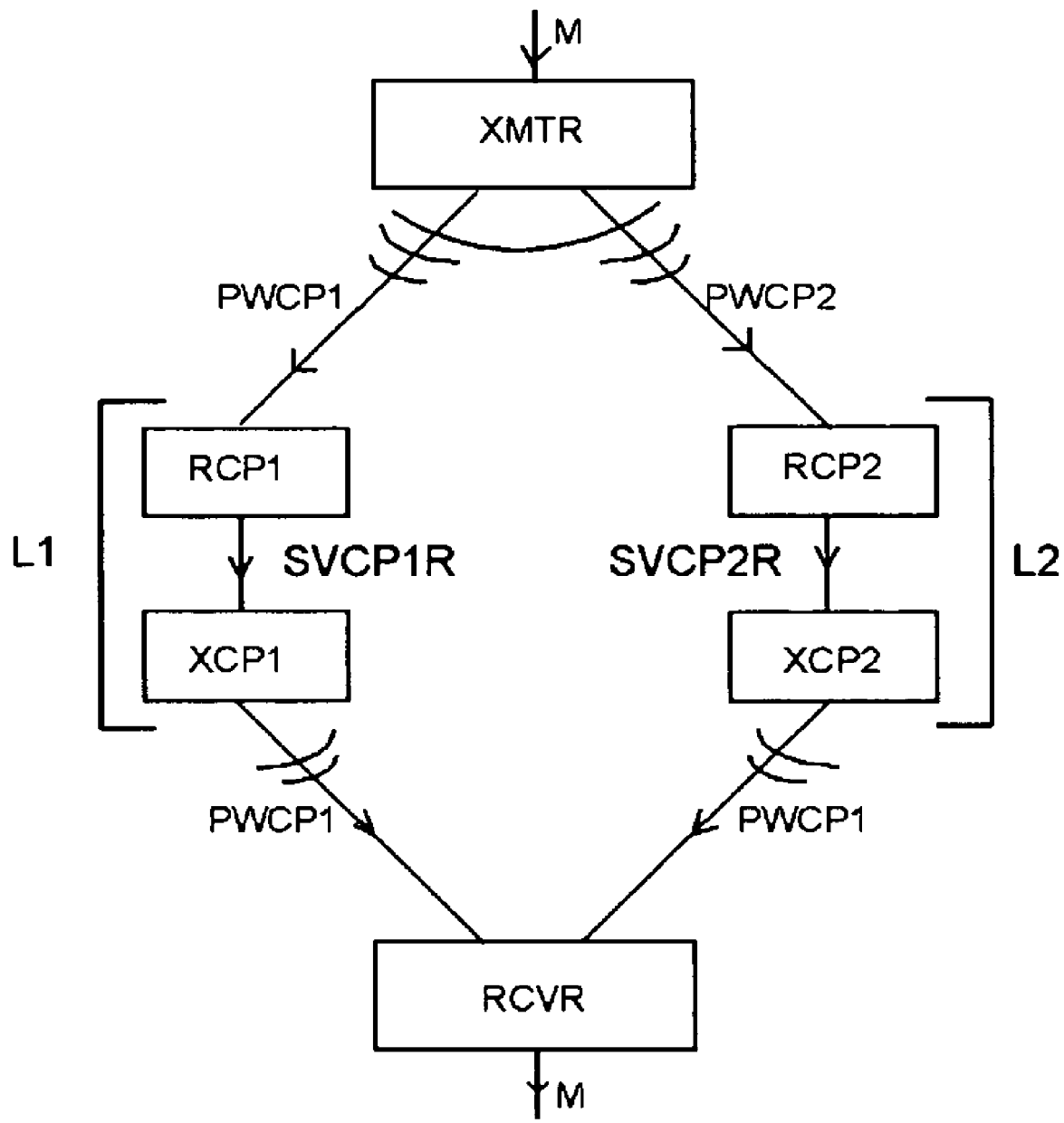
FIG. 34 is a schematic representation of a system constructed in accordance with the present invention for the conveyance of a spatially encrypted message from a transmitter to a receiver via two linked receiver-transmitter pairs.

As shown in FIG. 34, a spatially encrypted conveyance of a message involving both spatially encrypted transmission through transmitter XMTR and reception through an intended receiver RCVR involves the linkages L1 and L2 of selected intermediate receivers RCP1 and RCP2 used in spatially encrypted transmission to selected immediate transmitters such as employed in spatially encrypted reception as discussed above. The so linked intermediate receivers RCP1 and RCP2 and transmitters XCP1 and XCP2 form an additional embodiment of the invention in which the signal vectors SV1 and SV2 obtained at the intermediate receivers RCP1 and RCP2 are converted into signal vectors SVCP1R and SVCP2R driving the intermediate transmitters XCP1 and XCP2, which generate the physical wave fields PWCP1 and PWCP2 conveying the component message parts to the intended receiver RCVR. The configuration in FIG. 34 thus links the spatially encrypted transmission and reception configurations of FIGS. 33A and 33B. The signal vectors SVCP1R and SVCP1R are the output of the linked receivers RCP1 and RCP2, obtained by replacing each directional library signal vector that can be viewed as contributing to each of the received signal vectors of RCP1 and RCP2 by a corresponding directional library signal vector corresponding to the direction from each linked transmitter XCP1 and XCP2 to the intended receiver RCVR.

Spatial encryption could involve layering standard encryptions for message component parts under the spatial/merging encryption techniques discussed above, with separate encryption keys required for re-assembling the component parts' messages, making interception de-ciphering virtually impossible, even if all component part signals are received near the receiving station. Directional transmissions as allowed by this invention would also inhibit reception of message parts by receivers away from the intended receiver. If encryption and decomposition/re-assembly keys were distributed inside the component part messages, it would not be necessary to provide the receiver with advance knowledge of the incoming directions.

FIGS. 26 and 27 illustrate example scenarios where spatial encryption might be employed. In FIG. 26, field operative personnel using the signal reconstruction techniques of the invention could use spatial encryption for more secure communication with command posts at known locations (and also via satellites), while FIG. 27 illustrates a scenario for spatially encrypted communication between a ship at sea and satellites, where command instructions could be conveyed in a more secure manner. There exists a multitude of possible applications for satellite transmission of spatially encrypted messages.

Another embodiment of the present invention allows for the determination of information concerning a projectile. Under certain circumstances, a single assembly or configuration (involving one location) of the present invention can be used to determine not only the direction but also the range to a source of a supersonic projectile, such as rifle fire, the miss distance of the trajectory from the observation point, and/or the speed of the projectile, all without need of a second arrangement, assembly, or configuration of the invention, as would be needed for triangulation. For range, such a determination requires the detection and establishment of the directions of both the muzzle blast and shock wave generated by the projectile, the elapsed time between their times of arrival, the ability to process associated data collected at frequencies appropriate to each, and knowledge of the speed of sound. For the miss distance, such a determination also requires knowledge of the speed of the projectile, or equivalently, the miss distance for the passage of a previous projectile from the same source. The processing procedures required are those as described above for impulse type waves. In practice, such determinations require high accuracy and resolving power as allowed by the present invention.

Figure 35:
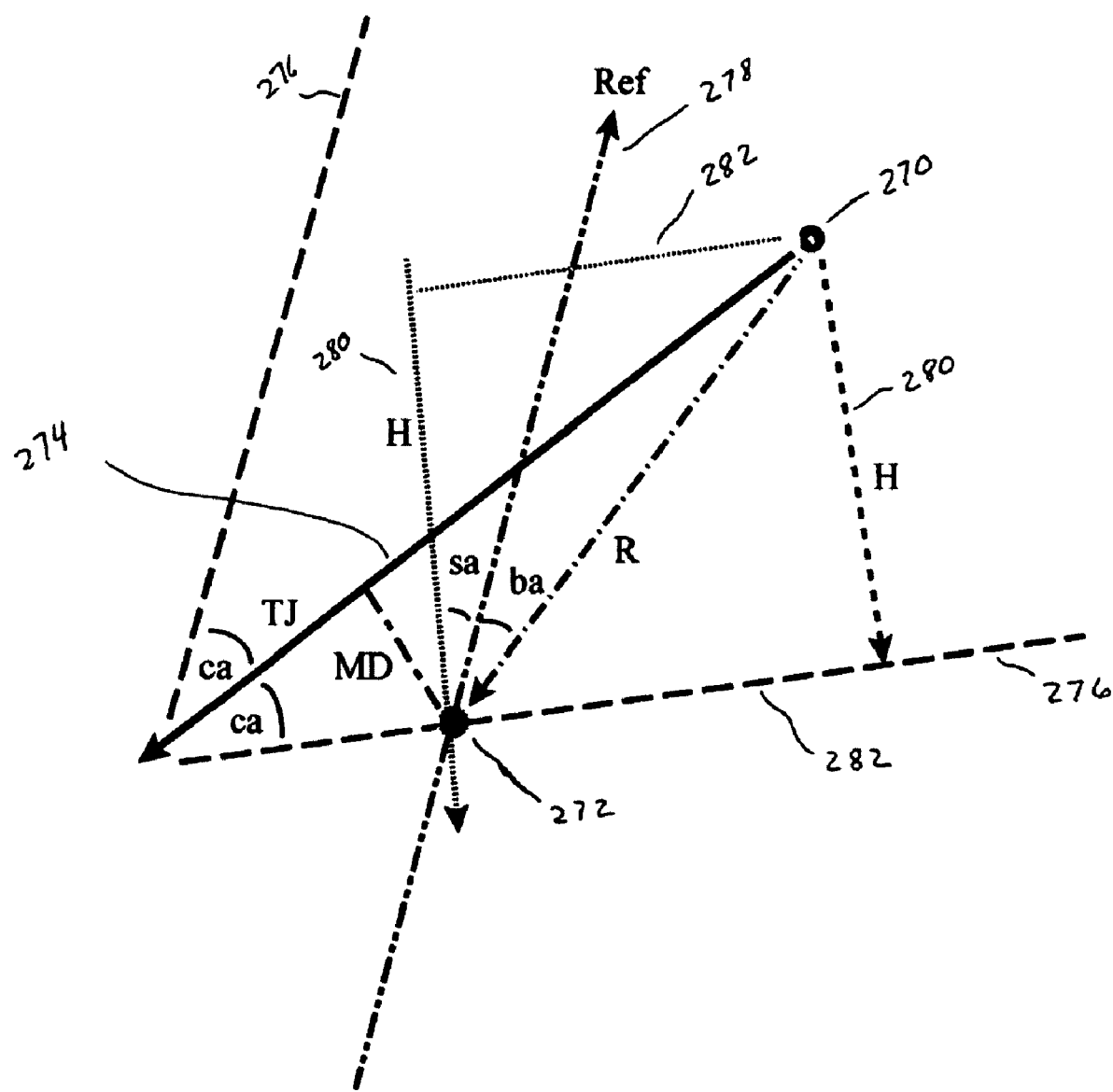
FIG. 35 is a schematic representation of a system constructed in accordance with the present invention illustrating a cross-section of the propagating shock wave front and various directions and angles associated with the trigonometric determination of the range to a source of a supersonic ballistic projectile created by a muzzle type blast.
Figure 36:
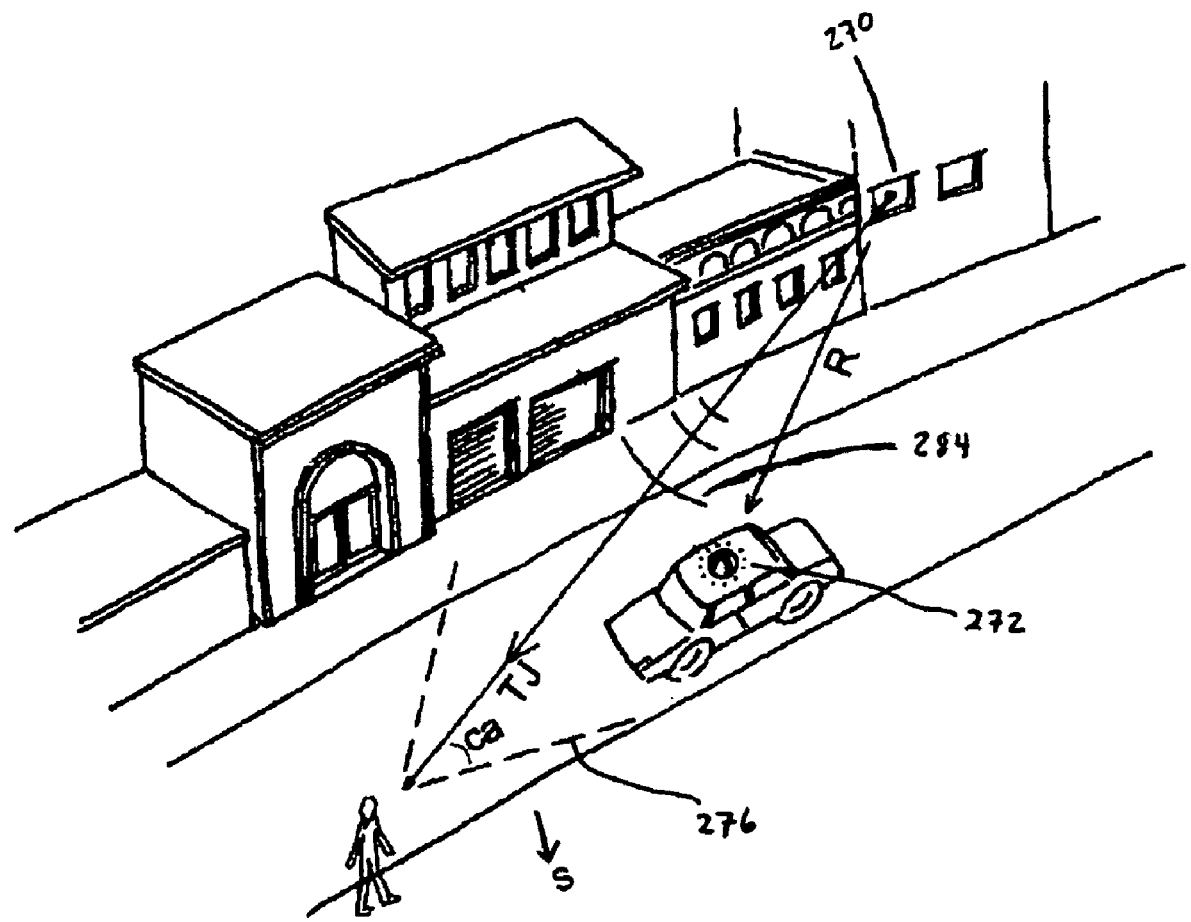
FIG. 36 is a schematic representation of a system constructed in accordance with the present invention illustrating how a single embodiment of the present invention can be applied to the problem of determining the direction and range to a sniper firing at ground personnel.

FIG. 35 illustrates how range data can be inferred from measurements on the muzzle blast and shock waves, while FIG. 36 illustrates a possible application. Assuming a supersonic projectile is fired from some source location 270 and travels along the trajectory TJ, shock wave 276 moves out from the projectile in a cone making an angle ca with the trajectory TJ. A receiver 272, which could be one as discussed above regarding acoustic signals in FIG. 1, detects both the muzzle blast and shock wave at different times, the muzzle blast wavefront traveling a distance R to the invention, while shock wave 276 has traveled a perpendicular distance H from the source 270 at the time the shock wave passes over the invention. The shock wave is assumed to propagate with the speed of sound along the direction of H (line 280 in FIG. 35).

The invention is oriented such that the line 278 (FIG. 35) provides the zero direction off which the angle between the propagation direction of the shock wave 276 and the Ref is sa, while the angle between the Ref and the direction of propagation R of the muzzle blast wave is ba. Since the shock wave propagates along H with the speed of sound c, and R is the diagonal of the rectangle formed from the lines 280 and 282, is not difficult to see that the range $$R = c dt / (1 - \cos(da)),$$

where dt is the elapsed time between the arrivals of the shock and muzzle blast waves at the location of receiver 272, and da=(sa−ba) and is the angle between the incoming directions of the shock and muzzle blast waves (between S and R in FIG. 36), where the counterclockwise direction is here taken as positive (see FIG. 35). Note that it is not necessary to know the velocity of the projectile to determine the range to the projectile's source.

The directions of the muzzle blast and shock waves can be determined as described above in the discussion on the measurement of directions of impulse waves. The difference between the times of arrivals of the shock and blast waves can be determined once the directions for resolvable shock and blast waves have been determined. The corresponding signal vectors for each such wave can be used to determine a set of Fourier coefficients for each. The latter can then used to construct the isolated signals of each such resolved pulse (as in signal reconstruction described above), so that differences in times of arrival for isolated paired blast and shock waves can inserted into the above equation. This reconstruction procedure provides for the determination for the time of arrival differences for multiple sources even if the shock or blast overlap in time, are spectrally competitive, or are hidden by other competing but resolvable signals, so long as their propagation directions are resolvable.

Also by referring to FIG. 35, it can be seen that the miss distance MD can be determined from trigonometry, and the triangle formed by the sides MD, R, and a portion of the trajectory TJ, i.e., line 274:

$$MD = R \cos(ca+da) = R^* \sin(Dda),$$

where R is obtained as described above, and where Dda is the difference between the angle da for the observed projectile and a second angle da' (not shown) determined as da for the case of a trajectory making a very close approach to the antenna of receiver 272.

Equivalently, if cone angle ca is known, or if the speed of the type of projectile is known, then the angle da' is known. For, in the latter case if the projectile makes a close pass to the receiver 272, then the complement of the cone angle is very nearly equal to the angle da'. Furthermore, the measurement of the cone angle also provides knowledge of the speed of projectile v, since the cone angle is related to the latter by $$\sin(ca) = c/v = \cos(da').$$

Knowledge of the speed of the projectile, the cone angle, or of a known miss distance can be used to determine from measured data a miss distance for a specific trajectory.

Note that the discussion here has been presented as if the speed of shock wave propagation is independent of position along the shock wave front. A more rigorous approach may involve local directions of the shock wave and its thickness through an analysis of the hydrodynamics of shock wave propagation, but this simple approach could potentially give good results.

The above considerations on range, miss distance, and projectile speed apply equally well when a three-dimensional embodiment of the invention is employed, as the line R running from the source 270 to the receiver 272 and projectile trajectory TJ typically define the plane shown in FIG. 35. The above equations on these matters then are still applicable, with the angles da, Dda, and, da' having the same meaning as given above. It is generally a simple matter to determine the angle da from known elevation and bearing angles measured for the muzzle blast and shock wave.

Applications of embodiments of the present invention to situations involving both muzzle blast and projectile shock waves can address the problem of determining the range and direction to snipers in counter terrorism efforts (FIGS. 7, 12, and 36) using a single embodiment of the invention, as well as the range and direction to sources of high velocity flat trajectory canon fire (FIG. 8), for example, as generated by tanks and anti-tank weapons.

FIG. 36 illustrates the shock and blast waves passing over a vehicle possessing one of the present embodiments. The angle da between the direction of the normal vectors to the blast and shock waves R and S in FIG. 36 and the difference between their times of arrivals dt at the receiver's antenna determines the range R. The present technique of determining range using a single antenna has an advantage over triangulation methods, since now communication between different configurations of the invention is not required if both blast and shock waves can be detected and properly processed. In the latter case, a low profile portable version of the type depicted in FIG. 36 would be particularly applicable to infantry desiring to determine the direction and range of incident fire without infantrymen having to peek and look for sources of fire. Other appropriate embodiments can be employed at shooting ranges for the purpose of determining projectile speeds, since such trajectories and consequent miss distances are readily available as input, the latter being determined by placement of targets and shooter positions at the range.

Another situation in which range to the source of a vehicle or projectile and the miss distance to the vehicle's or projectiles trajectory can be determined is that which occurs when the vehicle or projectile is continuously emitting physical waves, provided that the vehicle or projectile is moving near constant velocity. For the Doppler shift formula when differentiated with respect to time provides a relationship between miss distance, angular velocity of the bearing angle at the point of closest approach, and the Doppler frequency shift of emissions as the vehicle passes. For then one knows the distance to this CPA, the direction of the trajectory, and the distance to the source if the emitted waves are tracked continuously from the vehicle's or projectile's starting position two points sufficiently past the CPA. Applications of this technique include the tracking and source determination of RPG's and vehicles, such source determination being the location of the vehicles when tracking begins.

The fact that properly configured systems provide signal vectors that enable mathematical and/or numerical models of the physical wave field in the neighborhood of the system's antenna implies, as discussed above, that the temporal and spatial derivatives for the physical wave field can be obtained in this neighborhood. This means in turn that one or more partial derivatives belonging to the physical wave field can be ascertained in, on, or tangent to the surface on which antenna elements are mounted, depending upon the neighborhood.

These derivative fields can also be employed in detecting, tracking, and classifying sources of the physical wave field.

Interestingly, if the signal vectors (which can also be referred to as modeling vectors) represent models of the physical wave fields, the differentiation of the physical wave field can be carried out using its signal vector without actually constructing the physical wave field itself. If the signal vector library is one of plane waves, or combination of plane waves and waves reflected from the earth's surface, buildings, obstructions, or supports upon which the embodiments antenna is mounted, then one or more partial derivatives can be used to determine the direction of the wave's wave vector. Also, superpositions of derivatives of partial waves decompositions can be used to test whether combinations of partial waves characterizing sources actually superimpose to represent the incoming wave field, that is whether or not a concluded collection of sources actually give rise to a physical wave field of interest with associated propagation vectors.

The simplest example occurs if one tests to see whether the incoming physical wave field is that of a plane wave incident on the antenna. In this case the component of the derivative tangent to a surface of an antenna should be consistent with the field model all along a surface containing the transducers taking into account any boundary conditions that need be employed. The differentiation procedures can be employed without recourse to the detection and tracking techniques discussed above, or can be used as supplementary procedures. In addition, it is clear that much information can be then obtained from the physical wave field itself, without even recourse to a signal vector library. The specific approach depends upon how one characterizes the waves generated by sources of interest.

A number of applications of the present invention involve surveillance and security. FIGS. 9-13 and 28, 29, and 32 already address some of these applications. Other applications can include sonar and radar applications as well as perimeter, work site, and littoral water surveillance and monitoring.

Figure 37:
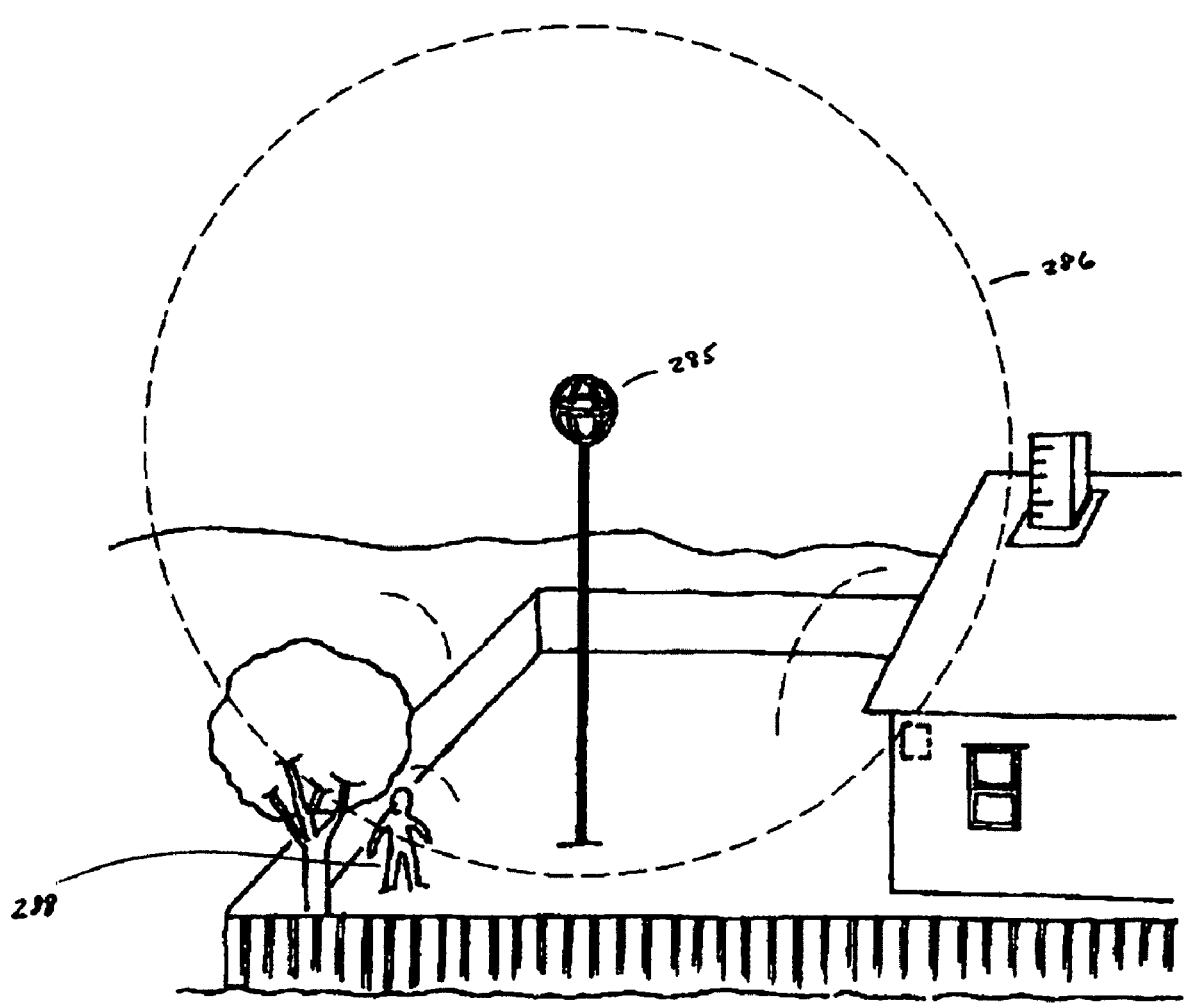
FIG. 37 is a schematic representation of a system constructed in accordance with the present invention illustrating how an active embodiment of the present invention consisting of a coupled transmitter and receiver operating in a "sonar" type mode can be employed for detecting the presence of intruders in the environment of a building.

FIG. 37 shows another embodiment of the present invention and includes an active acoustic arrangement, generally, mounted on a tower adjacent to a building, the embodiment emitting near spherically symmetric pulses 286 propagating out from the transmitting antenna. A high resolution receiving antenna 285 receives reflections from the ground and surrounding building, trees, and other environmental obstructions as pulse 286 propagates, with the receiver RCVR used to alert interested parties of intruders 288 into the area. Incorporation of background-induced noise into the noise metric (as discussed above) insures that only deviations from the background are detected and displayed on a display screen (not shown). Multiple embodiments of this type can be used to provide surveillance for extended structures, perimeter defense, and/or worksites. Passive embodiments, without transmission of a pulse, could monitor traffic in and around the vicinity of site.

Figure 38:
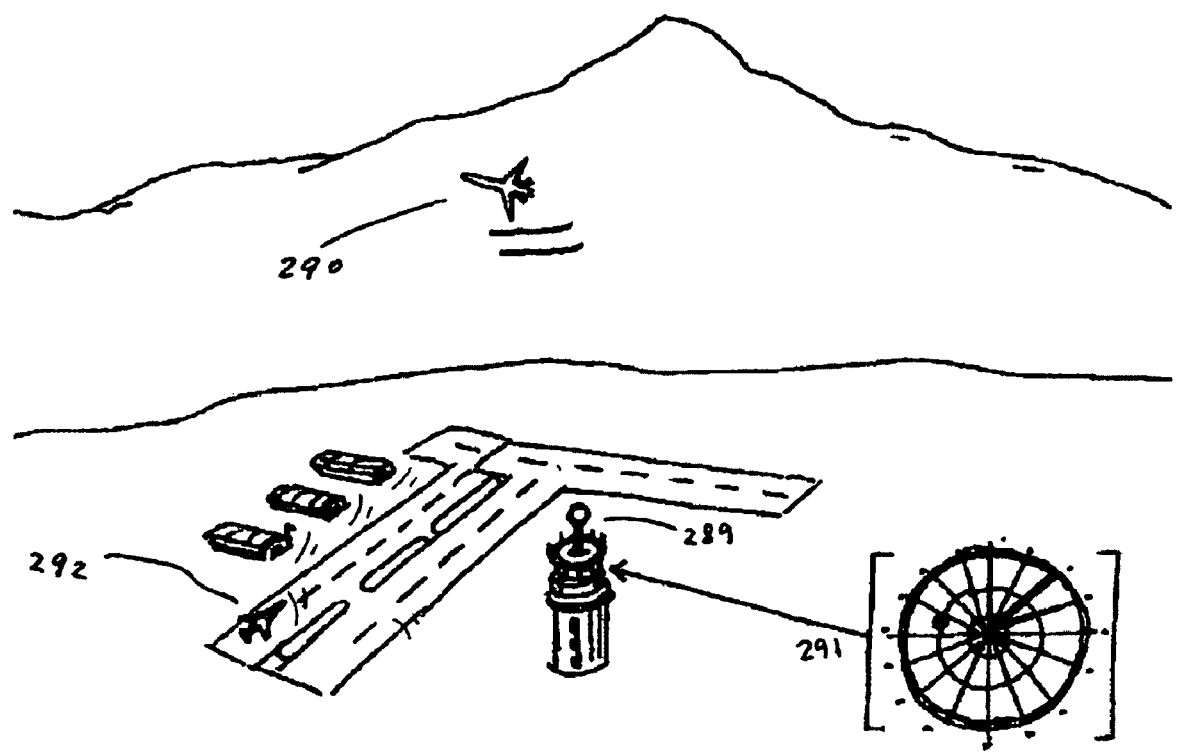
FIG. 38 is a schematic representation of a system constructed in accordance with the present invention illustrating how an electromagnetic embodiment of the present invention acting in a "radar" mode can be used to plot positions of aircraft on or in the presence of an airport without the radar beam scanning as with conventional radars.

FIG. 38 illustrates another embodiment of the present invention and includes a second surveillance application, having an airport radar 289 looking for deviations from ground clutter associated with background backscattering from hills surrounding the airport as caused by incoming or outgoing aircraft 290. By modifying the vector space as described above, distracting background scatter would not appear on the radar screen 291. Note that this embodiment of the present invention may eliminate sweeps across the radar screen used by conventional radar systems. Only detections of deviations from the background and their tracks, with possible dotted lines present on the radar screen 291 indicating the positions of possible obstructions to flight, need appear on the screen 291.

Figure 39:
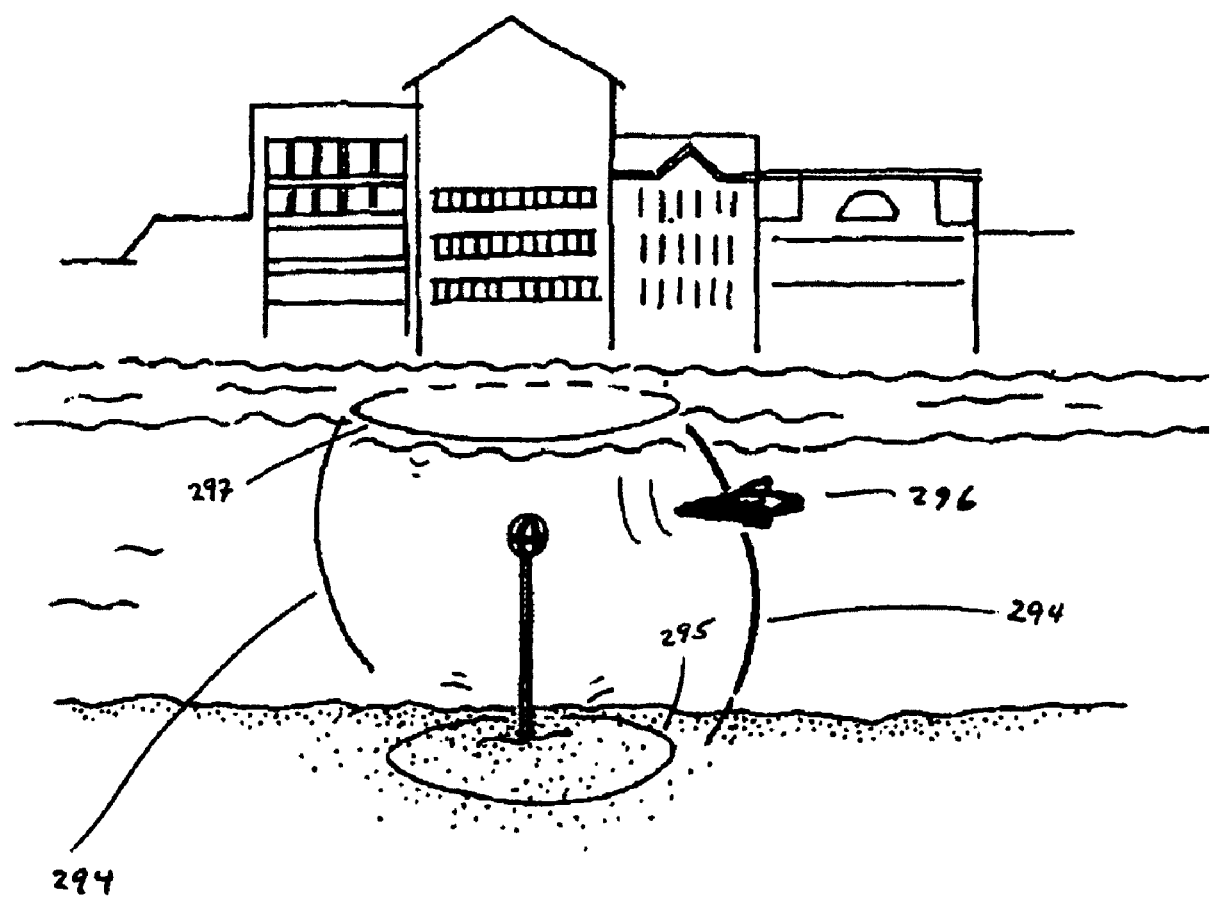
FIG. 39 is a schematic representation of a system constructed in accordance with the present invention illustrating how an active acoustic embodiment of the present invention operating in a "sonar" mode can be used to detect the presence of "silent" intruders in a harbor environment without the sonar scanning as with conventional radars.

FIG. 39 illustrates another embodiment of the present invention, and includes an active littoral water surveillance system generating near spherically symmetric pulses 294 resulting in reflections 295 from the bottom and reflections 297 from the water's surface, as might be used in a harbor or littoral region. A high resolution receiving system employing a noise metric accounting for environmental background backscattering could detect and track deviations in the background generated by intruders, such as by a submarine and/or remote controlled or swimmer delivery vehicle 296 moving in the area, and report such events to interested personnel using an appropriate reporter.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A method for determining selected information from a physical wave field, the properties of the physical wave field being detectable over three spatial dimensions and a temporal dimension, the method comprising:
   using at least one processor to characterize said physical wave field by a signal vector representative of a mathematical model of said physical wave field;
   differentiating said signal vector using at least one processor to obtain at least one signal vector derivative representing a derivative of said physical wave field; and
   using said signal vector and at least one signal vector derivative to obtain the selected information.

2. An apparatus for determining selected information from fluctuations of a physical wave field, the properties of the physical wave field being detectable over three spatial dimensions and a temporal dimension, the apparatus comprising:
   at least one antenna that generates output signals representative of the physical wave field;
   said output signals being sufficient to define a physical wave field modeling vector characterizing the physical wave field;
   at least one converter that converts said output signals into at least one physical wave field modeling vector;
   at least one differentiator that differentiates said physical wave field modeling vector to obtain a differentiated modeling vector representing a derivative of said physical wave field; and
   at least one processor that obtains selected information from said physical wave field modeling vector and said differentiated modeling vector.

3. A method for determining selected information about at least one resolvable source contributing to a physical wave field, the properties of the physical wave field being detectable over three spatial dimensions and a temporal dimension, the method comprising:
   using at least one processor to characterize said physical wave field by a signal vector representative of a mathematical model of said physical wave field;
   using at least one processor to provide a library of signal vectors having library elements specifying mathematical models of physical wave fields with known properties;

using said library elements and said signal vector to obtain a resolved signal vector representing the contribution to the physical wave field of said at least one resolvable source; and using said resolved signal vector to reconstruct the time series representing said contribution to the physical wave field; and using time series to determine selected information about said at least one resolvable source.

4. A method for determining the signal vectors to be associated with contributions to a physical wave field generated by a source, the properties of the physical wave field being detectable over three spatial dimensions and a temporal dimension, the method comprising;

using at least one processor to characterize said physical wave field by a signal vector representative of a mathematical model of said physical wave field;

providing criteria for determining which said contributions to the physical wave field can be considered resolvable contributions;

using said criteria to determine the directions which can be associated with said resolvable contributions;

using at least one processor to provide a signal vector library having elements corresponding to possible physical wave fields; and determining said signal vectors from said library elements generally consistent with said criteria.

5. A method for determining the presence of a source of a signal contributing to a physical wave field, the properties of the physical wave field being detectable over three spatial dimensions and a temporal dimension, the method comprising:

using at least one processor to characterize the physical wave field by a physical wave field signal vector representing a mathematical model of the physical wave field;

using at least one processor to provide a library of library signal vectors having library elements representing physical wave fields with known properties; and using at least one said library vector and said physical wave field signal vector to determine the presence of the source.

6. A method for classifying the properties of a source of a signal contributing to a physical wave field, the properties of the physical wave field being detectable over three spatial dimensions and a temporal dimension, the method comprising:

using at least one processor to characterize a physical wave field signal vector representing a mathematical model of the physical wave field;

using at least one processor to provide a library of library signal vectors having library elements characterizing physical wave fields with known properties; and using at least one of said library signal vectors and said physical wave field signal vector to classify the properties of the source.

7. A method of determining the direction of a signal belonging to a source contributing to a physical wave field, the properties of the physical wave field being detectable over three spatial dimensions and a temporal dimension, the method comprising:

using at least one processor to characterize the physical wave field by a physical wave field signal vector representing a mathematical model of the physical wave field;

using at least one processor to provide a library of library signal vectors having library elements characterizing potential source physical wave fields;

determining the direction of the source using said physical wave field signal vector and at least one of said library elements.

8. A method of determining the presence of multiple sources generating contributions contributing to a physical wave field, the properties of the physical wave field being detectable over three spatial dimensions and a temporal dimension, the method comprising:

using at least one processor to characterize the physical wave field by a physical wave field signal vector representing a mathematical model of the physical wave field;

using at least one processor to provide a library of library signal vectors having library elements representing potential physical wave fields;

using at least one of said library signal vectors and said physical wave field signal vector to determine probable detections;

using at least one processor to determine at least one resolved signal vector characterizing the contributions of at least one of said multiple sources to said physical wave field; and determining the presence of at least one source using said at least one said resolved signal vector.

9. A system of reconstructing a signal belonging to a source contributing to a physical wave field, properties of the physical wave field being detectable over three spatial dimensions and a temporal dimension, the system comprising:

at least one processor that characterizes the physical wave field by a signal vector specifying a mathematical model of the physical wave field; and at least one processor that determines and reconstructs the signal of the source using said signal vector.

* * * * *